(12) United States Patent
Nair et al.

(10) Patent No.: US 8,838,748 B2
(45) Date of Patent: Sep. 16, 2014

(54) MEDIA MASHUP SYSTEM

(75) Inventors: Raj Nair, Lexington, MA (US); Andrew F. Roberts, Melrose, MA (US); IChang Lin, Westborough, MA (US)

(73) Assignee: Azuki Systems, Inc., Acton, MA (US)

( * ) Notice: Subject to any disclaimer, the term of this patent is extended or adjusted under 35 U.S.C. 154(b) by 774 days.

(21) Appl. No.: 12/957,920

(22) Filed: Dec. 1, 2010

(65) Prior Publication Data

US 2011/0161409 A1    Jun. 30, 2011

Related U.S. Application Data

(63) Continuation of application No. PCT/US2009/045939, filed on Jun. 2, 2009.

(60) Provisional application No. 61/058,108, filed on Jun. 2, 2008.

(51) Int. Cl.
*G06F 15/16* (2006.01)
*H04L 29/08* (2006.01)
*G06F 9/44* (2006.01)

(52) U.S. Cl.
CPC *G06F 8/38* (2013.01); *H04L 67/04* (2013.01); *H04L 67/20* (2013.01)
USPC .......................................... 709/219; 709/203

(58) Field of Classification Search
CPC ..... H04L 65/60; H04L 65/601; H04L 65/602; H04L 65/1023
USPC .................................. 709/203, 204, 217–219
See application file for complete search history.

(56) References Cited

U.S. PATENT DOCUMENTS

| | | | |
|---|---|---|---|
| 7,395,446 B2 * | 7/2008 | Luke et al. ..................... | 713/375 |
| 7,873,710 B2 * | 1/2011 | Kiley et al. .................... | 709/220 |
| 7,941,553 B2 * | 5/2011 | Baumeister et al. .......... | 709/231 |
| 8,225,194 B2 | 7/2012 | Rechsteiner et al. | |
| 2004/0046789 A1 | 3/2004 | Ianoria | |
| 2005/0144305 A1 * | 6/2005 | Fegan et al. ................... | 709/231 |
| 2007/0067482 A1 * | 3/2007 | Johnson et al. ............... | 709/231 |
| 2007/0088844 A1 * | 4/2007 | Seims .......................... | 709/231 |
| 2007/0094350 A1 | 4/2007 | Moore | |
| 2007/0143778 A1 * | 6/2007 | Covell et al. .................... | 725/19 |
| 2007/0156773 A1 * | 7/2007 | Debique et al. ............... | 707/200 |
| 2007/0226365 A1 * | 9/2007 | Hildreth et al. ............... | 709/231 |
| 2008/0059504 A1 | 3/2008 | Barbetta et al. | |
| 2008/0201650 A1 * | 8/2008 | Lemay et al. ................. | 715/763 |
| 2008/0270610 A1 * | 10/2008 | John et al. ..................... | 709/226 |
| 2008/0295130 A1 * | 11/2008 | Worthen ........................ | 725/34 |
| 2009/0063681 A1 * | 3/2009 | Ramakrishnan et al. ..... | 709/225 |
| 2009/0271283 A1 * | 10/2009 | Fosnacht et al. ................ | 705/26 |
| 2010/0010884 A1 * | 1/2010 | Cohee et al. ............... | 705/14.12 |
| 2010/0058353 A1 * | 3/2010 | Turski ........................... | 719/311 |
| 2010/0082431 A1 * | 4/2010 | Ramer et al. ............... | 705/14.52 |

\* cited by examiner

*Primary Examiner* — Jason Recek
(74) *Attorney, Agent, or Firm* — BainwoodHuang

(57) ABSTRACT

A media mashup system functions as a virtualizable endpoint called an Intelligent Multimedia Pod, or IMP, that ensures a reliable and high-quality multimedia user-experience for a variety of mobile user devices such as intelligent phones etc. The media mashup platform uses a web 2.0 media mashup model that offers several key features including Near Real Time (NRT) service continuity, control-proxy for a mobile-friendly web-surfing experience, finely-filtered content aggregation based on meta-data, context sensors and buddy blaster content sharing/recommendation. These features are brought together using a web 2.0 service mashup model that integrates media meta-data together with various context sensors including mobility-related sensors such as location and presence, time-of-day, voice commands, as well as time-shifted playback.

18 Claims, 40 Drawing Sheets

FIG. 29

| id | wurfl_id | user_agent | hash_key | module | compatable_id |
|---|---|---|---|---|---|
| 1 | generic | | d41d3cd98f100b204e9800998ecf8427e | 21310 | 12 |
| 2 | generic_xhtml | Mozz | b55a6c6c0fe43b019f786cd812b005a7a5 | 45597 | 12 |
| 3 | chtml_generic | CHTML Generic | 28f3af28956cce6a34594438fe60d53be | 28406 | 12 |
| 4 | apple_generic | Mozilla/5.0 (iPhone, | 59ae0f11b388dcc1be2eeae8462c20c6c | 4284 | 12 |
| 5 | nokia_generic | Nokia | 49f17151a1bc1d859eBcb35cd7b2059b | 2507 | 12 |
| 6 | nokia_generic_series20 | Nokia 20 | 6c248255bc94002f3c27304463ed3ef0 | 23080 | 12 |
| 7 | nokia_generic_series30 | Nokia 30 | f492b01a8a7b6cBdc07f3e444b258ce7 | 38751 | 12 |
| 8 | nokia_generic_series40 | Nokia 40 | 04c2536ceb09e19a5d6fe4c2914b5123 | 26667 | 12 |
| 9 | nokia_generic_series40_dp20 | Nokia 40 Developer Platform 2.0 | 53771c3946e391930e60bBea29698b77 | 40527 | 12 |
| 10 | nokia_generic_series40_dp30 | Nokia 40 Developer Platform 3.0 | b180981accd1c9c05d7fe027077beb7d | 1181 | 12 |
| 11 | nokia_generic_series60 | Nokia 60 | a5c72ba818ff130b003370a6a9342384 | 11236 | 12 |
| 12 | nokia_generic_series60_dp20 | Nokia 60 Developer Platform 2.0 | 4aff1c3533563cdf880b48c2c3e4acc9 | 46377 | 12 |
| 13 | nokia_generic_series60_dp30 | Nokia 60 Developer Platform 3.0 | 79023c16c3a82163428173fa54e017a | 7882 | 12 |
| 14 | nokia_generic_series80 | Nokia 80 | 7cf8315cf54d20d6e0e3e36ee7d6197 | 35535 | 12 |
| 15 | nokia_generic_series80_dp20 | Nokia 80 Developer Platform 2.0 | 7de8470b9d690b503dc514fb5ea82e5e | 16158 | 12 |
| 16 | nokia_generic_series90_dp20 | Nokia 90 Developer Platform 2.0 | f845a6352e917e232f198500fc07ed23 | 64459 | 12 |
| 17 | uptext_generic | UP.Browser/4 | 5acc3bbfcdf3dd045606cBae220c9 | 4361 | 12 |
| 18 | upgui_generic | UP.Browser/5 | faBcdaa24abc4539762261eBa2c2c133 | 50531 | 12 |
| 19 | opwv_v6_generic | UP.Browser/6 | ffab232d8bf5457b460e9e038c466571 | 29185 | 12 |
| 20 | opwv_v61_generic | UP.Browser/6.1 | 5b0c09b9a5894c9c17cec65c2094336 | 17950 | 12 |
| 21 | opwv_v62_generic | UP.Browser/6.2 | 44ee21c82761c5833358f44cb62ae707 | 64503 | 12 |
| 22 | opwv_v7_generic | UP.Browser/7 | b5986c30cf5fe71ec1fbe0acfb9e9d8e | 47838 | 12 |

FIG. 30

MEDIA MASHUP SYSTEM

BACKGROUND

The present invention is generally related to the field of media delivery to mobile computing devices such as smart phones and similar intelligent endpoint devices.

The current state of the art for delivering media to mobile devices has been limited to the linear offerings such as "MobiTV" from Telco service providers through their walled gardens. Access to these services are limited to paid subscribers and the choices of media is limited to what is being offered on the channels at a particular time. In other words, there is no notion of on-demand viewing. Furthermore, the cost of deployment is prohibitive because of the need to use specialized single-purpose hardware. Other services such as "Orb" require the use of specialized players that are hard to install on mobile devices. Yet another kind of offering is a media search that provides a low-quality catchall type of service of media clips that caters to the lowest common denominator of phones.

Media sharing is achieved primarily via email as attachments. The problem with this approach is that it subjected to length restrictions by the device and service providers. In addition, there is no guarantee that the media will render well enough to play on a particular phone.

SUMMARY

The disclosure is directed to an architecture of a media mashup platform providing a variety of media-related services for users of handheld/mobile client devices such as intelligent phone devices. There is particular emphasis on a function referred to herein as a "buddy blast" function—a dynamic, stream-aware clipping and forwarding function made possible using a combination of techniques including automatic segmentation of clips that enables user initiation of buddy blasts from within use of a media object. The buddy blast feature is used to dynamically share media from one person to his friends. Other supporting features include Dynamic Contextualization, Media Circles, and Virtual Streaming.

Dynamic Contextualization gives the system intelligence to perform device detection to determine the format of the media, length of the media and type of delivery (streaming or download) that a particular device can handle. This allows the system to send, upon request made from the recipient, a representation of the media compatible with the client's device is delivered to the client and contextualized by advertisements associated with the recipients current location, time, and interests.

Media Circles are dynamic groups for sharing based on attributes for sharing instantly among friends selected by metadata attributes (interest, location, etc). The groups are dynamically selected using the interests of the media selected for sharing as a key to match the interests of the friends. The results of the match are then selected for sharing the media. The media circle is personal in that it reflects the group of friends associated with the sender.

Virtual Streaming allows a stream to be dynamically adapted to a particular end user's context including time, location, end-device and activity-derived preferences in a scalable manner. Each context change is sensed and forwarded to the User-Interaction Engine for dynamic adaptation of content to the user's context. The adaptation includes the selection of appropriate content to present to the user as well as the appropriate advertisement to show to the user.

Rich media is very useful but requires a lot of bandwidth and is usually made for lengthier consumption at the desktop or home. On a mobile device, there is not enough bandwidth and the user has limited attention span. Hence, a snackable version of rich media is very useful for the end user. To implement this, we have made innovations in the area of content ingestion where a rich media file is automatically prepared by segmenting and transcoding to various bit-rates and formats suitable for mobile consumption. A system of references, also called "media markers", is used to pass only a reference to a particular portion of the media to the recipient. This avoids sending the actual stream which could unnecessarily tie-up resources. In addition, the recipient is able to read and make comments around the referenced portion of the media. These comments are displayed together with the media using a media-mashup mechanism described below.

The system has intelligence to perform device detection to determine the format of the media, length of the media and type of delivery (streaming or download) that a particular device can handle. This allows the system to send, upon request made from the recipient, a representation of the media compatible with the client's device is delivered to the client and contextualized by advertisements associated with the recipients current location, time, and interests. In another embodiment, the client request is routed to a data center that is ideal in relation to the client in order to satisfy the request based on the client's location. In addition, media that need to be assembled before delivery are "mashed up" or combined together, such as in a pre-roll ad, based on specific mashup rules that enable the creation of a final representation of the media object.

Among the novel aspects of the presently disclosed media mashup platform and methods are the following:

- a method of media segmentation to enable consumption and sharing of portions of a media object
- a method of passing a reference within a media object to a recipient
- a system for creating and retrieving comments (from all users) around a referenced portion of a media object
- a method of device multimedia capability detection from a browser application that combines the device type, bandwidth, and browser
- a method of user context detection including location, time, and interests learned from user-behavior
- a method of media mashup that combines multiple media elements into a single mobile-optimized representation based on combining rules including but not limited to "stitching" of video segments selected by context, comments from friends around a specific portion of a media object, etc.
- a method of automatically selecting a group of recipients to send a media reference where the selection criteria are based on the media attributes and/or other contextual hints such as location or activity
- a method of controlling the sharing of protected content by number of unique receivers
- a method of determining the user's context through multiple sensors including time, location, end-device, and activity
- a method of dynamically adapting user playlist via context-driven preferences
- a method of dynamically storing pre-evaluated filter lists that scales to a large number of filters Introduction Disclosed herein is a ubiquitous (device- and network-neutral) software realization of a virtualizable endpoint called an Intelligent Multimedia Pod, or IMP, that ensures a reliable and high-quality multimedia user-experience for a variety of mobile user devices such as intelligent phones etc. The media mashup platform uses a web 2.0 media mashup model that offers several key features including Near Real Time (NRT) service continuity, control-proxy for a mobile-friendly web-surfing experience, finely-filtered content aggregation based on meta-data, context sensors and buddy blaster content sharing/recommendation. These features are brought together using a web 2.0 service mashup model that integrates media meta-data together with various context sensors including mobility-related sensors such as location and presence, time-of-day, voice commands, as well as time-shifted playback.

Increasingly, the web offers interesting services and media. However, most of these are directly enjoyable only on desktops. The disclosed system brings similar experiences to handheld (mobile) devices using a ubiquitous endpoint virtualization software that enables each handheld device become an IMP. This provides a way to transition Rich Internet Applications (RIAs) to mobile devices while at the same time coping with a range of capabilities found in these devices.

Each IMP can both receive and transmit key pieces of data called "metadata" to bring alive the media entertaining experience. For example, one can store manually or automatically via sensors of location, time, user identity, etc. store on meta-data associated with each clip or song playback information that can aid the present user or his peers in enhancing his media experience. In addition, freely distributable (viral) media as well as bits of Javascript, may be propagated via a peer-to-peer service using a Bittorrent-like client among the IMPs. Note that the IMP not only consumes but also generates entertainment via the metadata mechanism.

The IMP can be extended by virtualizing it to include a collection of handhelds and a desktop/server system referred to as a "PeerPC", which may itself be virtualized by a hosted PeerPC-Service. In the latter case, the service access point also naturally is a service control point. We refer to this service as the Mash Media Service and the platform delivering the service as a Mash Media Platform. In the rest of this document, references to a PeerPC generally apply equally to a Mash Media Platform.

The intent of creating a PeerPC is to explicitly recognize the boundary between the broadband wireline world and the wireless handhelds which may experience poor bandwidth and occasional dropouts due to being out of coverage or running out of power. The combination of metadata and viral distribution can further enhance a user's experience by being able to define the UI based on any available mashup. Thus, one could envision peers discovering interesting UI mashups (between metadata and webservices) to enable interesting user-created ways of exploring media. For example, ads or multimedia entertainment could be selected based on location and time rather than merely blasting it out to an unresponsive user.

Other features offered by the service include NRT service continuity including offload to a PeerPC in the event of a total outage or for battery preservation. Also, other service-enhancing mashups could result from mashups with social networking services to enable finding peers with similar media interests via metadata clues.

Benefits of the system to the end user are: (1) a seamless entertainment using informed selections through metadata-based fine-filtering and peer-recommendation; (2) continuous service monitoring and media discovery with power-saving and security for the mobile environment; and (3) customization (for UI and ads) based on device, identity, time and location.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

FIGS. 29-30 are screen shots of user interface screens associated with creation and use of a device capabilities table;

DETAILED DESCRIPTION

Overview

Figure 1:
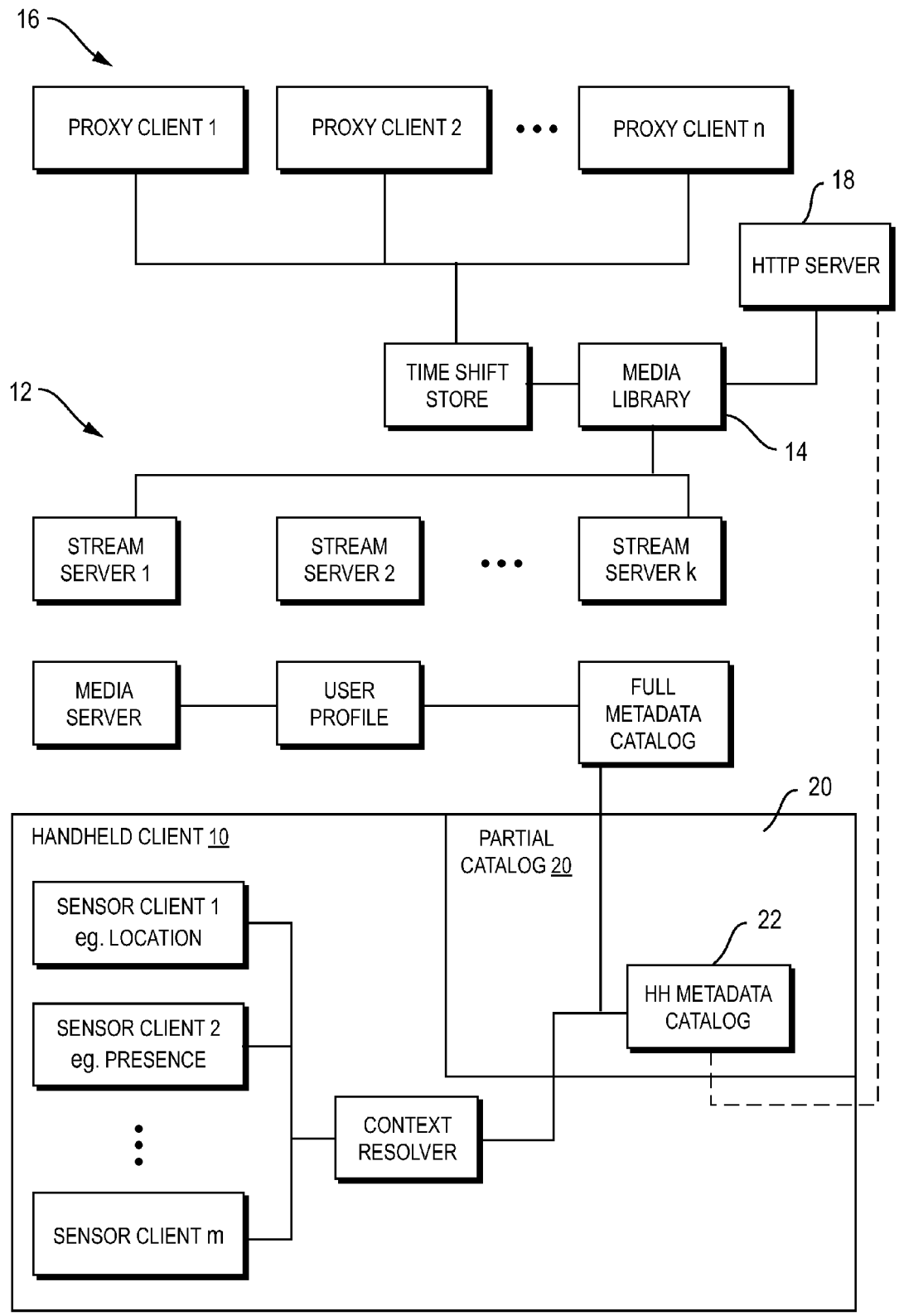
FIG. 1 is a system block diagram from the perspective of streaming functionality.

The IMP may be viewed as composed of a native web 2.0 widget engine with multiple plug-in modules (both local and remote) that implement individual features and functions. In addition, each module may offer an XML-based API that enable other modules to take advantage of the services of that module in a manner similar to how high level mash-up services are implemented. Examples of such modules are the ID management module and the display virtualization module.

The guiding principles in the design are inspired by the following Web 2.0 phenomena:
  Simplify the core platform software services to create a widget engine-like environment.
  Enable easy roll-out of features and fixes
  Independent plug-in modules that encourage rapid feature creation
  Bi-directional interactive services based on intelligent data mining and meta data processing
  Time-shifted near real time multimedia services
  Sensor rich, event driven alerts for targeted content The IMP extends the reach of desktop web entertainment services onto mobile handheld devices. It provides near always-on access to the connected world via progressive downloads or store-and-forward services of online multimedia streams. Quality of user experience, Access security and Control are of paramount concerns. For copyrighted content, DRM (Digital Right Management) policies are preferably observed.

In addition, it is assumed that as WiFi access points and Wimax infrastructure continue to expand its footprint, new IP services will quickly emerge, replacing traditional voice services and creating new near real time mobile services with rich media that have never been seen before. The IMP assumes that while "legacy 3 G" services are necessary, the integration of WiFi and WiMax will be the inflection point for all IP services to explode.

Experience Sharing

The system advances the user experience (UE) sharing concept. UE includes not only a linear stream of actions but also a non-linear stream with possible branching, which is made possible by mashing up of the media. This will enable further last minute orchestration that suits the user. Thus, it is possible to have a set of UEs encoded associated with an experience but orchestrated according to the context. In the case of external events, each UE instance could be a user-generated experience that is shared via the community and merged.

Let us consider three cases: a conference, a tour, and a piece of media such as a baseball game.

In the conference, the UE metadata could refer to various times at which various events are occurring that are specific to a particular topic of interest. These UEs could be created by specialists and user-contributed, are then merged together and republished by the conference organizers.

In the tour example, the UE metadata could refer to various locations at which special exhibits or highlights are being showcased. Again the UEs could be user-contributed and merged and republished.

In the ball game example, the UE data could refer to special portions of the video that highlight exciting moments as well as focus on a particular player's actions.

Social Networking

Social networking is a key aspect of the user experience. The sharing of UE was discussed above. In addition, the system can enable the limited sharing of media via streaming or progressive download. The limits are to ensure fair use and should not normally pose a problem. In addition, there is the need to embed applications of the system within existing social networks such as FaceBook or MySpace.

Communities are possible via informal invitations to view content. The PeerPC owner must specifically give access to his friend, implying that there is a registration with a centralized server which is referred to as a "SeedPC" herein. While this is going to exercise the underlying mechanisms, we expect that most users would prefer to leverage their existing memberships in other web logins such as IMs (AOL, Yahoo, MSN) or Communities (FaceBook, MySpace), etc. For the IMs, there are APIs to login available via a web service API.

Each PeerPC may serve as a media aggregation point for one or more clients. In addition, there could be clients that are only listeners. Thus, it enables the concept of a Personal Media Community much like a home for your media content. Note this leverages the storage and computing power of the desktop. In addition, by combining the power of multiple desktops, or in the case of a server platform, the combined storage capacity, bandwidth, and processing power of the community is amplified. All the while, each PeerPC offers to the rest of the community the ability to listen to the personal media collection of the owner.

FIG. 1 provides an illustration of the system from the perspective of media-stream related functions. The system includes a handheld client 10 capable of receiving streamed media from stream servers 12. The stream servers 12 obtain media from a media library 14, which is a repository for media obtained from content providers by proxy clients 16. An HTTP server 18 provides control functions based on communications with the handheld client 10. As shown, the handheld client 10 may include a partial catalog 20 of available media. The partial catalog 20 may include a metadata catalog 22.

The items in the upper part of FIG. 1 (stream servers 12, proxy clients 16 etc.) constitute the PeerPC in one embodiment. The PeerPC may be physically realized by one or more conventional server-type computer systems, each including one or more processors, memory, I/O circuitry for connecting to a network, and storage (e.g., magnetic disk storage).

Figure 1A:
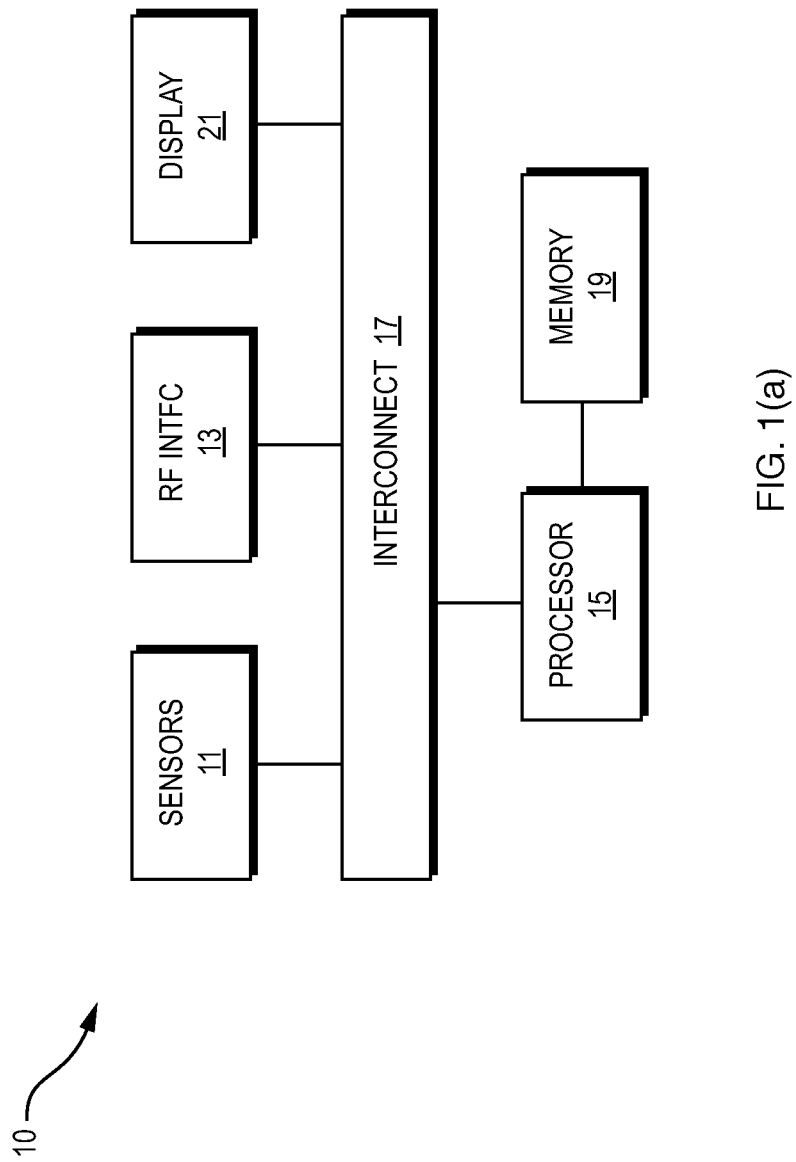
FIG. 1a is a block diagram a client handheld device.

The client handheld 10 may have a hardware organization as shown in FIG. 1(a). The device 10 includes various hardware sensors 11 (location and orientation sensors, touch-screen sensors, etc.) and RF interface circuitry 13 which are connected to a processor 15 by interconnect circuitry 17. The RF interface circuitry provides the interface to the wide-area wireless (e.g. cell) network. The processor 15 is coupled to memory 19 which includes volatile as well as non-volatile (e.g., flash-programmable) storage. The user interface is rendered on a display 21, which is preferably touch-sensitive to provide for flexible, software-defined user input.

System actions include the following:
  the ability to collect and re-stream content from the PeerPC
  stream-awareness that enables stream-level actions such as "save" or "send" a stream to be initiated while the user is at any point of the stream
  the ability to lookup content by metadata to enable library lookup, content farming, and contextualize by appropriate signals/cues such as location, time, or presence of a friend
  the ability to stream content to a peer handheld via the PeerPC; the peer could be connected to the same PeerPC as the originator or be connected via a PeerNetwork between the two PeerPCs of the friend and the originator's.
  buffers on the PeerPC to enable NRT and Time-shifting functions
  transcoding on the PeerPC to suit the handheld's codec capabilities
  control proxy functionality on the PC that enables the handheld's controls to be conveyed to the PeerPC where a handheld proxy executes the control functions and streams a single output stream back to the handheld As shown in FIG. 1, the proxy clients 16 retrieve content from external sources by emulating a media client. The media is delivered either as a real-time stream or by progressive download (also called byte range http). In both cases, the retrieved media is stored in the media library 14.

Thus, this new model enables the PeerPC-Service to be in constant pull/push from the Internet—as seen in news feeds, RSS, internet TV/radio, stocks, weather, chat/twitter as well as email. Feeds are aggregated using the mashup of metadata embedded in the media and from other sources including environmental signals, 3rd party web services, and peer-generated tags.

Buddy Blast

This feature lets a user send to his buddies (up to a small limit), an instant "blast" of the stream that he is listening to. The user could also optionally view the stream later in a time-shifted manner. The idea is to be able to share via the PeerPC a live stream that you are viewing on the handheld—instantly. This is like an instant message, except the stream is beamed over to the peer. Of course, it means that the "buddy" gets a notification such as an IM (Instant Message) which he clicks and immediately the stream is available for his consumption. The recipient is sent a link to the version of the media that is compatible with the recipient's context as determined by context sensors of the device detection and bandwidth detection. This stream in all respects is like a stream that originates in his PeerPC with the exception that he cannot save it unless he has the right credentials or it is DRM-free.

MetaData

The system distinguishes itself with the range of metadata that may be associated with any media clip. The definitions of the metadata are in the Appendix. The basic operations with the database are summarized as follows.

Figure 2:
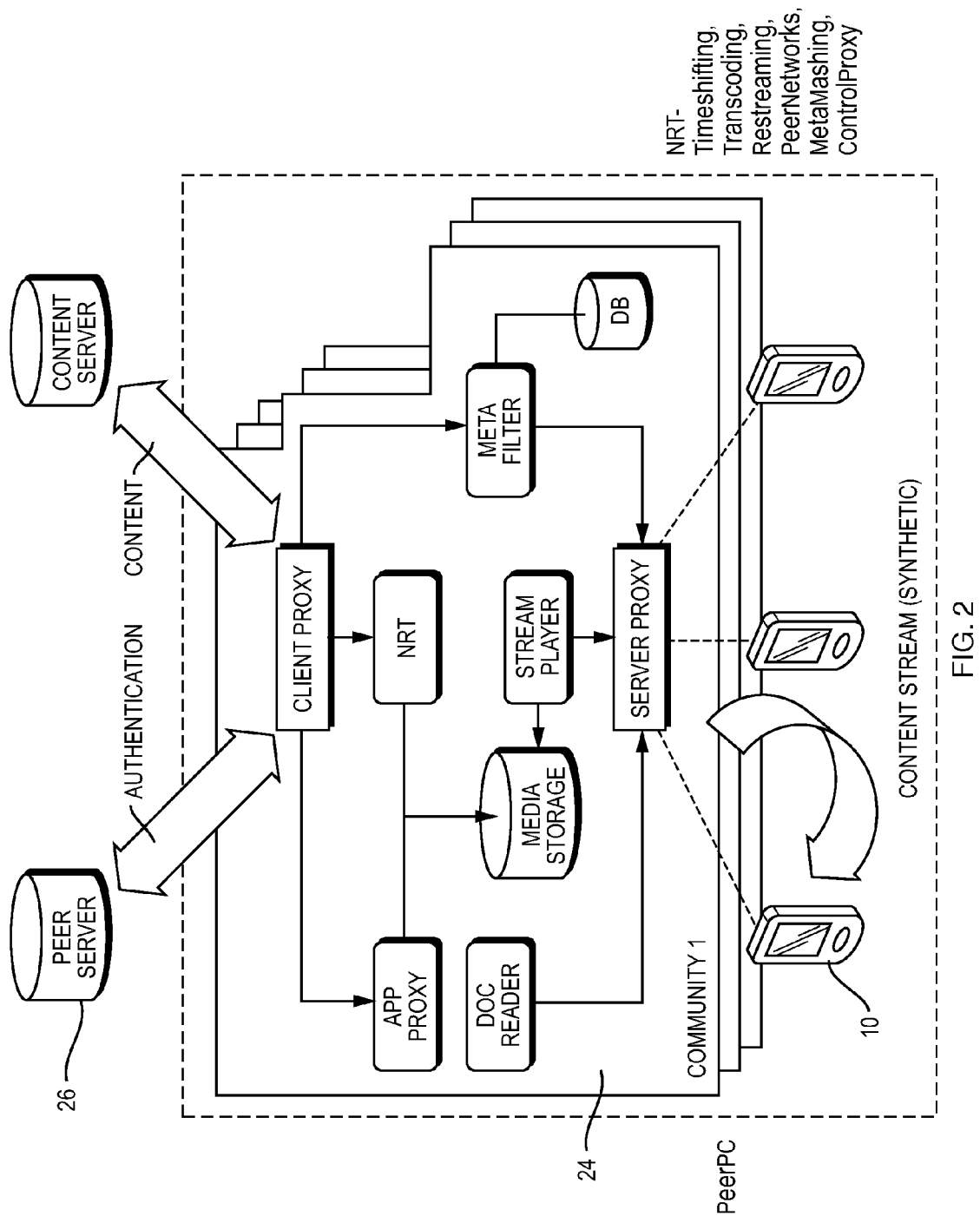
FIG. 2 is a block diagram of a PeerPC.

Query
  Structure
    Identify the handset
    Identify the user
    <Query Types>
    Browse for media within the current context
    Look for artist/genre/rating/sounds like
    Picking from list
Query
  Operations
    Boolean
    Greater, Less, etc
    Interactive
  Multiple searches kicked off by one key
    Browse
    Add
    Delete
    Modify
    Sync
  Combination of Add/Delete/Modify/Sync
Query example:
  Hardware
    OS="Symbian"; Service Provider="Sprint"; Subscriber="pre-paid"; ScreenSize="320× 240"; . . .
  User
    Location.GPS=112.234,52.333; . . .
  Type-"Video";
    Selection results in query in the background and the results are presented
  Genre="Action";
    Filter from the results
  Rating="PG"
    Filter from the results
    The selection is played on media player
  PeerPC snarfs the media and metadata associated with the media
  Search metadata base
Query
  Title="Mission Impossible";
  If doesn't exist add to DB
  Else verify the rest of the metadata
  Add additional metadata if any (Comment fields are appended)
  Sync with other PeerPCs
  At a scheduled time
  Use P2P (http) to sync
    Send the whole database
    Search for user location
  Query
    Use key (got from part of authentication)
    Uniquely identifies you (at the moment)
    Part of cookie
  Send query to PeerPC metadatabase
    Access the user record
    Add the user location (optional)
  At PeerPC
    Access the user record using cookie
    Sync the record with the metadatabase PeerPC Architecture The PeerPC has to perform several functions as described earlier. FIG. 2 describes the high-level conceptual architecture of the PeerPC. Note that many of these functions are separated into multiple computer systems in a hosted version of the media mashup platform.

The main functional blocks of this design are: the PeerPC 24; the PeerServer 26; and the HandHeld client 10. The key functions of these blocks are listed below.

I. PeerPC

1. Peer Server Authentication

Every time the PeerPC 24 boots up it registers itself with the PeerServer 26. At this time, it gets the credential-checking code and is able to allow handheld clients 10 to join its PeerGroups.

2. Client Community Authentication/Manager/P2P

The client must authenticate itself to the PeerServer 26 and receive a timed-ticket that serves as a credential that may be presented to the PeerPC 24 to enable it to access a PeerGroup.

3. Station List

The PeerPC 24 initially gets a station list of Internet streaming media sites from the PeerServer 26. This is a seed list that is then used to start the collection of stations that is "contextualized" for the specific user.

4. MetaData Library

The PeerPC 24 also maintains a MetaData library that is extracted from the Station List via a metadata extraction applet that is downloaded from the PeerServer 26 (initially). This applet either uses a web-service API or html-parsing (screen-scraping) to perform the extraction. Note that this functionality may not be legally performed at the PeerServer 26. To speed up the library creation and to encourage collaboration the discovered metadata may be shared among peers in a PeerGroup. This functionality is called "MetaCast".

In addition, there is the notion of metadata such as ratings and comments that is user contributed. The idea is to enable user participation in creating metadata for video content. This is especially useful for user-generated content such as video clips because there is almost no metadata available. Even for regular programming, user-generated metadata is very useful as a objective trusted metadata along the lines of Wikipedia.

5. Storage from Media Stream

The PeerPC 24 preferably stores streaming media in local buffers in order to support the NRT functions of (a) de-jittering (removing delay variation from the stream); and (b) time-shifting (letting the user play a stream at any time of his choosing including fast forward and rewind).

Note that the media could include any of the following:
Audio
Video
Blog
Podcast
Mail
PowerPoint 6. Directory Manager The PeerPC 24 presents to the user a list of the media available (both live and recorded) after filtering it through a metadata filter. This filter is based on contextual clues including user-tastes, location, time, PeerGroup profiles, etc. The filter is also a sorting-filter in that it sorts and filters the metadata.

7. Stream/Cached Proxy/Local Ad Insertion (Optional)

The PeerPC 24 inserts local ads by splicing an advertisement clip into the stream to the client. This requires identification of the ad-slots in the stream and a splicer that switches between the ad file and program file respectively, or that plays a pre-stitched stream.

8. Manager for Client

This function is the control proxy for the handheld. Its purpose is to offload the client UI and adapt it to suit a handheld environment. Some of the envisioned offload are: one-button selection of program streams; remembering client state from last use; aggregation of streams into a single stream to the handheld; instant buy button; instant share button.

9. Community Statistics Aggregation

The PeerPC 24 (together with the handheld) collects useful statistics that are then contributed to statistics on the media in the community. This enables a better collaboration on media selection.

Typical statistics collected by the PeerPC 24 include:
Number of views of particular content by location and time
Number of times a piece of content is shared
Number of simultaneous viewers for a real-time content
Peak bandwidth usage per user by location and time 10. Mashup The functionality here is to use signals such as (location, time, buddy presence, etc.) together with metadata from media to get an integrated experience that provides a multi-dimensional media experience such as:
media specific to a location
location-information related to a particular media
buddies that might be interested in a particular media
media that a buddy might like
etc.

11. Location

A very useful feature here is the concept of a "Personal Media Station". The point is to be able to support the notion of location-specific Internet media that is locally-generated by the users at a particular location. Thus, a user can "tune" in to a local PeerGroup and listen/view content that is specific to that location. The idea is that a "public" area is enabled for the PeerGroup content that can be accessed by someone in the vicinity. The location is keyed by the GPS-coordinates that is then used to access the PeerPC 24 serving the content at that location.

12. Presence of Contacts and Buddy Blast

This functionality refers to the detection of buddies online via their IM clients and the possibility of beaming them content that might be of mutual interest. Of course, a buddy might choose to remain inconspicuous mode and therefore not receive any Buddy Blast.

13. Ad Entertainment

Usually Ads are sent out to people without any relevance to their tastes, preference, location, etc. Moreover, the ads are pushed rather than pulled. This assumption is turned on the head in this feature where ads are selected by the user based on preference and then shown to pay for the service. Thus, metadata of the ad is used to match the user's taste, location, and style.

II. PeerServer

1. Authentication

The PeerServer 26 authenticates each client and registers each PeerPC 24. It is responsible for creating credentials including an encrypted expiry time that allows a client access to a PeerGroup in which it has membership.

2. PeerGroup Location

The PeerServer 26 enables a client to locate a PeerGroup by a process similar to DynamicDNS. Each PeerPC 24 registers and maintains a heartbeat with the PeerServer 26. It constantly updates the PeerServer 26 with its IP address which is subject to change from time to time. The client has to reach the PeerPC 24 via port 80. This should work by enabling the router to map port 80 requests to the PeerPC 24 via uPnP. In the case of older routers, the NAT Traversal (described below) is needed. In the short term, the PeerServer 26 can be used to relay requests back and forth.

3. Station List

The PeerServer 26 has a station list of Internet Media Sites with associated metadata that it uses to seed a PeerPC 24 that registers with it. In addition, this list could serve as a global PeerGroup (default) for clients that do not have a private PeerGroup.

The PeerServer 26 preferably maintains a list of PeerGroups that are currently registered as well as their status (ACTIVE/INACTIVE).

4. Statistics

The PeerServer 26 is responsible for aggregating statistics that are uploaded by PeerPC 24s as part of the on-going heartbeat. The intention is to provide global statistics on all media including ads and make it available to content owners and publishers in order to support marketing efforts.

Other statistics of interest at this level include PeerGroup sizes as well as distribution of content by location and time—very valuable to content publishers.

III. Client

1. PeerPC Authentication

A Client Handheld needs to initially authenticate itself with the PeerServer 26 via a well-known URL. A successful authentication will give it a set of credentials as well as the URL of the PeerGroup that it seeks to enter. The default PeerGroup is used when none is requested during the authentication.

2. Community Authentication

A Client must then seek to authenticate to the community PeerGroup that it seeks to access. This is achieved by presenting the credentials it received from the PeerServer 26 and via the URL that it also received from the PeerServer 26. Upon successful authentication it can gain access to the PeerGroup by getting the welcome page of the PeerGroup.

3. Getting Station List

A Client can get a station list from either the PeerServer 26 (via the default PeerGroup) or from the Welcome page of the PeerGroup it was trying to enter.

4. UI/Applet

A Client must display the java applet that it receives from a PeerPC 24. This applet implements the Welcome page of the PeerGroup and contains among other things several menus and lists that access the media hosted by the PeerGroup.

This is described under the UI section below.

5. Invoke Player

The Client must be able to invoke a media player to play the media hosted by the PeerGroup. One of the standard players such as WMV, QT, and Real are assumed to be available. In addition, the player could be invoked in the context of a browser frame in order to offer the PeerMeta controls as well as important features such as BuddyBlast and InstantBuy.

6. Statistics (Collection)

The Client must be able to collect usage stats as discussed earlier under PeerPC. These are generated even and held in memory even when offline in order to upload to the server.

7. Location Sensor

The Client must implement a location sensor via GPS (preferred) or via an alternative technique such as IP address or MD. The intent is to be able to locate the device in order to appropriately contextualize the ads as well the media playlists and personal media stations.

Service Building Blocks

The following system architecture exposes the underlying building blocks of the system. We describe service-centric and resource-centric views.

Service-Centric View

Figure 3A:
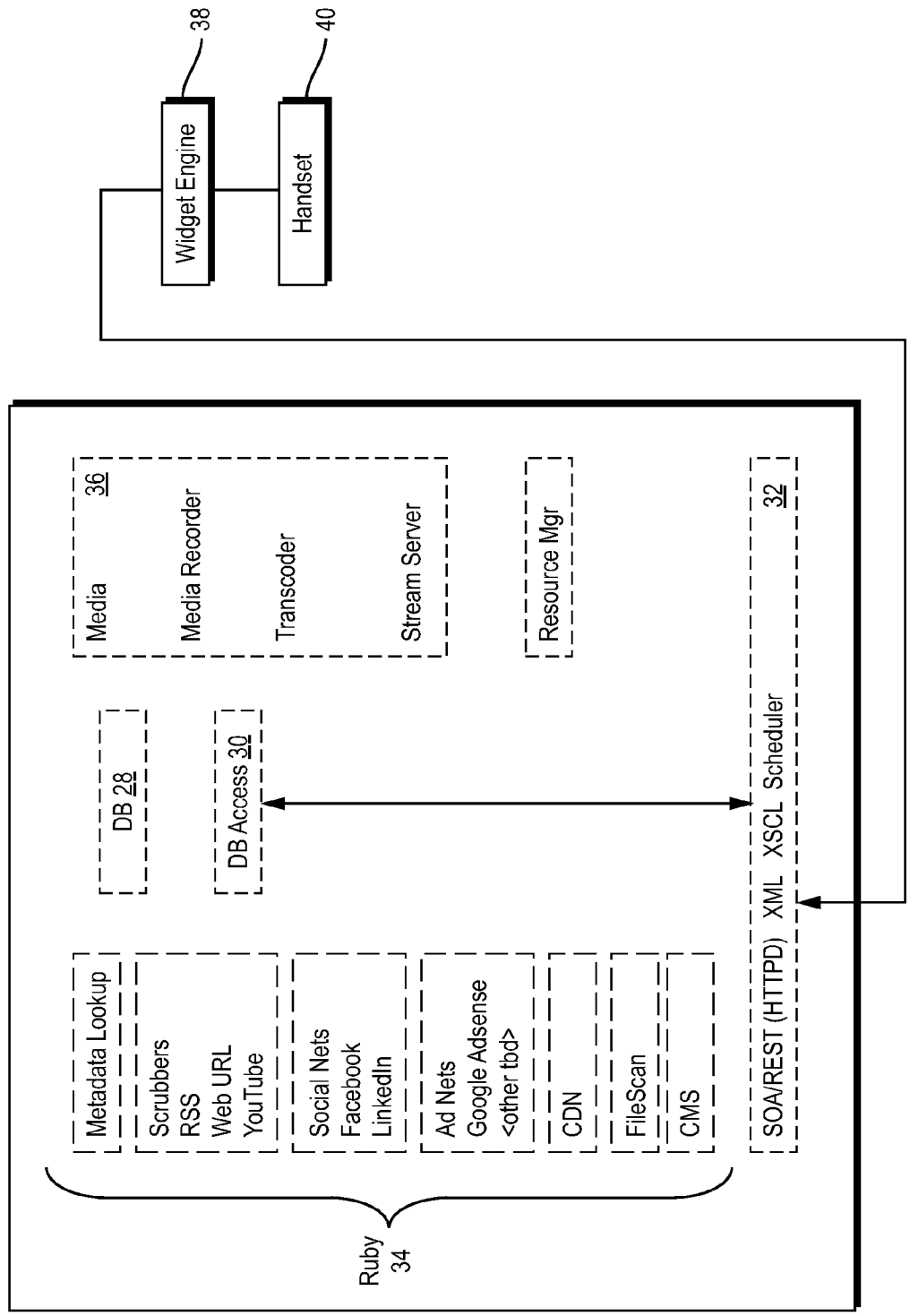
FIGS. 3(a) and 3(b) are schematic block diagrams of the system according to a service-centric view.
Figure 3B:
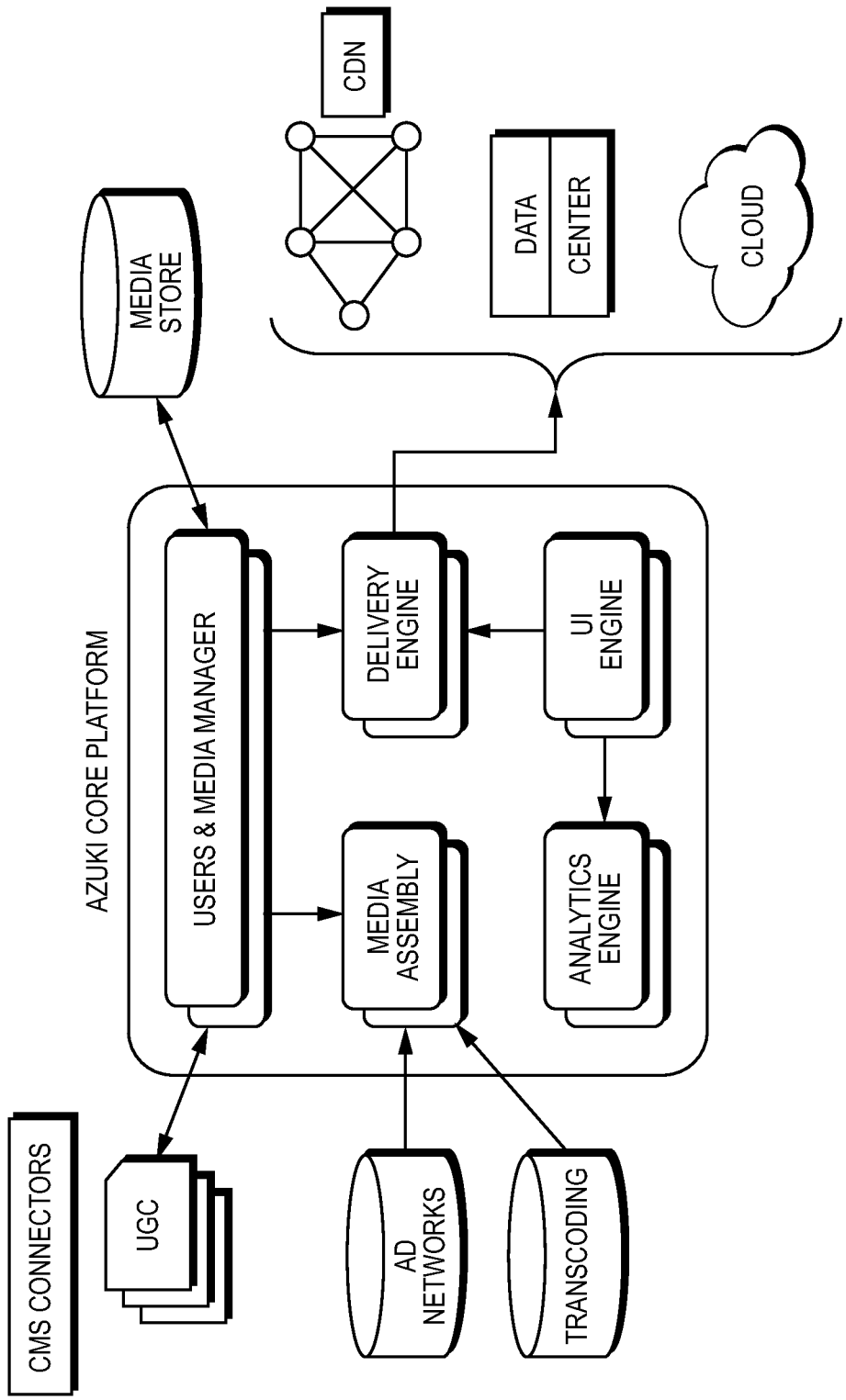
Figure 3C:
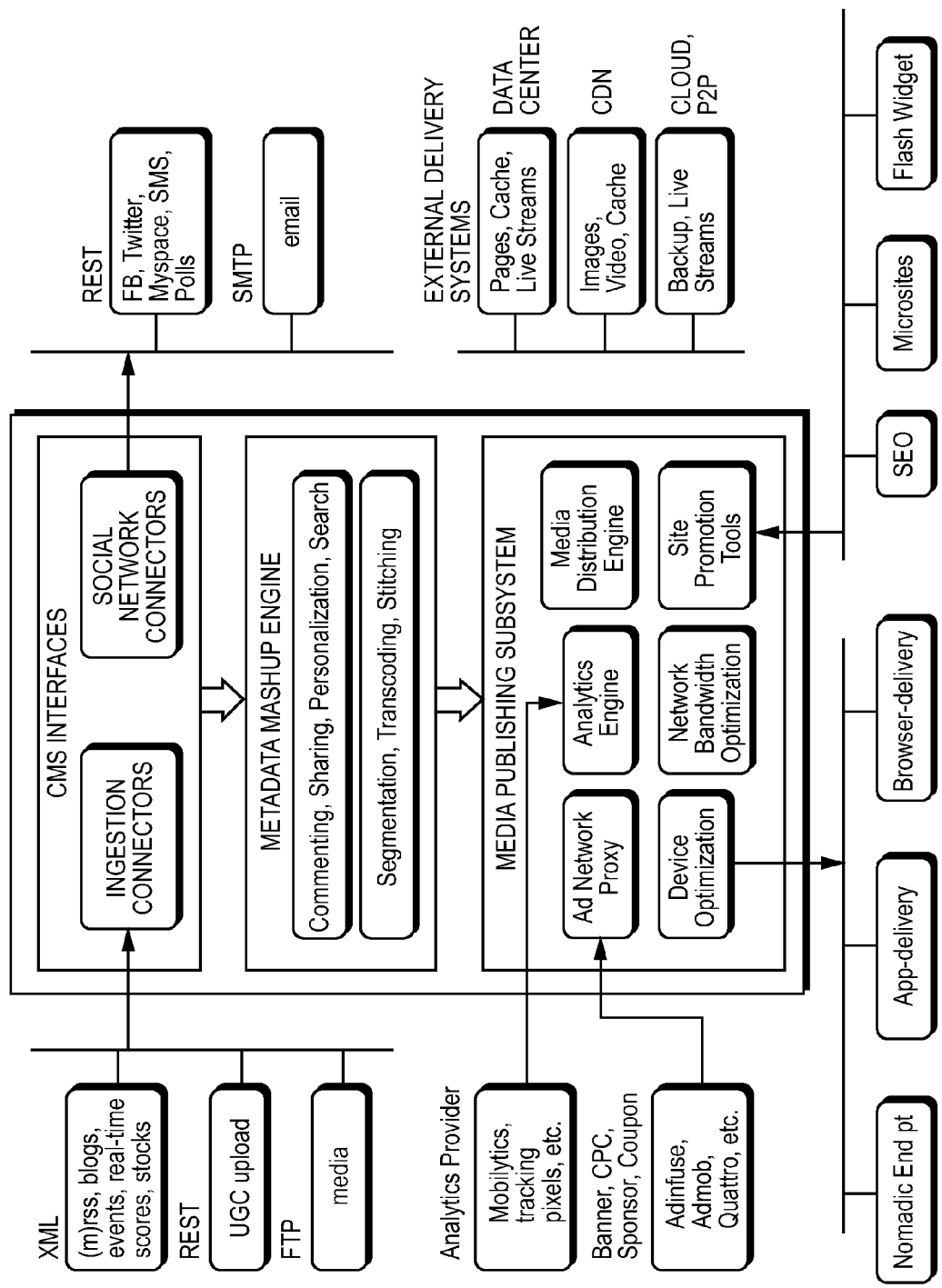
FIG. 3(c) is a schematic block diagram showing the main interfaces of the Mash Media Platform.

The service-centric view is illustrated in FIGS. 3(*a*) and 3(*b*).

The main portions of this diagram are the Database 28 and its DB access components 30 that are the interface to the database. This connects with the service-oriented architecture (SOA) component 32 that translates incoming representational state transfer (REST) requests to internal DB commands. The remaining major pieces are Ruby 34 and the Streaming Engine 36. The Ruby code 34 implements key service blocks of the system including any scrubbers (for metadata extraction), social networking interaction, Ad-network interaction, CDN (Content Delivery Networks), CMS (Content Management Systems), and interaction with the local file system for personal media discovery and cataloging. The Streaming engine 36 contains the components of the system and is described below in the hardware resource-centric view.

The widget engine 38 and the handset 40 are external to the system and interact via the SOA layer with the rest of the system. Thus, the UI on the handset 40 for example is a page that is constructed by the system and delivered in XML format to the widget engine 38 for rendering to display on the handset 40.

FIG. 3(*c*) shows the main interfaces of the Mash Media Platform: CMS and Publishing. CMS refers to the ingestion of content as well as social networking interactions. Publishing interfaces cover the media delivery as well as analytics and ad network interconnections.

Note the XML-based feed ingestion, the REST-based user-generated content (UGC) upload API and the FTP-based media ingestion. A content provider publishes a feed that the mash media platform ingests, and in this feed is a link to a media that is ingested via FTP. The UGC consists of user photos and videos that are uploaded via an API that enables the user to specify meta data.

The interfaces to the social networks are via REST or email.

The middle portion of the diagram depicts the functions of the mashup engine which integrates the various CMS inputs via keyword metadata matching and filters based on the personalization for user context. Segmentation of the media in to small chunks capable of being played on mobile devices, transcoding to appropriate formats, and the stitching of ads to video are all done at this point.

In the media publishing subsystem, the page and media are delivered to the end points based on the chosen delivery method: data center, CDN, or Cloud/p2p. The analytics interfaces enables third party verification of site visits. Ad network interfaces provide delivery of ad banners, cpc, etc. as well as video ads.

As mentioned elsewhere, the system is based on a Model-View-Controller paradigm where the Model is described by the state of the various media objects cataloged by the system in its media metadatabase. The View is synthesized based on user filters and the current end user context. The Controller is SOA (on behalf of the widget engine) and it issues commands to the database to as well as the media block to start and stop streams chosen by the end user.

It is useful to consider the flow of control through the system for each of the functions described above. Thus, will examine each of these in order and understand the implication from a system standpoint. Along the way, we will understand the implications from software library support.

Authentication

Authentication begins at the client browser GUI which is started in response to the client selecting a URL from an SMS message (in response to a buddy invite) or by launching the browser and navigating to the PeerMeta PeerPC link. In both cases, an http request is sent to the Seed PC which in turn redirects the request to the appropriate user PeerPC 24 (which may belong to a friend in the case of a buddy invite). The http request received by the web server is passed to the SOA component that in turn calls the Ruby library to authenticate. The results are returned via the SOA to the client. In the case of a successful authentication, the result is a 256-bit key that encodes the following: the client id, the session id, the client context including device, network, and activity.

Media Discovery

The desktop or host browser GUI is used to create a user-defined filter for media. This filter is a set of key-value pairs that indicate the user's preferences. Examples are "Genre=Drama" and "Year=1997", etc. The filter is associated with a URI that points to a media catalog from which content is to be selected for the end user. The selection remains in effect until the user changes the selection. Any number of filters may be setup for any number of content catalogs each identified by the URI.

The filters are passed on by the SOA to the data base in appropriate set of database calls. The user and context information are derived off the key. After storing in the database, the ruby scrub library is called together with the media filter information. The results are returned in XML media RSS format which is then stored in the database. This is described in the following XSCL snippet.

```
<storedb>
    <mediaFilter>
        <URI id="http://cms.yahoo.com"/>
        Filter:{
            "Genre"="Drama",
            "Year"="1997"
        }
    </mediaFilter>
<rbscrub>
        <mediaFilter:uri id=" http://cms.yahoo.com"/>
</rbscrub>
</stored>
```

Customized Playlist

Each client sees a customized playlist when he logs into the system. This playlist is the one that is customized to his preferences and context. It contains all media types including audio, video, blogs and photos that meet his filter criteria. The filter criteria could include in addition to keywords other rules including ten most recently viewed by my friends, top ten for the past month, all time top ten and so on.

On clicking on the playlist, the user is taken to the appropriate media and shown with contextual ads.

Media Markers

A media marker is a time interval indicated by start and end times relative to the beginning of the media. One or more media markers could overlap completely or partially. Markers are an artifact of the system data model and represent a navigable portion of a larger piece of media that may be commented on and shared via BuddyBlast with others.

Stream Mashup

Before a clip is delivered to the end user, an appropriate pre- or post-roll ad is stitched to the clip. This is accomplished using the notion of a stream mashup where multiple clips are "stitched" together dynamically before serving to the end user. To be able to achieve this mashup seamlessly, the source clips are previously transcoded to the same video format, bit rate and resolution. This guarantees that the target clip will play out seamlessly for any mobile device.

Other types of stream mashups such as the radio station mashup require different mechanisms for ingesting content from various sources and for mashing up the content before playing to the user. The mashup may let the user choose to switch between simultaneous content or time-shift one or more for viewing later.

Another type of stream mashup is the aggregation of comments related to a particular spot in the media identified by a media marker. The marker serves as the anchor for sharing and socializing around that portion of the media. This is considered as a mashup of social networking and media.

The stream mashup function is carried out in the Front End and the Mashup Engine of the system. The latter is used for the stream stitching for pre- and post-roll video advertisements while the former does the rest of the mashups.

Contextual Ad Insertion

Contextual advertisements are a sub-case of stream mashup. The metadata around a media or comments around the corresponding markers are used for selection of the most appropriate advertisement for the mashup. Other contextual hints include personal preferences of the viewer (identified by the cookie or recent user navigation) and location/time. Note that location can be detected accurately only in the case of an installed application. Otherwise, the best practice is to query the user for zip code or city. This information is then used to determine more context-specific advertising.

Usage Analytics

Every ad that is streamed is logged in the syslog for post-processing. The usage analytics are aggregated for delivery to the ad networks. In addition, the individual content metadata are added to a user's personal profile for personalized content discovery.

Personalization

Personalization is done by a specialized database that classifies content on ingestion into various play-lists that represent user preferences and other contextual hints. A user request for a personalized playlist maps into one of these ready-to-go playlists based on the closest match. The lookup is based on a attribute-based routing where attributes are organized into a tree based on user preferences. Thus, every new user registration or other user-preference discovery event could result in the creation of a new branch of the preference tree.

The order of attributes in a search path is based on request structure and multiple paths may lead to the same playlist. The duplication of nodes does not significantly increase the storage requirements of the playlists.

Activity Stream

The activity stream is the set of media interactions of a user and his friends. This includes media comments, viewing, and sharing. The system can publish into and out of an activity stream from/to external web sites. This enables the creation of more contextual media experiences including advertising.

Social Networking

The system enables a user to connect to multiple external communities via connectors that are customized to the specific external community. This includes Facebook, LinkedIn, MySpace, etc. The connectors enable user information to be imported into the PeerMeta system as well as activities from the user's activity stream to be exported into the appropriate external community.

Media Circle

A Media Circle is a subset of a user's friends that is dynamically selected based on some contextual selection criteria such as the metadata of a certain media that is to be shared, the location, time, activity, etc. Each user can dynamically create any number of Media Circles and blast a media reference to the friends in the Media Circle. Note that a Media Circle can overlay friends from multiple external communities such as Facebook, MySpace, etc. In addition, a Media Circle is created centered around the sender.

Details of Buddy Blast

Buddy blast is defined as—the dynamic stream-aware clipping and forwarding made possible using a combination of techniques including automatic segmentation of clips that enables the buddy blasts of specific portions of media from within a media object.

A user may at any time while playing a piece of media decide to share it with a media circle. This is achieved through the unique method of content ingestion and preparation described below in which the media are segmented into chunks based on time from the beginning of the clip.

Media Segmentation

Figure 4:
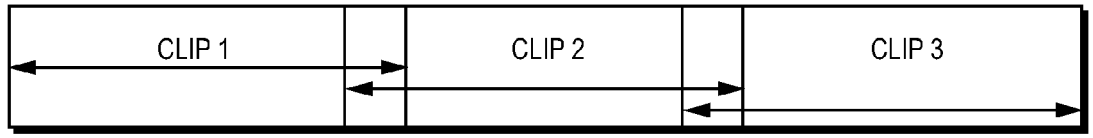
FIG. 4 illustrates segmentation of media clips.

Content is ingested into the system via "connectors" that connect to external content management systems (CMSes) and download content via media RSS feeds or ftp. Any video ingested is automatically segmented into fixed size (e.g. 30 sec) long clips in overlapping pieces as illustrated in FIG. 4.

Note that there is an audio fade in/out at the beginning/end of each segment. It has been found by experimentation that a 30-second segment length is adequate to capture a highlight such as a jump shot in a basketball game while it is short enough to play on most phones including low-end phones. Also, this segment length is long enough to cover the response time from the time of interaction on the web-based UI to the time the server responds.

After segmentation, the clips are transcoded into multiple target formats such as wmv, mov, and 3gpp, with a bit rate for example of 350 kbbp and resolution of 320×240. The transcoded segments are stored in the media cache for later reference.

Figure 5:
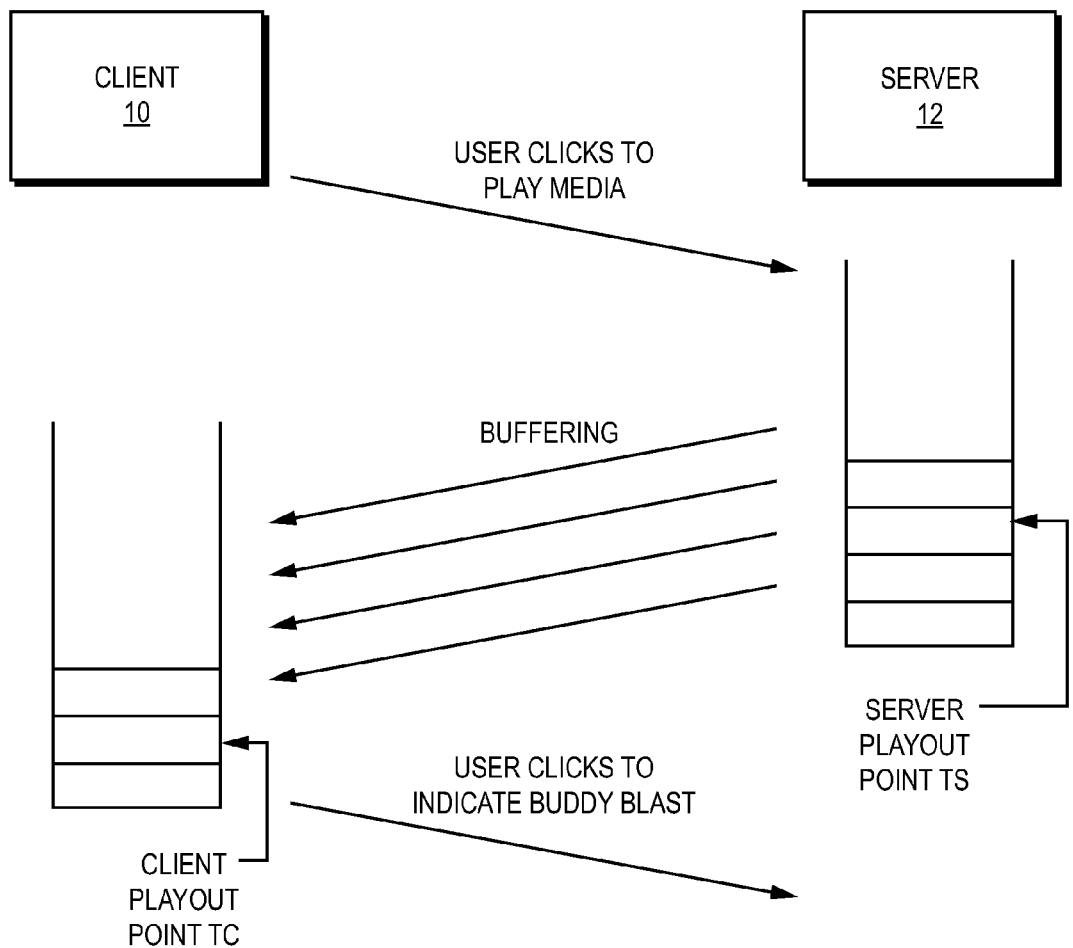
FIG. 5 illustrates interaction between a client and server.

The interaction between the client 10 and server 12 is illustrated in FIG. 5. Note that when the user clicks to indicate that he wants to buddy blast, the client playout point tc is behind the server playout point ts, (ts−tc)<30 seconds, and therefore the system can accurately determine the media clip that the user wants to share.

Media References

The reference to these segments are via markers which denote time intervals of the media object where time is the run-time of the media object. The reference to the marker is via a URI as in:

http://x.y.com/123?marker=[5,9]

which defines the marker from time 5 to 9 seconds of the media identified as 123 in the given URL. The times are relative to the start of the media. This reference uniquely identifies the media file by using a unique media ID together with the starting time value such as:

AB1223CDF2454495666112333544_5.3gpp where the unique media ID is derived off the MAC address, processor id, and ingestion time.

Retrieving Media Comments

Figure 6:
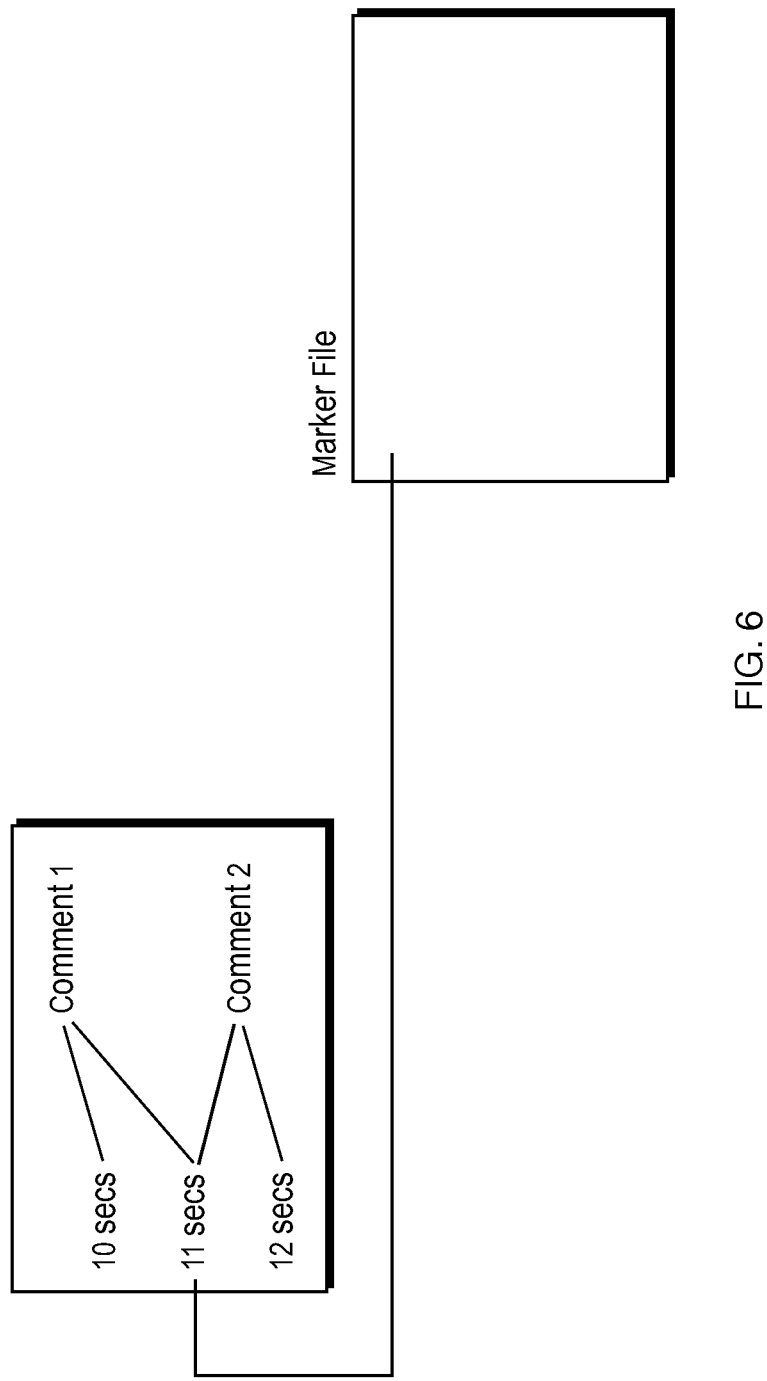
FIG. 6 shows a tree structure of references to media objects.

The markers referencing a media object is stored in a file where the path name corresponds to the hierarchical tree structure corresponding to the named-attribute values (in a fixed attribute order). This is illustrated in FIG. 6. Thus, a media defined by "genre=action; actor=ford; year=1980" would correspond to the file path //action/ford/1980. This allows for quick lookup of the media avoiding costly database lookups.

The path lookup points to a metadata file containing the markers of the media file ordered by starting time. At each of these lines is a pointer to a starting time position in a time-ordered comment index file where each line corresponds to a time in the media file and contains pointer to all comments that cover that time. Each time a new comment is added, all the lines corresponding to the times spanned by the comment are updated. When looking up comment density for a time interval, a single pass through the file between the starting and ending time positions will yield the total comment count. This system is a file-based logical database for comments and markers. It has the advantage of rapid lookup and replication/distribution. The files can be held in a RAM-disk for fast access.

Note at the highest level is the entire media object with the next level markers below it corresponding to the second largest span of time intervals. Below each of these markers in the tree are the ones contained inside the span of the parent marker. All these are represented by the system described above.

In another embodiment, the comments are held in a relational database and the markers are held in a different database. Each time, the media object is pulled up, the comments come up and from there the markers. To get the density of comments, one would have to walk through the database and find all comments that apply within the span of a marker. Similarly, the attributes of the media are keys used to lookup the media.

Device Context Detection

The system has intelligence to perform device detection to determine the format of the media, length of the media and type of delivery (streaming or download) that a particular handheld client device 10 can handle. This allows the system to send, upon request made from the recipient, a representation of the media compatible with the client's device is delivered to the client and contextualized by advertisements associated with the recipients current location, time, and interests. In another embodiment, the client request is routed to a data center that is ideal in relation to the client in order to satisfy the request based on the client's location. In addition, media that need to be assembled before delivery are "mashed up" or combined together, such as in a pre-roll ad, based on specific mashup-rules that enable the creation of a final representation of the media object.

The request from the buddy is analyzed to detect the client mobile device and the corresponding action is taken as described for example in the following table.

|   | Window Mobile 5 | Windows Mobile 6 | Symbian S60 | Symbian S40 | Brew |
|---|---|---|---|---|---|
| Sprint WAP - EVDO | Http Progressive Download | Http Streaming | n/a | n/a | RTSP streaming |
| Verizon WAP - EVDO | Only photos, blogs | Only photos, blogs | n/a | n/a | n/a |
| ATT WAP - GSM | Http Progressive Download | Http Progressive Download | Http Download and play | Http Download and play | Http Download and play |
| Vodaphone - GSM (3G) | Http Progressive Download | Http Streaming | RTSP streaming | RTSP streaming | n/a |
| Other GSM | Http Progressive Download | Http Progressive Download | RTSP streaming | RTSP streaming | n/a |
| No WAP | Http Progressive Download | Http Streaming | RTSP streaming | RTSP streaming | n/a |

Media Mashup

Other context detection devices include the detection of user behavior by recording the keywords of media that he is watching in a keyword tag cloud. Later, this cloud is checked against potential advertisements that may be mashed together with the media. The tag cloud is organized such that each tag has an associated set of related keywords. Thus, car could be associated with tires, insurance, etc. Then, when a car media is played, the pre-roll ad could come from auto insurance or tire company.

The ads are ingested into the system in two manners depending on whether they are banner or video. The following algorithm describes this media mashup.

Step 1. Periodically (interval is configurable), video ads are ingested into the system from an external ad server (of an ad network or content provider) as follows:

a. A REST API is called using some presumptive contextual keywords (examples are activity—golf, tennis, baseball, swimming, movies, etc.; location—Boston, NY, LA, Chicago, etc.; time—morning, evening, thanksgiving, memorial day, Christmas, etc)

b. The ad-server returns a list of video ads together with keywords that may be used to contextually place the ad c. The system ingests the video ads and transcodes them to multiple formats as described above under general video content ingestion.

Step 2. On a request to play a video, the system determines the user context based on time, location, activity—based on the content viewed by the user. This is performed by the front end system in conjunction with the database.

Step 3. The front end then invokes the mashup engine and passes it the user device context as determined by the User Interaction engine. The mashup engine invokes the stitching function of the video transcoding tool which demuxes video and audio, stitches the two and muxes the result into a single stream.

Step 4. The resulting stream is delivered to the client based on the device/carrier capability matrix as shown above.

Fair Use

The system provides a means of sharing that enables a user to remain within the bounds of fair use yet enables him to let his friend sample the media. This scheme is called the "N×M" scheme which loosely refers to the fact that it is acceptable to share up to N times with at most M different friends. Using these parameters, it is possible to come up with a range of sharing schemes. These are described below.

DRM Use Case 1a n Times

User A acquires media M and puts it in his media library
1. He invites friend, User B, to listen to M on his WSE.
2. User B receives the message and gets media M streamed from A's WSE to his handheld.
   This counts as one time (out of a max of n times).
3. User B is not allowed to get the stream more than once without having to request it from User A again explicitly
   User B cannot save the stream
   Also, User B cannot further stream the media out to anyone.
4. User A may similarly invite other friends to listen.
   The total listening count however may not exceed n.
   If he invites more than n friends, some of the them may not be able to listen to the content

DRM Use Case 1b m at a Time

User A acquires media M and puts it in his media library
1. He invites friend, User B, to listen to M on his WSE.
2. User B receives the message and gets media M streamed from A's WSE to his handheld.
   This counts as one time (out of a max of m simultaneous listeners).
3. User B is allowed to get the stream more than once
   User B cannot save the stream
   Also, User B cannot further stream the media out to anyone
4. User A may similarly invite other friends to listen.
   The total simultaneous listening count however may not exceed m.
   This count includes User A if he is listening.
   He may invite more than m friends knowing that only some of the them may actually listen simultaneously

DRM Use Case 1c k Peers

User A acquires media M and puts it in his media library
1. He invites friend, User B, to listen to M on his WSE.
2. User B receives the message and gets media M streamed from A's WSE to his handheld.
   This counts as one peer (out of a max of k peers).
3. User B is allowed to get the stream more than once
   User B cannot save the stream
   Also, User B cannot further stream the media out to anyone.
4. User A may similarly invite other friends to listen.
   The total number of unique listeners (identified by IP address/Port number) however may not exceed k. This count includes User A if he is listening.
   If he invites more than k friends, some of the them may not actually be able to listen to the content

DRM Use Case 2a s PCs

User A acquires media M and puts it in his media library
1. He sends link to media M to friend User B.
2. User B receives the message and downloads media M to his WSE
   This counts as one copy of WSE (out of a max of S PCs).
3. User B is restricted from sharing media M.
   He might however still have limited sharing via streaming
4. User A may similarly share media M with other friends
   The total number of unique friends (identified by IP address) however may not exceed s. This count includes User A's PCs.
   If he invites more than s friends, some of the them may not actually be able to get the content

DRM Use Case 2b

Streaming to s Friends

User A acquires media M and puts it in his media library as a NRT stream
1. He sends link to media M to friend User B.
2. User B can receive the stream from User A.
   User B cannot save the stream
   Also, User B cannot re-stream it to anybody
3. User A may similarly share media M with other friends
   The total number of unique friends (identified by IP address) however may not exceed s. This count includes User A's PCs.
   If he invites more than s friends, some of the them may not actually be able to get the content

DRM Use Cases

DRM types
   Free - Case 0
   Limited Share
   (the following Cases all apply together)
      Share 'n' times - Case 1a
      Share 'm' at a time - Case 1b
      Share among 'k' peers - Case 1c -continued > Restricted
> (the following Cases all apply together)
> Share 's' PCs - Case 2a
> Streaming-allowed - Case 2b Media Circles These are dynamic groups for sharing based on attributes for sharing instantly among friends selected by metadata attributes (interest, location, etc). The groups are dynamically selected using the interests of the media selected for sharing as a key to match the interests of the friends. The results of the match are then selected for sharing the media. The media circle is personal in that it reflects the group of friends associated with the sender.

These lists of friends are kept sorted using a mechanism similar to that of media comments, viz., a directory structure where the path indicates the categories that define a contextual filter to be applied in retrieving a particular media circle. The media circle itself is stored in a file. For example, one set of filters could be movies/action/ford to find all friends with interests in a particular type of media; another one could be August/France to find friends who might be in a certain place at a certain time.

1. Any time a person' preferences or context changes, the media circles of all his friends are updated accordingly depending on the change.
2. The procedure for updating is to first find the media circles with the old condition and then modify those circles under the new condition.

Personalized Playlists

Figure 7:
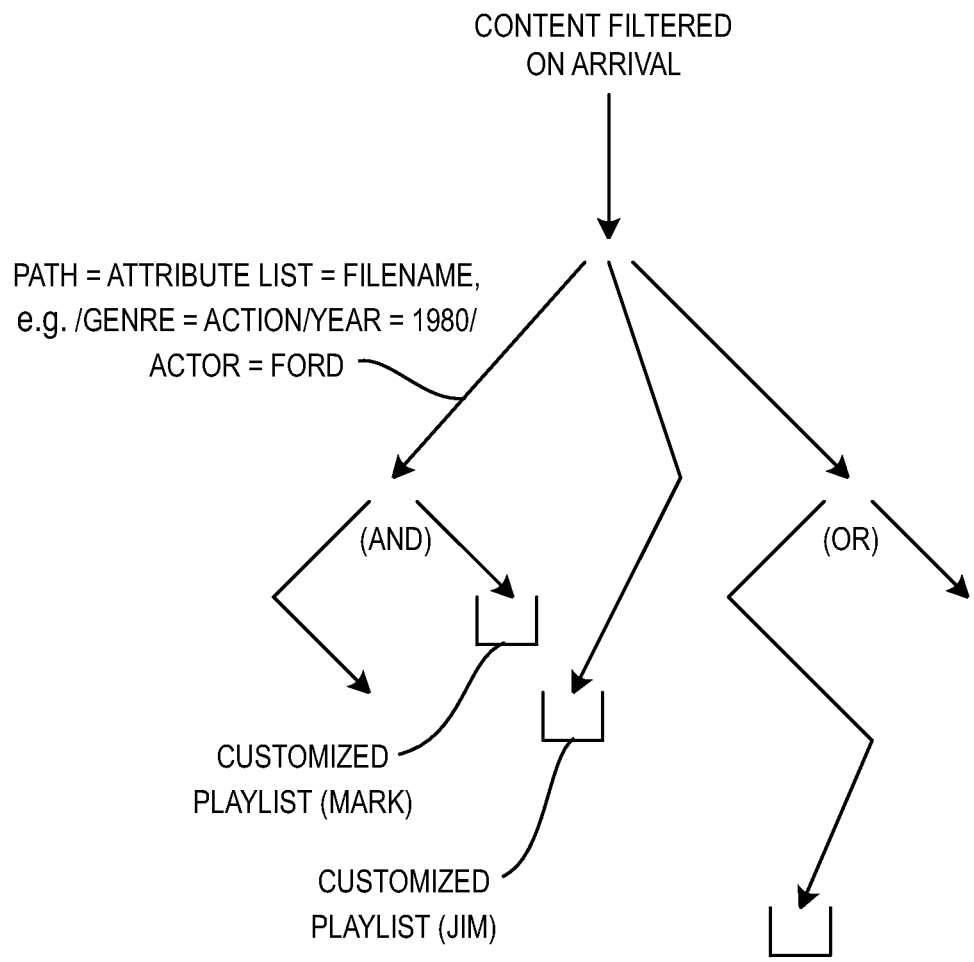
FIG. 7 illustrates filter evaluation.

The notion of being able to view in a single playlist media of different types is termed as "Media Mashup". This capability is provided by filtering content based on metadata attributes that match user preferences. This is accomplished either by on-demand database query or by continuous filter evaluation described below in reference to FIG. 7.

A tree of filters is placed on one or mode underlying computers where content flows continuously over the tree and the information is dynamically sorted over the tree. The system of hierarchical filter elements are used to continuously evaluate and classify newly arriving media as well as events into a hierarchical structure of filter expressions where each node is an "AND" or "OR" condition. An AND node may correspond to the case where a content could simultaneously satisfy multiple conditions such as the actor could be "Ford" AND "Thompson". On the other hand an OR node may have one pathway, such as the year could be "80s" OR "90s" but not both. The results of the filters are buckets that collect objects that meet the specific criteria of the filters.

The algorithm is as follows:
1. At each node, if it is an AND node then
   1. For each child, the content is filtered
2. If the node is an OR node then
   1. Select the child to filter the content At each branching node, information flows over all the branches or one branch depending on whether the node is an "all" or "one" type of node. The resulting structure is a tree of playlists that are continuously evaluated against new content and enables instant personalized playlists. In addition, new playlists can be formed by either merging or splitting existing ones. Also, by re-evaluating against all content run so far over the tree.

Note that in one embodiment the file system is used to represent the tree as done earlier in the case of markers.

A specific combination of filters corresponds to a path in this tree. The lookup is via a single DB access whose key corresponds to a path in the tree. In addition, the key may be partitioned into smaller pieces where each piece corresponds to a separate DB and a lookup corresponds to multiple lookups in different databases in sequence. At any time, a pointer to the playlist file yields the customized playlist that might be chosen by one or more persons.

Hardware Resource-Centric View

Figure 8:
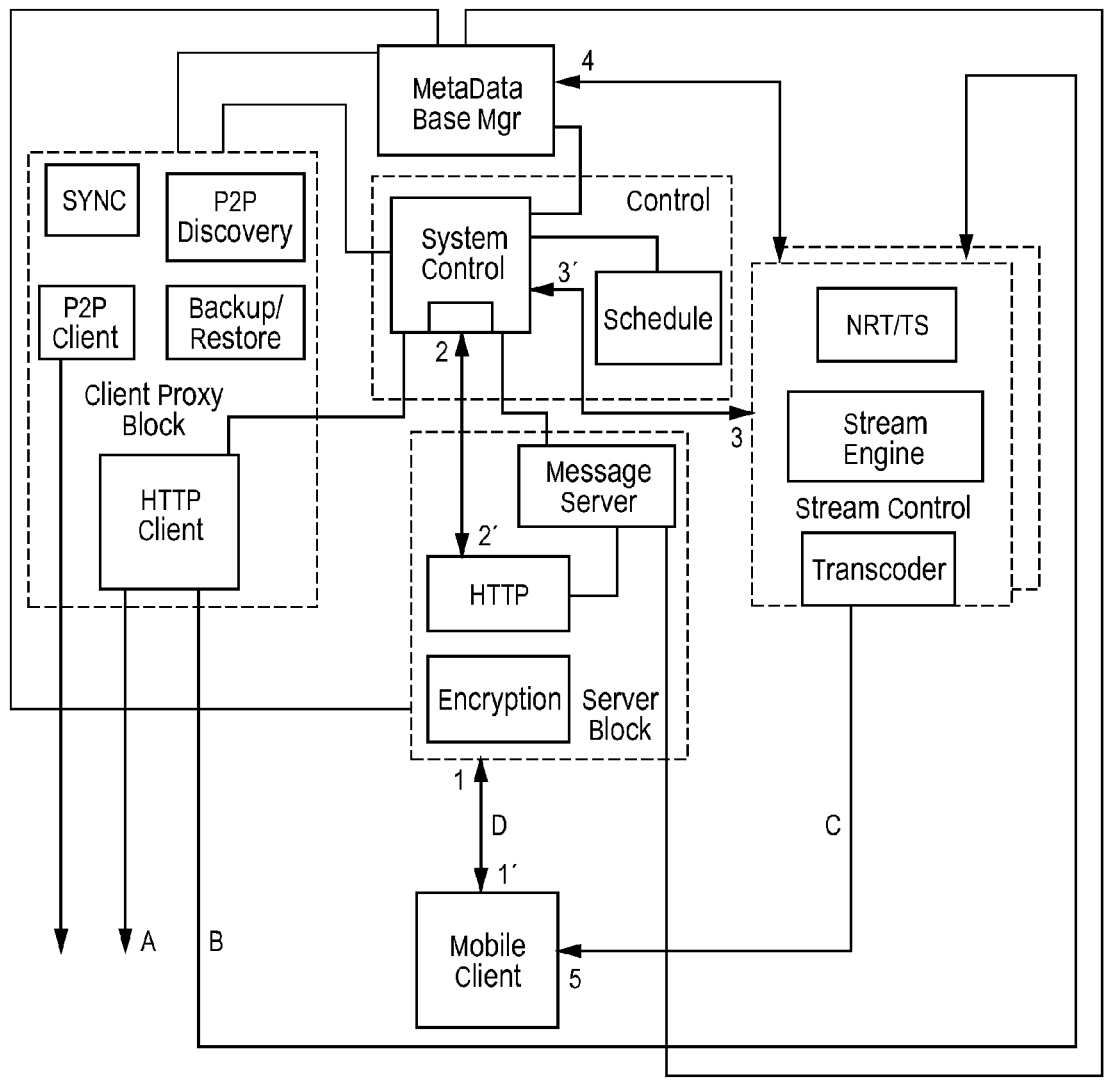
FIG. 8 is a schematic block diagram of the system according to a hardware resource-centric view.

Next, we describe a hardware resource-centric view with reference to FIG. 8. Note that the arrows at the bottom indicate external inputs/outputs. An alternative embodiment employing multiple boxes where each of the main functions (User Interaction Engine, Front End, Database, Ingestion Engine, Mashup Engine, and Streaming Server) are split out to individual boxes is described later.

Explanation of Interfaces

The letters correspond to the external interfaces of the system:

A—This is the interface for the P2P service including discovery, sync, and backup;

B—This interface is used by the HTTP client to scrub web sites for media metadata;

C—This is the interface for delivering media streams to the client;

D—This interface is the one used by the handheld to connect to the PeerPC's services including browsing context-specific scrubbed content and community content received from peers.

Theory of Operation

<MediaPlay>
1. The handheld client 10 contacts the PeerPC 24 via an http request which is handled by the http server in the PeerPC 24.
2. This results in a signal to the System Control to orchestrate the resources to deliver the desired service.
3. One of the first things to do is to contact the Stream Control Module (SCM) (creating one if one did not exist) to get the resources to meet the client's request.
4. The SCM in turn contacts the Metadatabase to find the media that matches the present context.
5. The located media is then streamed to the client.
   Note: CGI checks with System Control and if ok accesses the MetaDataBase and we get data to send back to the handheld.
</MediaPlay>
<Scrubber>
1. In a loop paced by the System Control do:
   1. Schedule events (learned from Configurator via Scheduler/System Control) in the MetaDataBase
   2. Once a minute, scheduler
      1. Tells SystemControl about the event
         1. If Scrub, go to HTTP client and put results in MetaDataBase
         2. If Record, go to SCM
</Scrubber>
<Sync>
1. Scheduler wakes up to sync and tells the System Control.
2. System Control tells the P2P client
   1. Synchronize with other Peers
   2. Backup
   3. Discover peers
3. Result goes back to MetaDataBase
   Note: This P2P client used to also scrub on behalf of other Peers.
</Sync>
<Chat>
1. Chat request comes through HTTP server.
2. Then, chat server checks with SystemControl
   1. Record what is sent to the MetaDatabase
   2. Check for your own messages
</Chat>

Multi-Box Functional Description

Figure 9A:
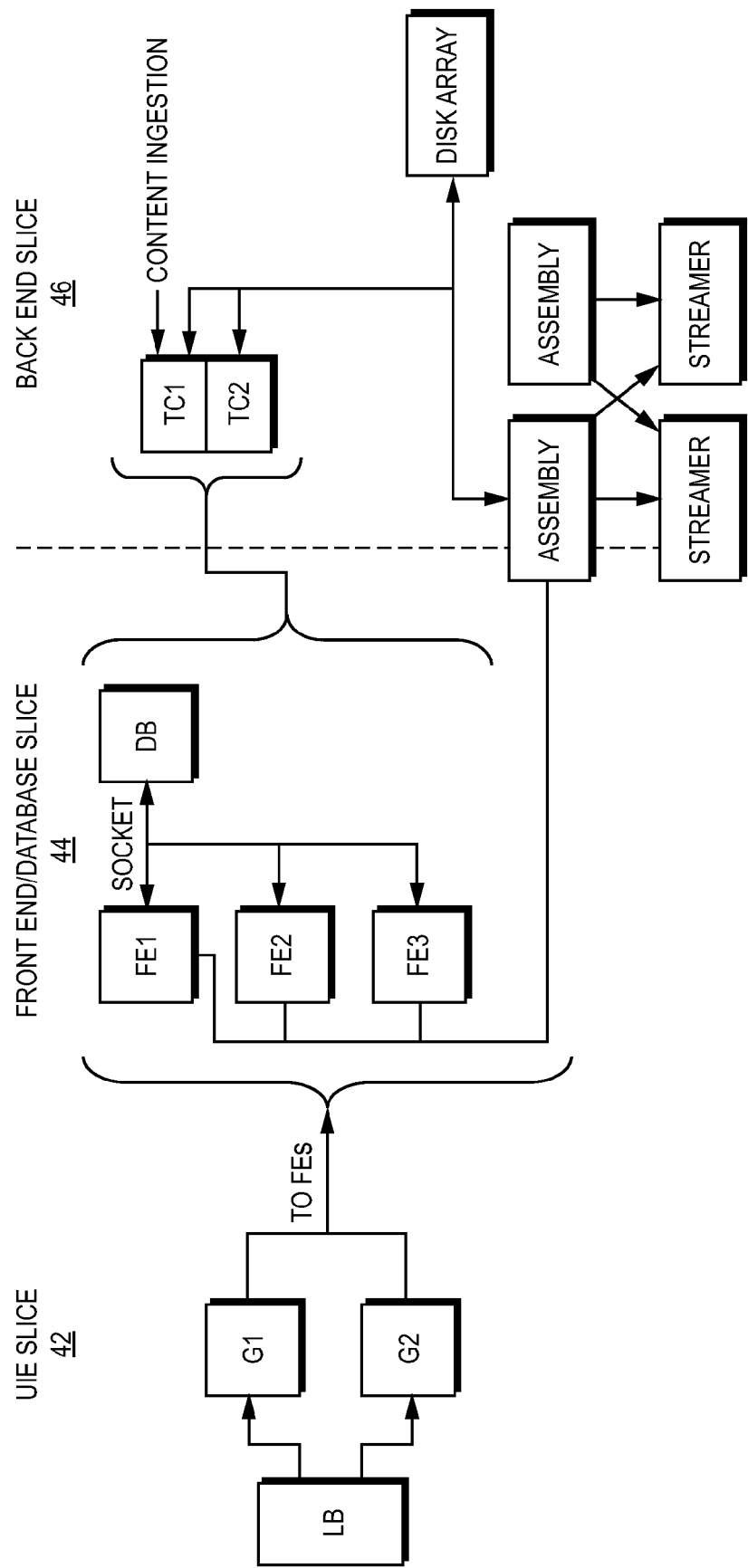
FIGS. 9(a) and 9(b) are a block diagrams showing major functional components of the system.
Figure 9B:
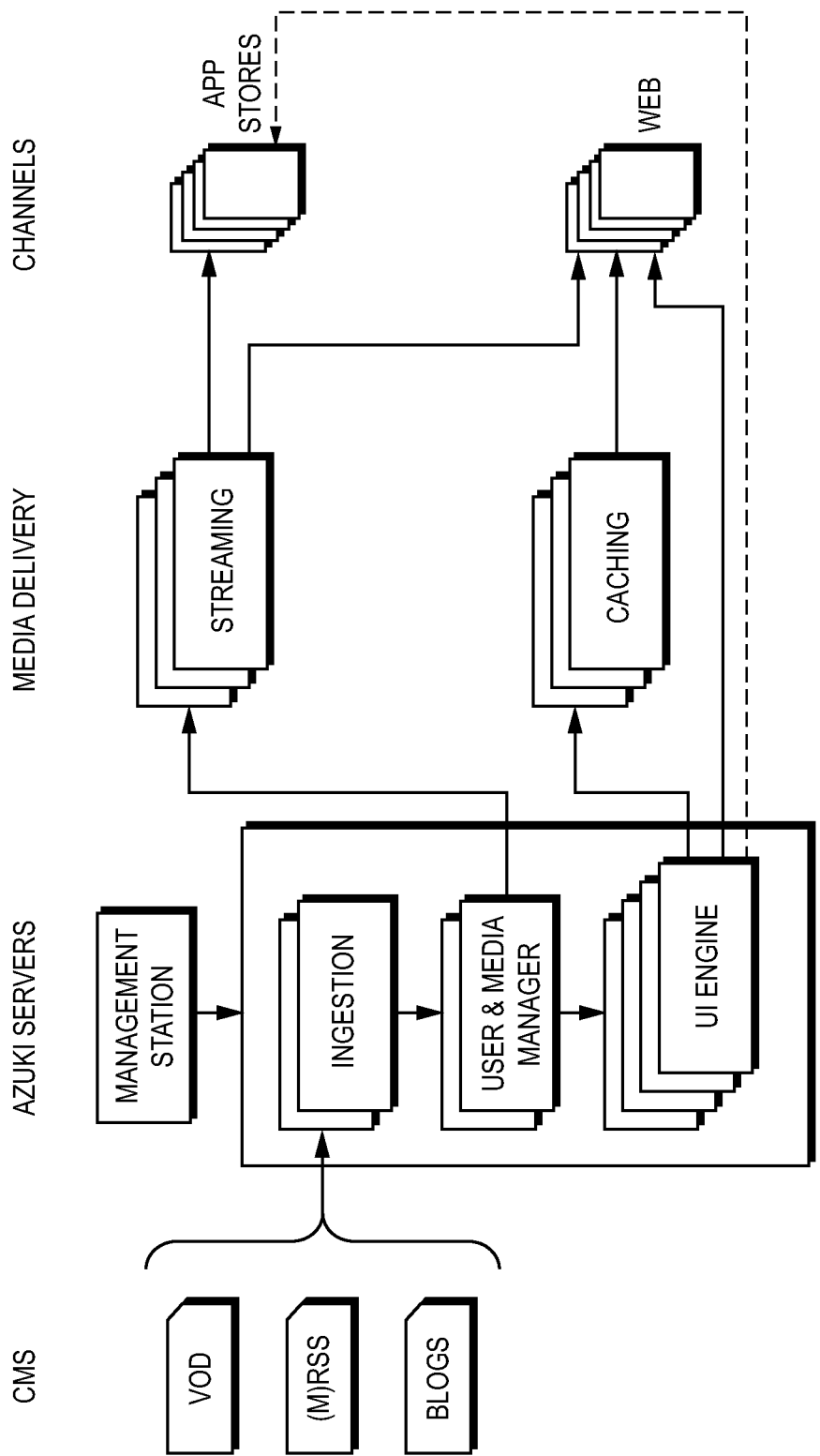

FIGS. 9(a) and 9(b) show the major components of the system in a clustered configuration. The deployment is used in a single datacenter and can be cloned to multiple data centers.

Referring to FIG. 9(a), there are three slices including the User Interaction Engine (UIE) slice 42 that handles the user interaction; the frontend/database slice 44 handles all user preference and content navigation logic (note that the Database slice consists of a load-balanced MySql cluster); and the backend slice 46 handles all content ingestion and preparation including assembly or mashup.

In the UIE slice 42, an L5 load balancer LB with session-stickiness load balances the UIEs. These UIEs are connected to the Front End engines FEx by a redundant switch-based infrastructure. The Front End engines are in turn connected to the Database slice 44 also via the redundant switching fabric.

The Front End slice 44 is connected to the Backend slice 46 containing multiple assembly engines and ingestion engines via another redundant switching infrastructure. This generally requires that each Front End server have two interface cards. The Ingestion and Assembly engines are used in a compute "farm" type of configuration.

Note that in FIG. 9(b) the database is shown as "User and Media Mgr". The management station is also shown. Reference 41 refers to a deployment where the media delivery is via the CDN servers.

Ingestion Engine

The main function of the Ingestion Engine is to import external media into the Mashmedia system. It is also responsible in cleaning out old media from the ingested content disk array.

The Ingestion Engine invokes transcoders TCx to produces video files with specified format to the master disk array. After transcoding the media, the media database is updated. Multiple Ingestion Engines can be started to improve transcoding overhead.

Multiple types of ingestion are supported including:
ftp with CSV—
    where the configuration points the system to an external ftp server from which content is ingested together with a CSV file that contains the metadata of the content
http with media RSS—
    where the media RSS contains the links to the actual content files and can access all content (not just updates)
potentially other interface—
    preferably with extensibility to support newer ingestion methods Database Server The Database server stores:
User profile
Meta data of media The strategy here is to use combination of SQL database and file system to support our data model.

High-frequency operations are streamlined using in-memory (RAMDISK) file-based datastores and by batching operations to achieve high cache hits. This data store holds the:
Play count of media
Markers
Comments
Analytics on user behavior Frontend Server The main function of the Frontend Server is to process SOA API. The SOA API is a restful API, i.e., the system is stateless and requests can be directed to any available server without any state having to be transferred on the backend. This allows the system to scale to a large number of simultaneous users. The SOA API handles all user transactions including authentication (if needed), playlist requests, Click-Zoom navigation, media play requests, marking and commenting on tiles.

The Frontend Server also calls on the backend components such as the assembly engine, streaming server and database to mashup and serve the content. Other operations of the frontend include connections to social networks.

Assembly Engine

The main function of the assembly engine is to mashup media files such as stitching pre-roll ad to a media file dynamically to produce a final files that is ready for the stream server.

As new media arrives, the Assembly Engine imports new media from disk array and after preparation places the final data object in the flash drive. As disk is getting full, older, less used media is removed from the flash drive. (Note: A copy of the original media is always in the disk array.)

Stream Engine

The stream engine support HTTP streaming, HTTP Progressive download, HTTP download and play, and RTSP streaming. Note that a mobile device only plays by a specific method. For example, Windows mobile devices only support HTTP streaming or progressive download. Likewise, Nokia phones only support RTSP. All phones support download and play when bandwidth is insufficient for streaming The Stream Engine takes URL with filename, which is in the RAM disk. It simply plays out the file. Based on the prefix of the request, it decides which streaming protocol to use. The device and capability detection are done by the UIE (User Interaction Engine).

The HTTP server has specialized connection pre-loading to ensure a quick response. The RTSP server may be a Darwin server.

Message Flows/Call Flows

Figure 10:
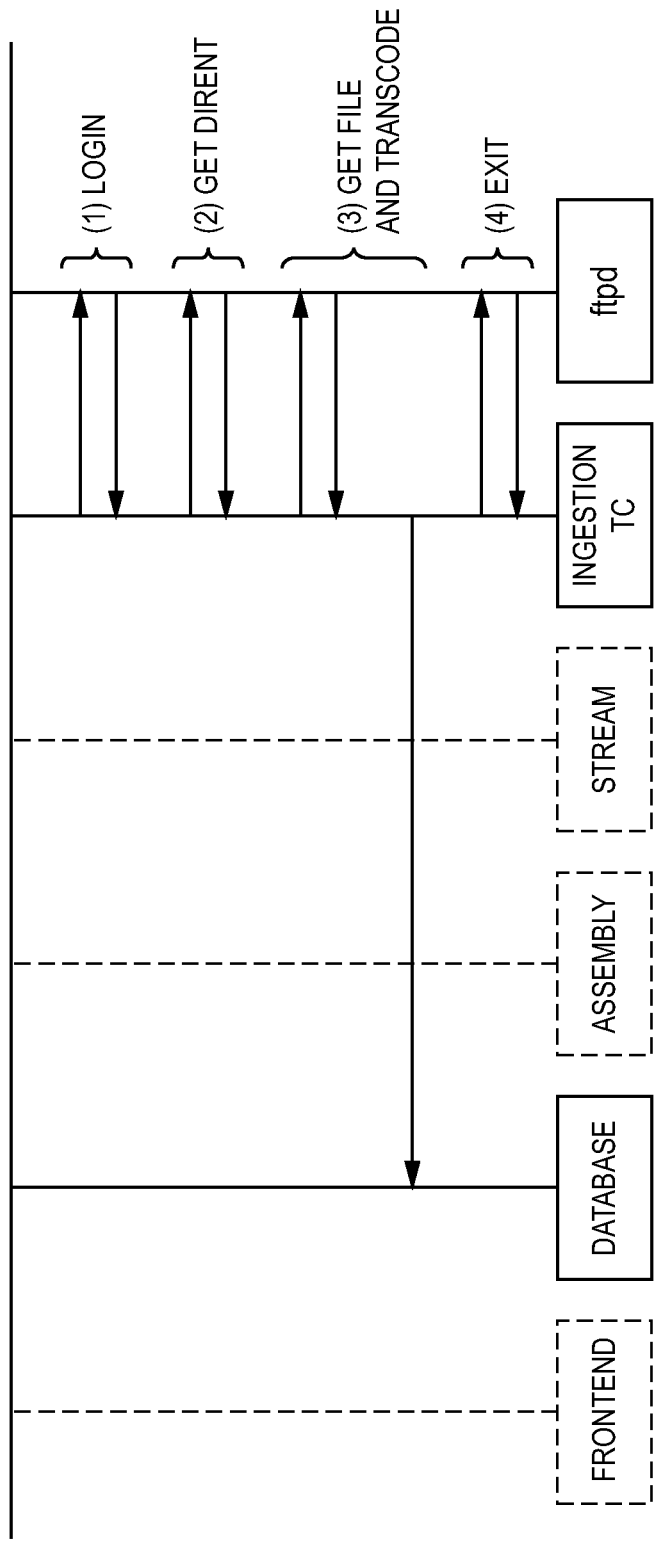
FIGS. 10-13 show various call flows in the system.
Figure 11:
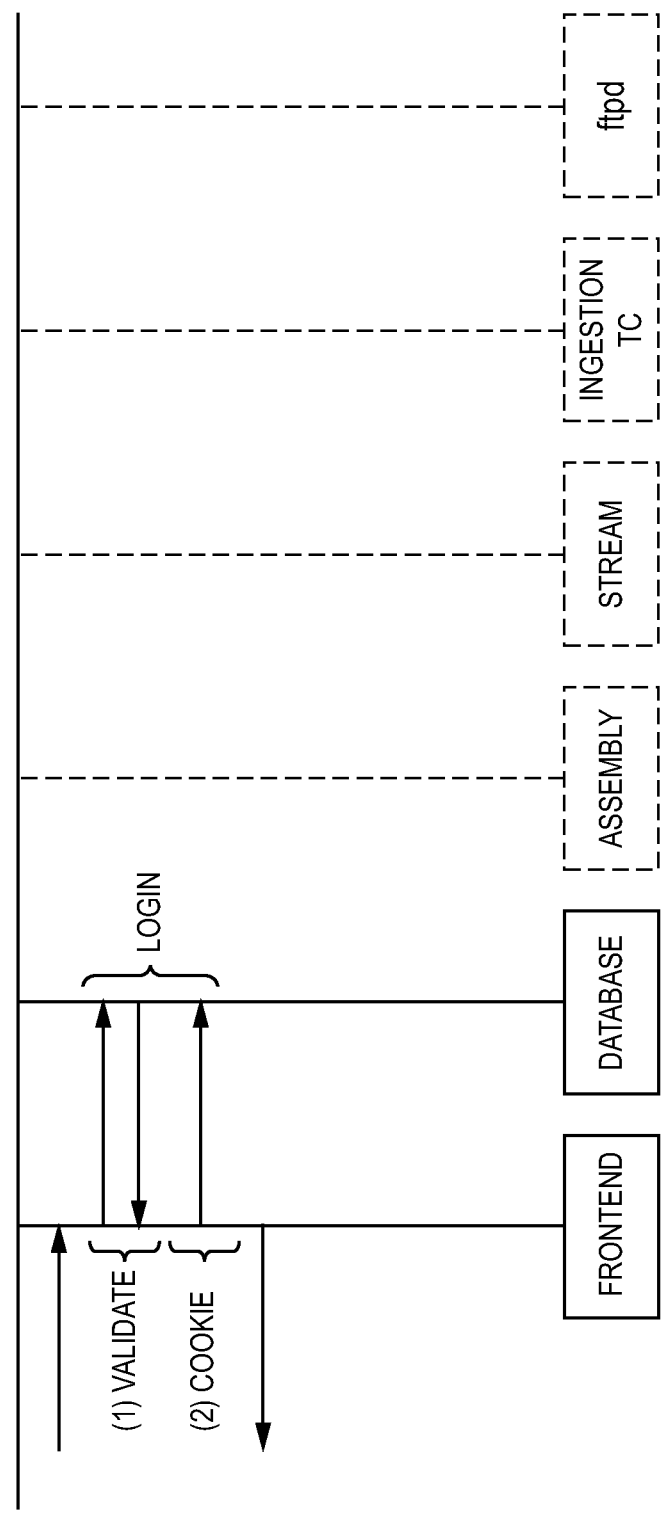
Figure 12:
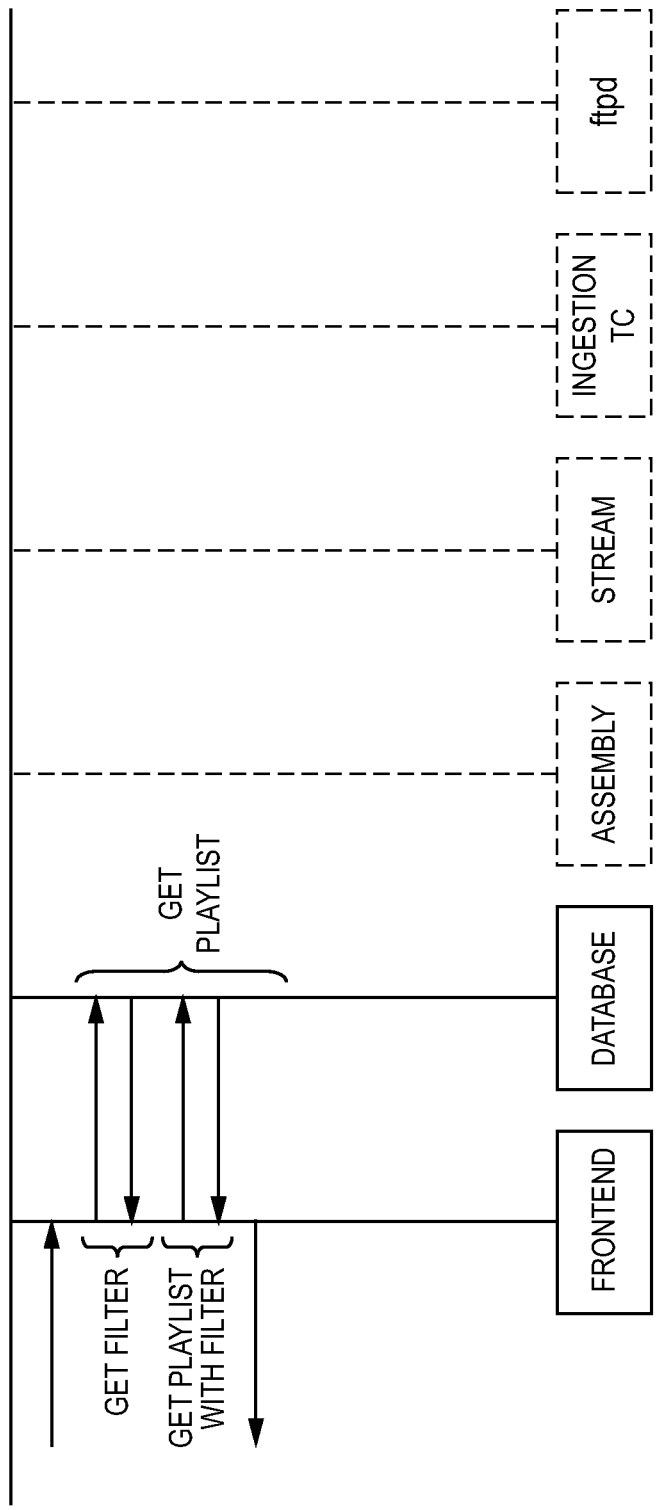
Figure 13:
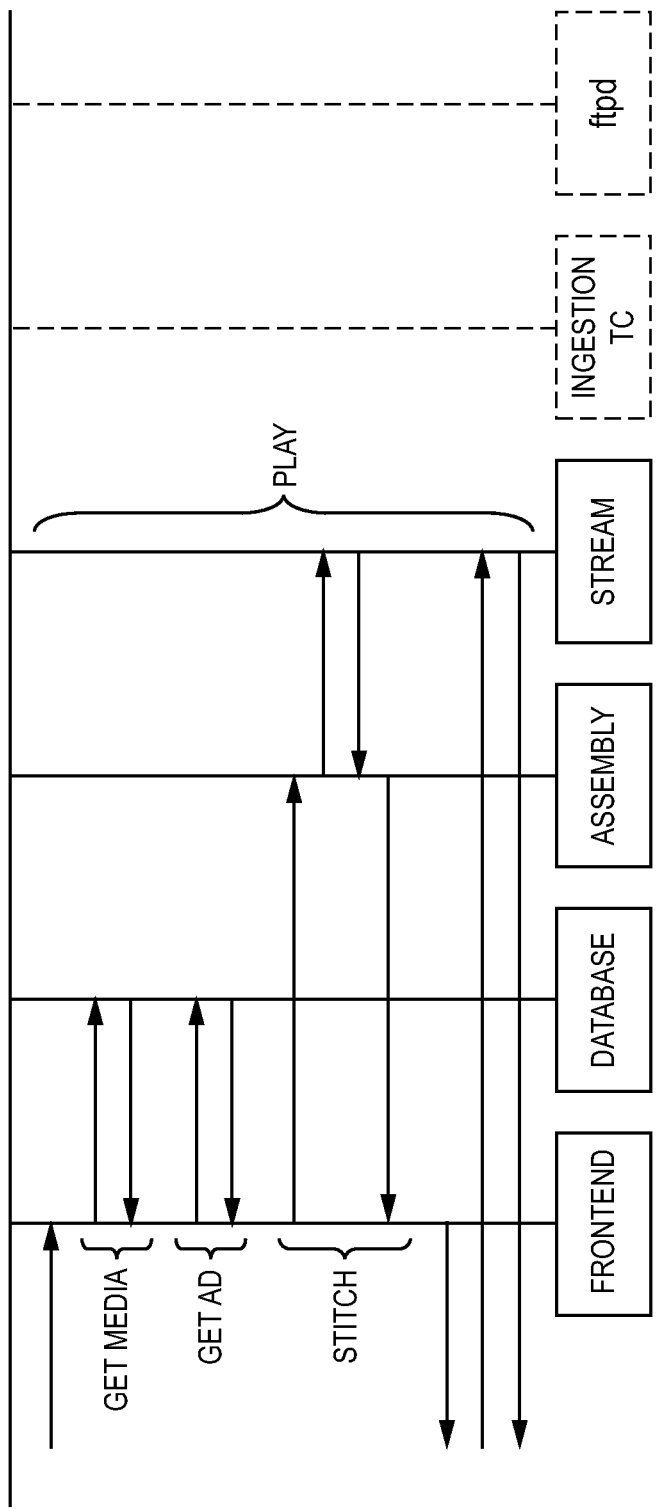
Figure 14:
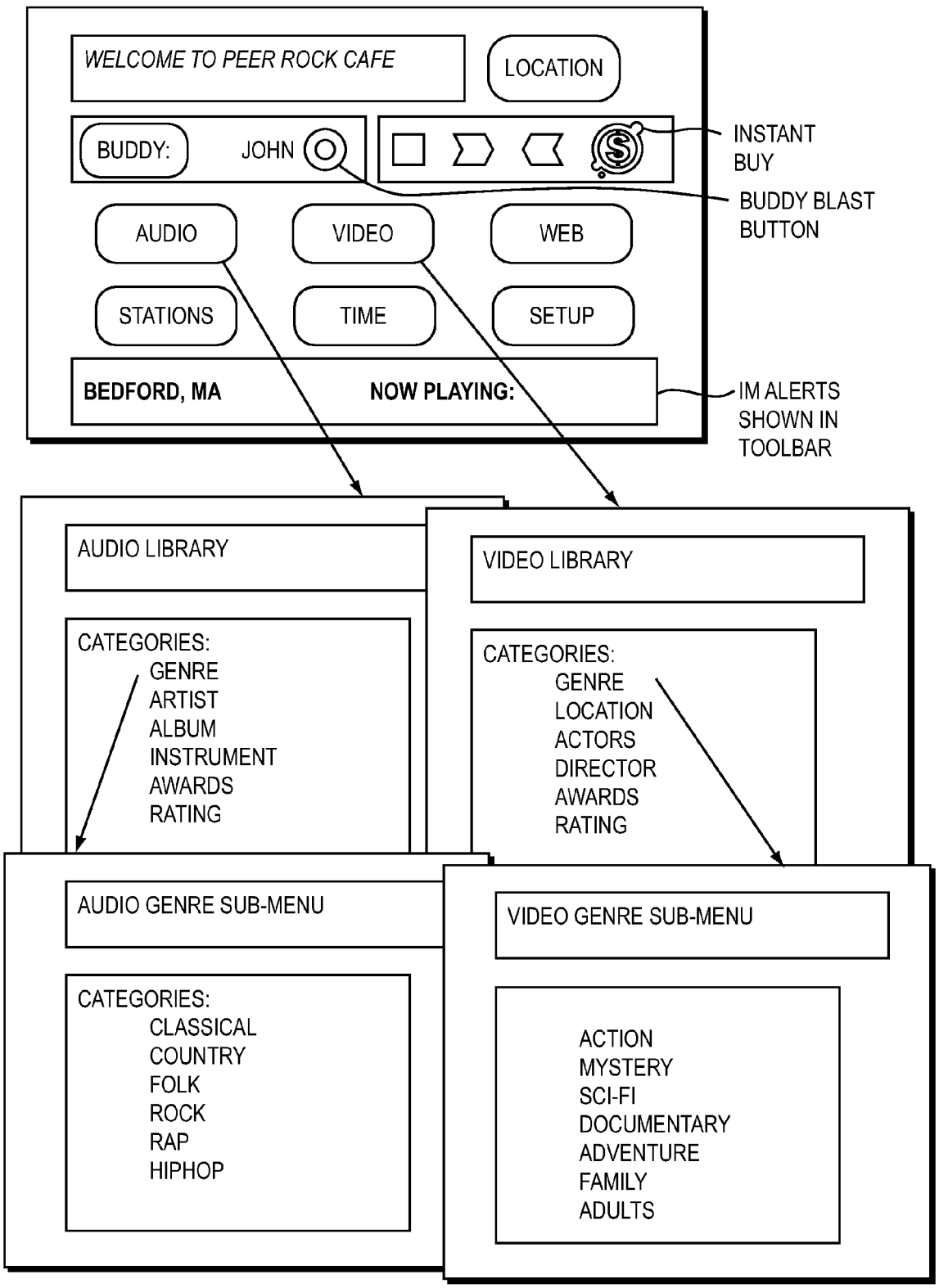
FIGS. 14-17 illustrate a sample user interface.
Figure 15:
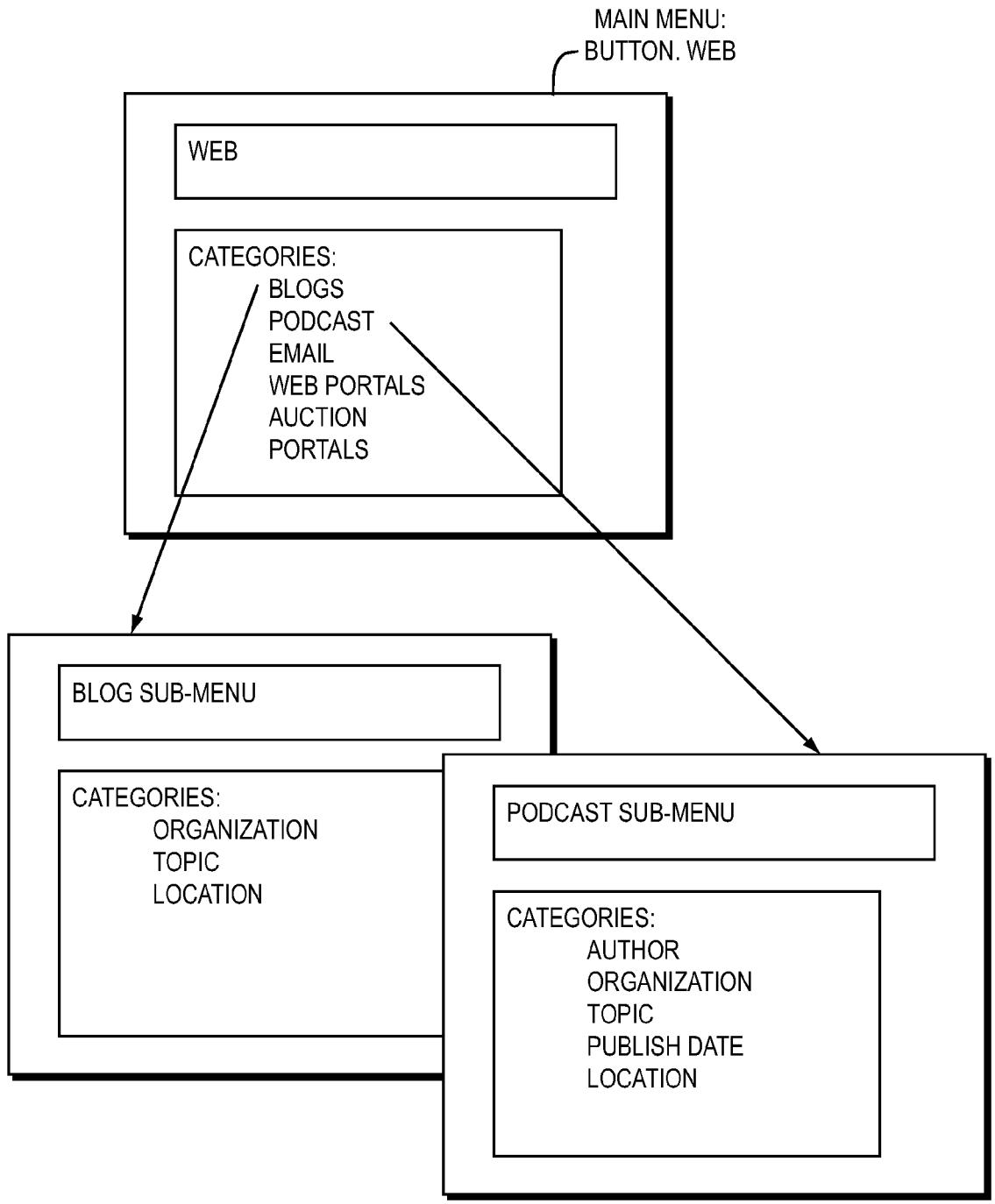
Figure 16:
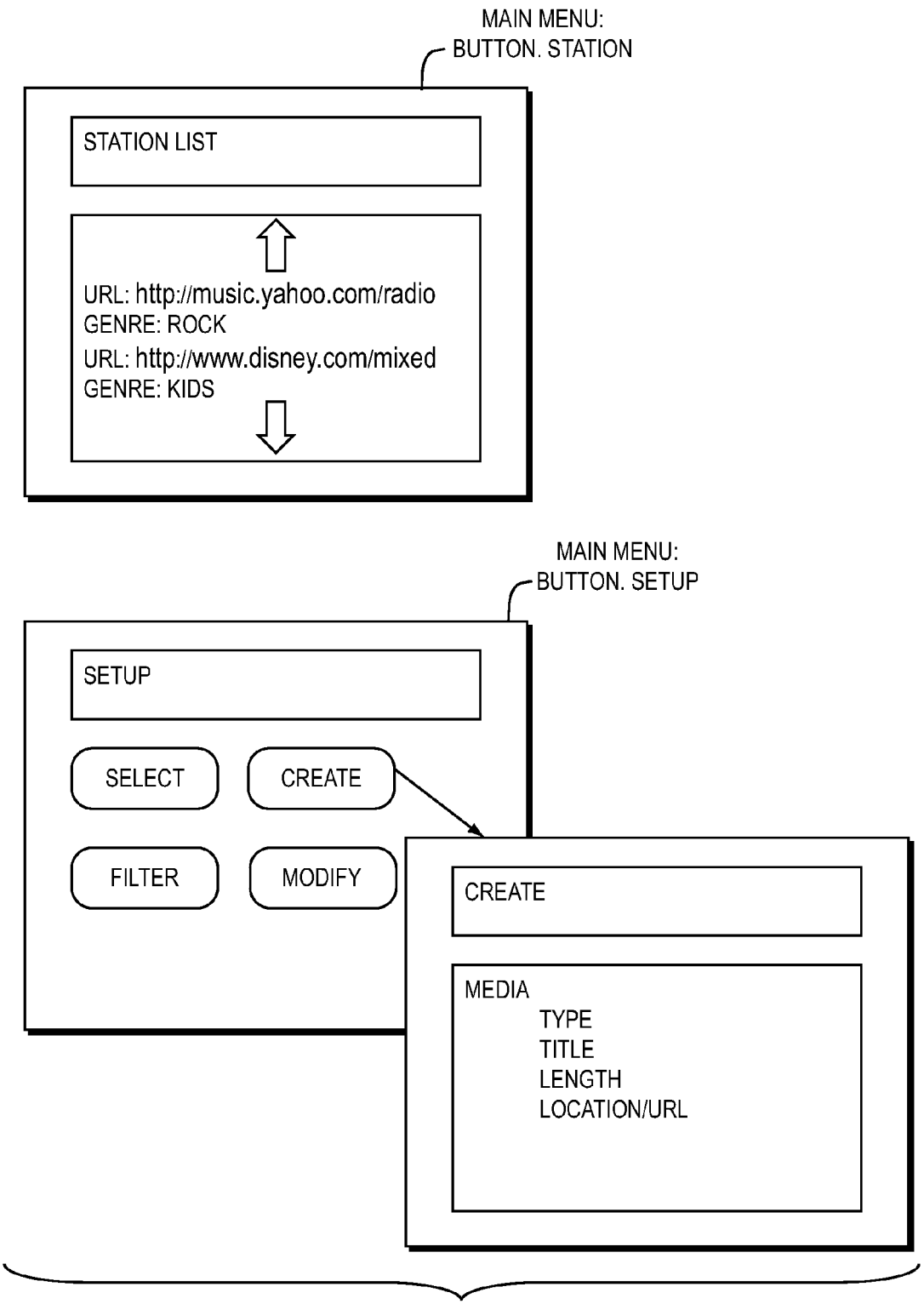
Figure 17:
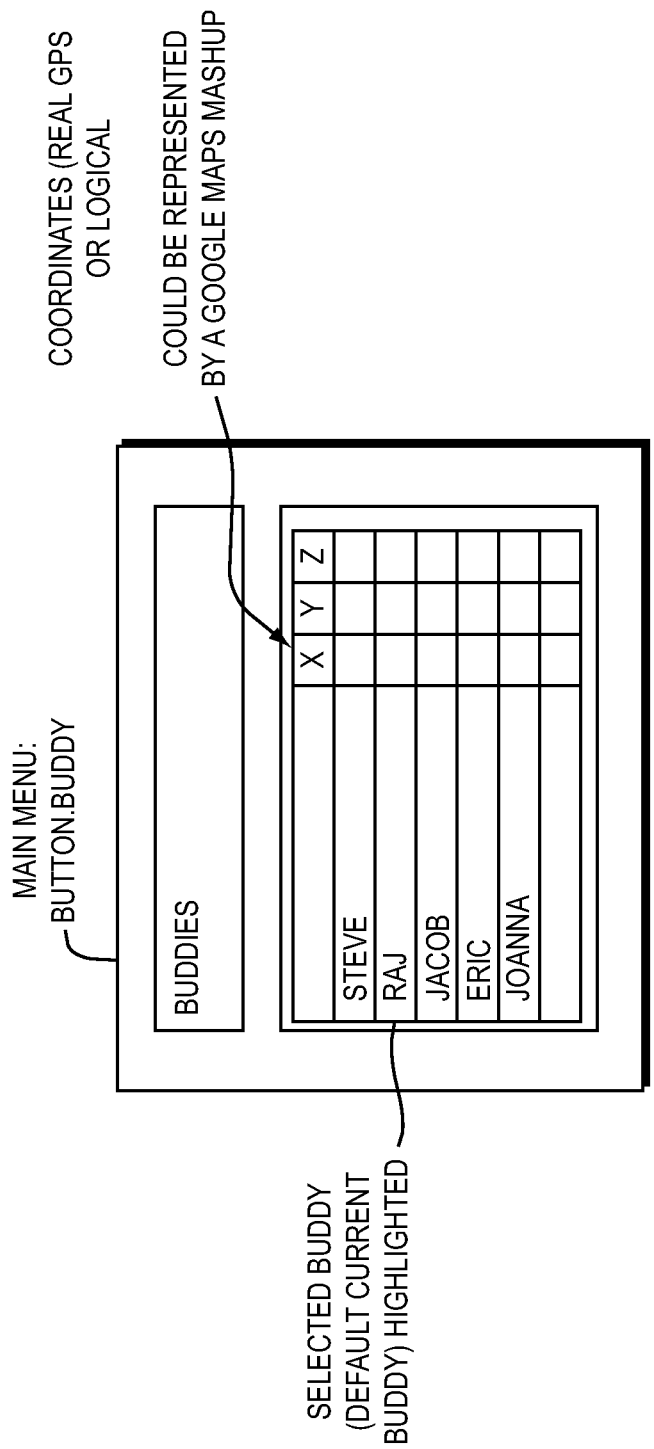

Several call flows are shown in FIGS. 10-13.
FIG. 10 illustrates media ingestion.
FIG. 11 illustrates login.
FIG. 12 illustrates get playlist.
FIG. 13 illustrates play.

PeerPC—Discovery (Applies to Non-Hosted Embodiments)

The client needs to communicate to the user's designated peer PC in order to support important features such as power conservation and transcoding for the adaptive frame rate and resolution reduction. This leads to an interesting problem how a mobile client should be able to reach a users peer PC. The requirements for this are:
    Client or Peer PC should be able to initiate contact with each other
    Client or Peer PC might be behind partial cone or symmetric firewalls
    Some clients such as cell phones frequently have fixed global IP addresses.

The solution consists of having a test service such as "peer-meta.sprint.com" to which a client sends a test UDP packet containing the client's own IP address in the payload. The test server verifies whether the header source IP address matches the payload and can determine whether the client is behind a firewall (e.g., the STUN server as described in RFC 3489 could be used.) Note that these packets have to be encrypted in order to ensure that they are not manipulated in transit. Further, the server can reply to the client via a second server and the client would know if it is behind a partial or full cone (full cone means a symmetric hole, i.e., the outgoing destination IP address/port must match the incoming source IP/port.)

The next component of the solution consists of a global peermeta directory server. The PC is always in touch with the directory server via a keep-alive that conveys its current global IP address. When a client needs to find its peer PC, it contacts the directory server which then forwards the PC's global IP address and port number and whether it is behind a partial or full cone. Then, the client can directly contact the PC if it is behind a partial cone. Alternatively, it can ask the PC to call back if it is behind a full cone as long as the client itself is not behind a full cone. In the case of a dual-global cone, there are two solutions: (1) use a well-known port, say 10101, together with a port-map to send incoming traffic towards a redirector kept behind the firewall; (2) use a paid-for relay service that forwards packets between the client and PC. It is anticipated that these latter scenarios are primarily for enterprise users.

PeerUI (User Interface)

FIGS. 14-17 illustrate a sample user interface. There can be many variations on the UI as defined by the User Interaction Engine.

Client Device Component Interface (Applies to Rich Client Version of the Client User Interface that Involves a Client Software/Hardware Installation)

Figure 18:
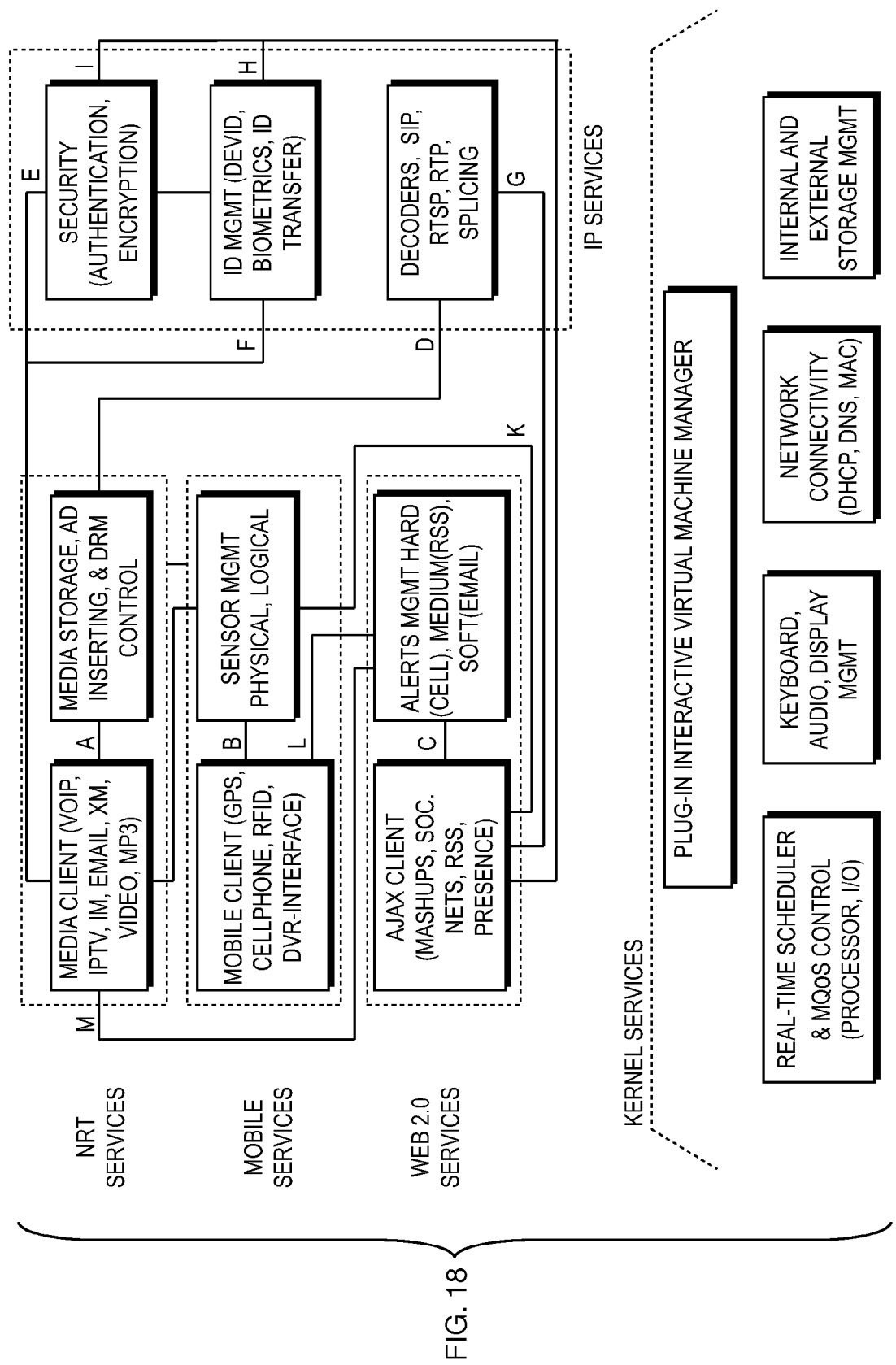
FIG. 18 is a block diagram depicting interfaces in the system.

Referring to FIG. 18, the various component interfaces have been indicated by the lines connecting components and these have been labeled using letters. Note that this describes the interfaces in an idealized handheld device. Actual services available might vary across devices. The PeerMeta IMP is expected to work across a variety of platforms and might have to leverage any available facilities.

The following table describes various interfaces that these lines represent. Note that all alert settings can be customized per user.

| Symbol | Description |
|---|---|
| A | 1. Store IPTV/XM for time shifting and buffering<br>2. DRM/Ad insertion for premium content |
| D | 1. Decode various codec formats: MP4-Part 3 (iTunes AAC); MP3. Also various container formats: AVI, ASF, WAV, MP4, Ogg, Real, QuickTime, 3GP<br>2. VOIP: G.723.1 speech codec |
| E | 1. Metadata (E.g. Programming control, user profile, location)<br>2. Voice - Encryption and decryption<br>3. VOIP - registration and authentication |
| F | 1. Biometric/DevID-based DRM permissions<br>2. Metadata sent to provider with user profile and location for program adjustment and targeting ad-insertion |
| G | 1. Faster AJAX with built-in hardware decoders for unzipping |
| H, I | 1. ID transfer between web services for seamless authentication for mashups |
| J | 1. Provide GPS location to metadata for NRT program updates and ads |
| K | 1. Provide GPS to customize mashups for location<br>2. Provide presence and location to IM services |
| C | 1. Hard, medium alerts for IM, Blogs<br>2. Soft alerts for web alerts and email |
| L, M | 1. Hard alerts for P2P ad hoc meeting<br>2. Hard alert for cell phone and VOIP call<br>3. Medium alert for TV News Flash |

System-Level Requirements

1. Near Real Time and Time-Shifting Operation

At times when there is poor to no network connection, the IMP should allow the user to continue his or her tasks by using data cached on the device. For example, email composition and queuing, later video viewing, and offline web browsing.

2. Large Storage

The handheld should have sufficient large storage. For example, 10's of GB of flash or micro drive storage to capture replay Ts the entire working set that a professional will normally use during a work day (e.g., client records, data sets, images, video clips and email archives).

3. Broadband Wireless

The IMP should have broadband access (both WiFi and WiMAX) of 10's of megabit per second and beyond to support high-speed sharing and transport of large working sets and multimedia files.

4. High-Resolution Display and Multimedia Engines

The IMP should have high resolution video display and low-power hardware assists for multimedia processing. For example, video/audio encoding/decoding and streaming.

5. Sensor-Rich Platforms

The IMP should be sensor-rich (using, e.g., RFID, GPS and biometric) so that it can automatically identify its user, location and environment. This would support its role of being a service data collector and allow targeted or location-aware service advertisements.

6. Usage Profiling with Privacy Protection

The IMP should monitor, record and data mine the user's web access patterns and preferences to assist automated collection of content of interest. The IMP should safeguard this personable profiling information to protect privacy.

In the Javascript client, the PeerPC 24 could do the monitoring/recording/mining and aggregate statistics at the Seed PeerPC level. It should protect the privacy of individuals and only use the statistics as a targeting mechanism for advertisements.

7. Security and Authentication Support and Digit Rights Management (DRM) Identity Management 2.0

The IMP should have encryption engines and tamper-resistant device keys to support user and device authentication, data encryption and DRM, as well as to protect against theft or loss of the device.

8. Service-Layer Software

The IMP should have a software layer to provide service-specific support, including initiation or web service applications, user authentication and authorization, maintenance of service connections, caching of service data, and service usage accounting.

Responsible for mash-up gadget management and automatic update

Functioning as "Gadget virtual OS" and provides interface with the underlying embedded OS for MQoS Data Flow Architecture This section describes the data flow architecture of the IMP. It is described hierarchically starting from the network view and evolving to the system and component details.

Network View

Figure 19:
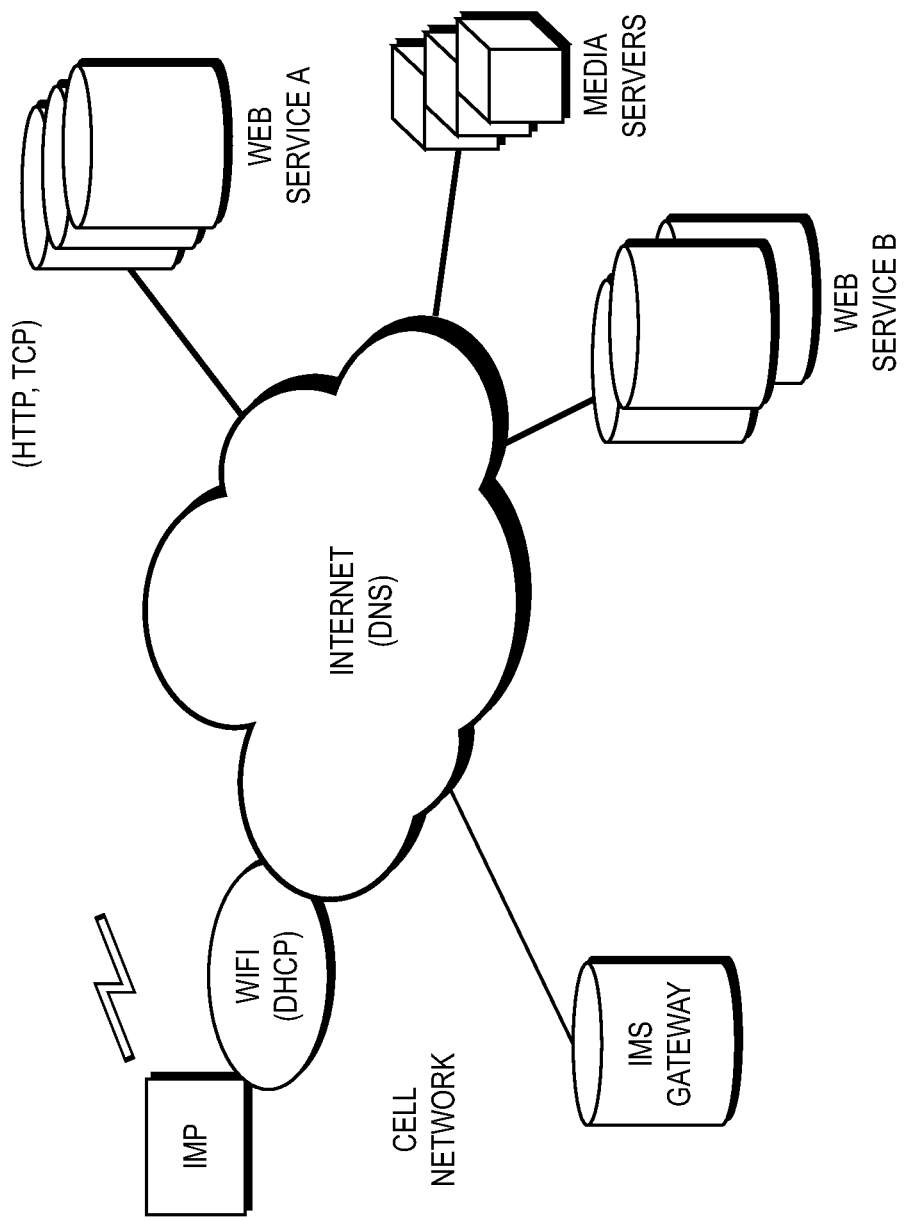
FIG. 19 illustrate network views of the client.

At the highest level, a IMP has two types of network views: client-server and peer-to-peer. This view is shown in FIG. 19.

The client-server view applies when the IMP is interacting with one or more servers and downloading Javascript or media. The only requirement is that the IMP supports an AJAX-capable browser. In addition, it must support multimedia IP protocols including SIP, RTSP, RTP, UDP, and TCP/IP. In addition, there is a need to support SDP (Service Discovery Protocol), DHCP, and DNS. These protocols enable the device to get its own IP address and discover other services on the net. It must also be possible to manually configure the servers into the IMP by a configuration screen and by downloading via a dialup service.

At the higher level, in this view, the IMP needs to interact with servers to fetch email, voice mail, media mail (photos and videos), TV program guide, weather, news, RSS feeds, etc. In addition, it must transmit its own presence and GPS coordinates and other sensor data to the appropriate presence-enabled applications and any other subscriber to its sensor feeds via RSS.

Special Features

Social Network Interaction

Figure 20:
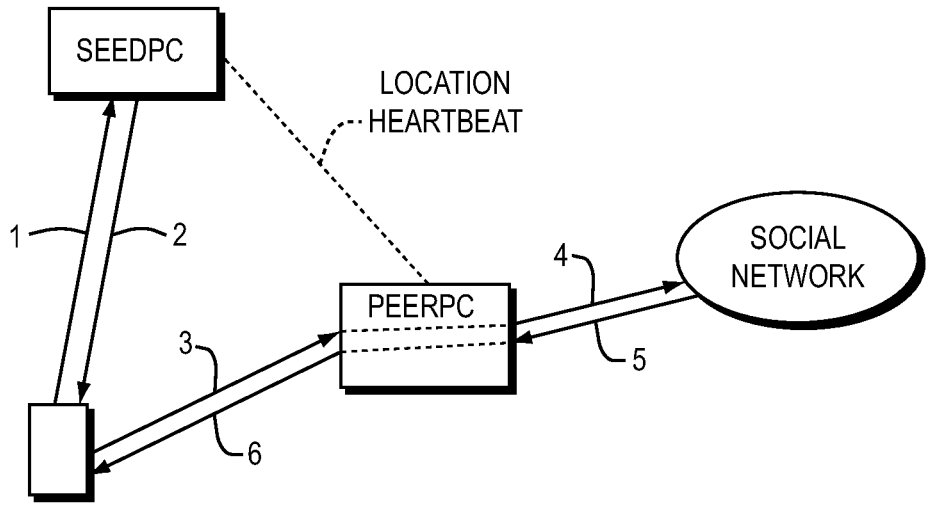
FIGS. 20-21 illustrate how the system leverages existing social networks.
Figure 21:
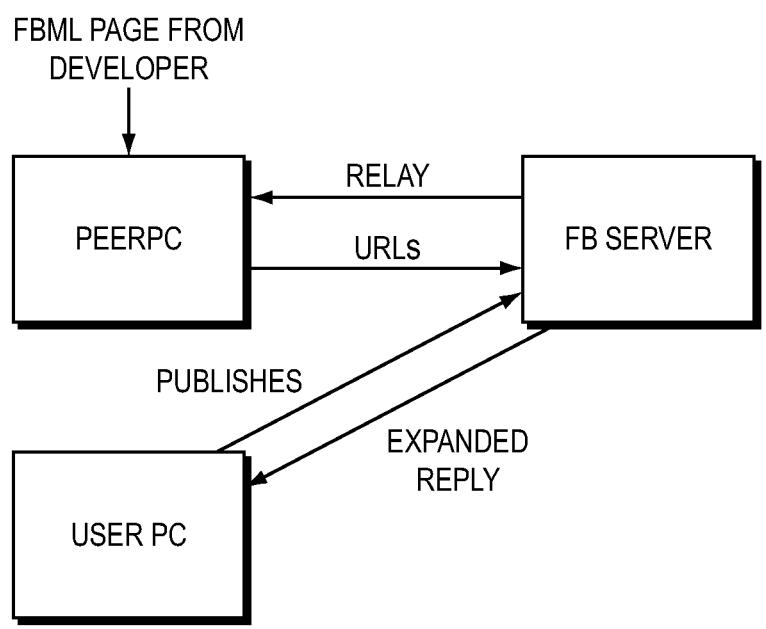

As depicted in FIGS. 20-21, the system leverages existing social networks such as: Yahoo!Go, Google, MySpace, Facebook, LinkedIn, etc.

In this outsourced community model, a single social network is used as the basis of the PeerMeta community. In other words, the PeerMeta functionality is made available transparently to the user who sees the familiar interface of the social network with added functionality of PeerMeta (NRT, Metadata, and Sharing) made available to the friends in the social network.

The steps in this interaction are:
1. The Handheld authenticates with the SeedPC.
2. The PeerServer 26 sends credentials and location of the PeerPC 24
3. The Handheld presents credentials to the PeerPC 24,
4. The user selects the social network that he wants to join and is allowed to log into that network.
5. The main page of the social network is returned to the handheld via the PeerPC 24 which uses a "friend" list extraction applet to get the identity of the friends in the network.
6. Now, the handheld is presented the main page of the social network embedded in a PeerMeta community frame with the additional buttons on that frame to enable key PeerMeta functions such as MetaCast and Buddy-Blast.

Device Detection

I. Overview

A User Interface Engine (UIE) is made available along with the MashMedia Platform to serve as a Web-driven Interactive Media Portal (or Reference Application) built upon the platform SOA Web API. This Reference Application housed on the UIE is re-brandable and re-skinnable for a given content publisher or mobile operator.

The UIE provides several key functions including:
Maintaining a device support database with profiled device capabilities
Automatic detection of a consumer's mobile device type
Rendering of different optimized versions of the Reference Application web pages across various mobile (or desktop) handsets via the native browser based upon the detected device type II. Device Support Database The platform maintains a device database of profiling feature phone and smart phone capabilities and attributes which are important in the delivery of Azuki MashMedia services. This attributes include:
device ID
device manufacturer,
OS type and version
Screen resolution and physical size
browser type and version
browser capabilities (level of CSS, xHTML support multi column support using div, table tags, passing of call to native SMS app, file system access, etc)
browser User Agent string
media player capabilities (supported media formats and methods of delivery—streaming, progressive download or download & play)

Updates and changes to this device database are facilitated through operational configurability of an Azuki maintained master device database file. Such changes may be applied to the UIE at any time. The UIE also processes updates from a 3rd party supplementary device database (e.g. WURFL or DeviceAtlas) whereby a broad range of new devices are added to the system along with a subset of defining device attributes crucial to delivering MashMedia services.

Separate from the platform, it is desirable to maintain a process for continual testing of new and existing devices across a matrix of device manufacturers, mobile operators and operating systems. A test suite is utilized to characterize the defining attributes for each of these devices to aid in browser renderability according to defined "UI device classes". Customer care and operations staff can utilize this method of updating device attributes based upon any reported deviation from expected performance.

Figure 22:
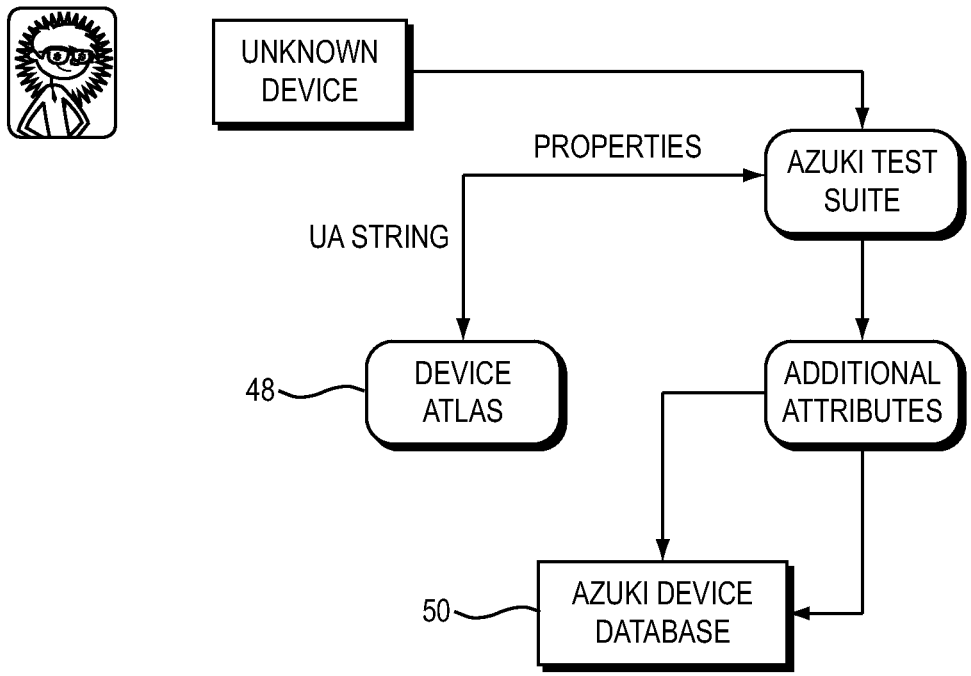
FIG. 22 shows a work flow used in device detection.

FIG. 22 depicts this workflow. Note that the use of the third party database, such as "Device Atlas" 48, to supplement the device information in two ways: (1) supplement with CSS support information for devices on hand; (2) additional devices for which no testing is planned, with the intention of providing a good user experience as described in the UI layout selection algorithm given below. For these untested devices, the browser, xHTML and streaming properties are extracted from the third party database 48 and are used to populate the Azuki Device Database 50 with the right UI capability.

III. Automated Device Detection

As part of the device rendering process to a given browser enabled device, the UIE performs a method of intelligent device detection based upon browser header/User Agent string values obtained and the Azuki Device Support Database. The UIE utilizes a UI Layout Selection algorithm (described below) that minimizes explicit dependencies on "exact matches" of UA strings and proper treatment of "like devices" which are not completely described in the Device Support Database but for which known device attributes provide sufficient info to render one of the defined UI device classes for that mobile handset. Using this combination of the Device Support Database and intelligent device detection, Azuki is able to support hundreds of handsets with a combination of a subset of physical device testing and test coverage for other "like devices" whereby renderability is highly predictable.

IV. User Interface Rendering

Based upon the device detected by the UIE (correlation of device detection techniques and Device Support Database), the UIE renders the following device classes based upon the device capabilities:

UI-1 (High end browsers with sufficient CSS, xHTML and Javascript support)—e.g. iPhone, Windows Mobile and Nokia S60

UI-2 (High volume devices with more limited browser support such as only limited CSS capabilities or the need to rely upon Div Tags and Table tags)—e.g. Blackberry browsers UI-3 (Low end browsers with insufficient support for rendering UI-1 or UI-2 or devices for which attributes are unknown)—Low end feature phones and phones for which the effort to add support in UI-1 or UI-2 is not warranted due to the required effort For UI-1 and UI-2, separate style sheets may be rolled out to handle variations in screen sizes or other device variability within each device class. An example is to gray out the media upload button if the device cannot do media upload. UI-3 by definition only supports a single method of renderability by design which serves as a least common denominator across devices capable of browser and media playback.

The rest of this section describes the UI Layout Selection algorithm.

Figure 23:
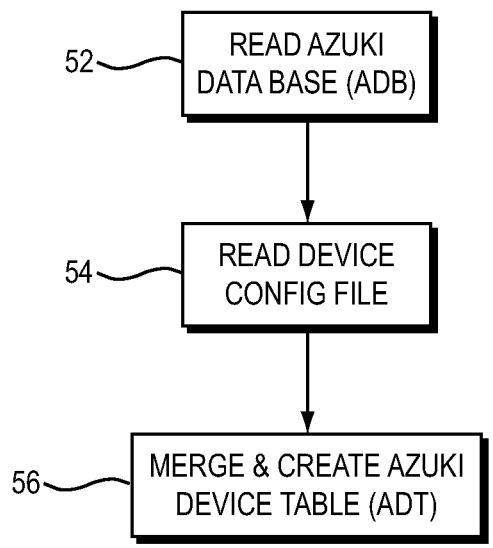
FIGS. 23-26 are flow diagrams of various processes used in device detection.

We begin with the UIE Bootup sequence described below. Referring to FIG. 23, at step 52 the UIE initially reads the Azuki Database (ADB) 50, and then reads a device configuration file (step 54) that is provided to explicitly handle devices that are not in the ADB 50 or that need to be overridden manually to a different UI group. At step 56, the two are then consolidated into a table called the Azuki Device Table (ADT) that is used for the real-time in-line device selection. Note that the ADT is a hash table where the key is a 32-bit CRC of the UA String. The size of the ADT is set at 2K and the maximum hash chain-length was found to be under 4 which is considered as acceptable. There is room for improvement of the hash if this assumption changes down the road. The schema of the ADT may include the following: Hash key and Capability ID which is the row number of a table called the Capability Table with a schema containing several UI features including the browser and version, UI-Layout CSS, media upload, streaming type, distinguishing xhtml properties such as table support, CSS support, background color support, etc.

First, the Capability Table is hand-populated with one row per known layout. Note that rows may be installed in this table so that all the CSS layouts are covered. Also, the lowest browser version number that supports the layout is also specified and is called the Lowest Applicable Version (LAV). Multiple rows with the same browser are organized in decreasing LAV. Also, rows that differ by stream type are placed next to each other in a fixed order.

Next, the ADT is populated automatically as follows. Every UA in the third party database is hashed and added to the ADT. The corresponding browser is checked against the known browsers in the Capability Table. If a match is found, then the row with the highest LAV equal or below the version in the UA is selected for the Capability ID in the ADT provided the streaming type is compatible. If no match is found, the necessary xhtml and CSS properties are checked against the rows in the Capability Table for a match. The richest layout that is applicable is selected.

Figure 24:
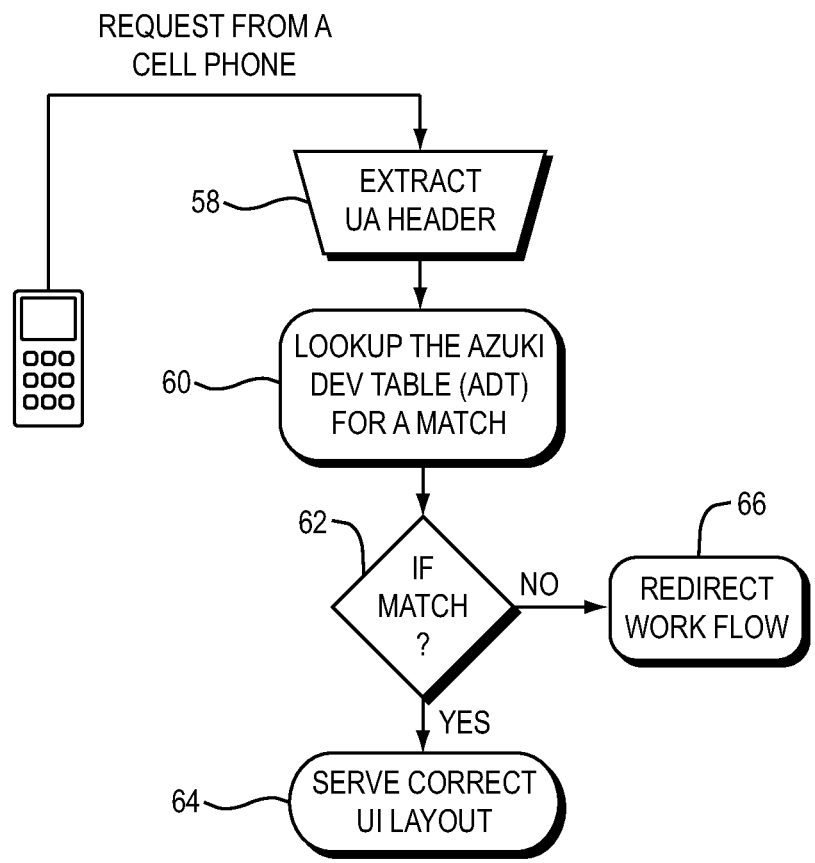

Referring to FIG. 24, we next look at what happens when a request from a phone arrives. At step 58, the User Agent (UA) String is extracted from the request header. At step 60, the extracted UA string is used as a hash key into the ADT. If a match is found (step 62), then at 64 the appropriate UI-Layout is selected for the phone. If no match is found, then at 66 the cell phone is redirected to a phone detection test suite. Note that this happens only once for example when a carrier sends a browser version update over the air. But, before sending to the redirection work flow, a simple regular expression pattern match of the UA is carried out to detect known browsers. If found then the Capability table is searched for the nearest smaller LAV under this browser. The corresponding row gives the Capability ID.

For the test suite, it may be desirable to only handle the bare minimum which is to get the User Agent field and the device resolution. If the end user chooses to not run the test, then the user is given the UI-3 layout.

Note also that in the case of BlackBerry devices older than the Bold, key xhtml properties are turned off by default. This foils the above device detection logic. Therefore, the user must be prompted to turn on the properties. Failing which the device is fed only UI-3. The decision is recorded in the cookie.

Figure 25:
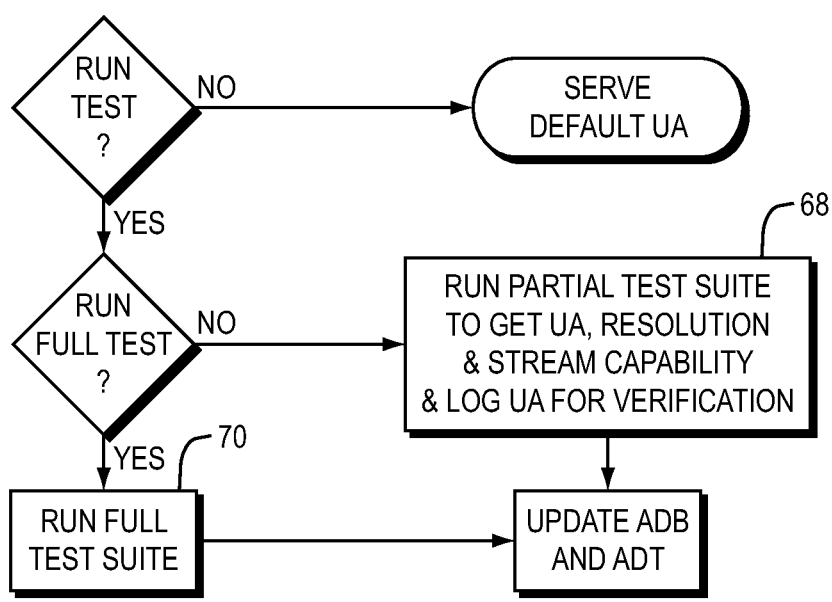

FIG. 25 illustrates a redirect work flow.

Note that a partial test suite (step 68) is expected to take just a few minutes and could be used to determine the correct resolution and if the device can support tables for example. This could be used to provide at least a better UI-3 rendering. A full test suite (step 70) may be necessary in order to determine whether we can provide a UI-1 rendering to the device. We could choose to feed this back to WURFL for brownie points if we care to. If an end user chooses to not run a test suite or only run a partial test suite, then we could log that device for further qualification by an Azuki support team personnel.

Figure 26:
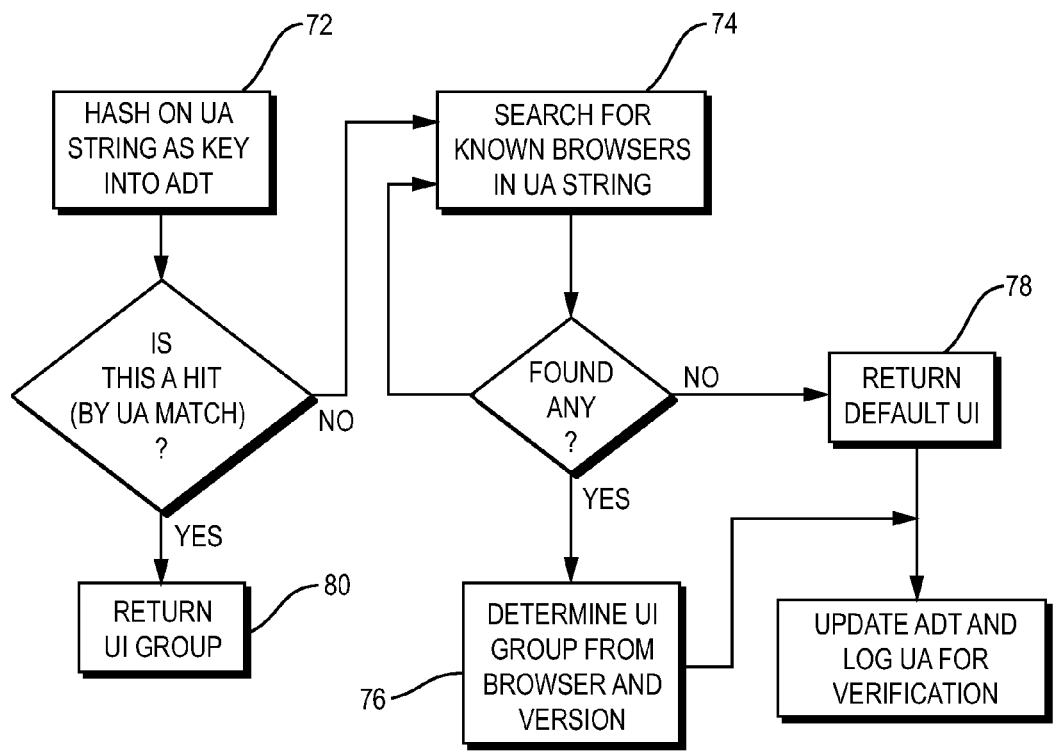

FIG. 26 illustrates the exact ADT lookup algorithm. It starts off (step 72) with the UA hash key as described before. In the case of a new UA not in the ADT, at step 74 the UA string is searched for a set of known browser names. If one of these is found, then at 76 the version is also determined (usually occurs right after the browser name). If none are found, then it must be a new browser and at 78 the default UI is returned. In the case of an existing UA, at step 80 the appropriate UI group is found as described below. In both cases, the UA is logged for further verification.

Figure 27:
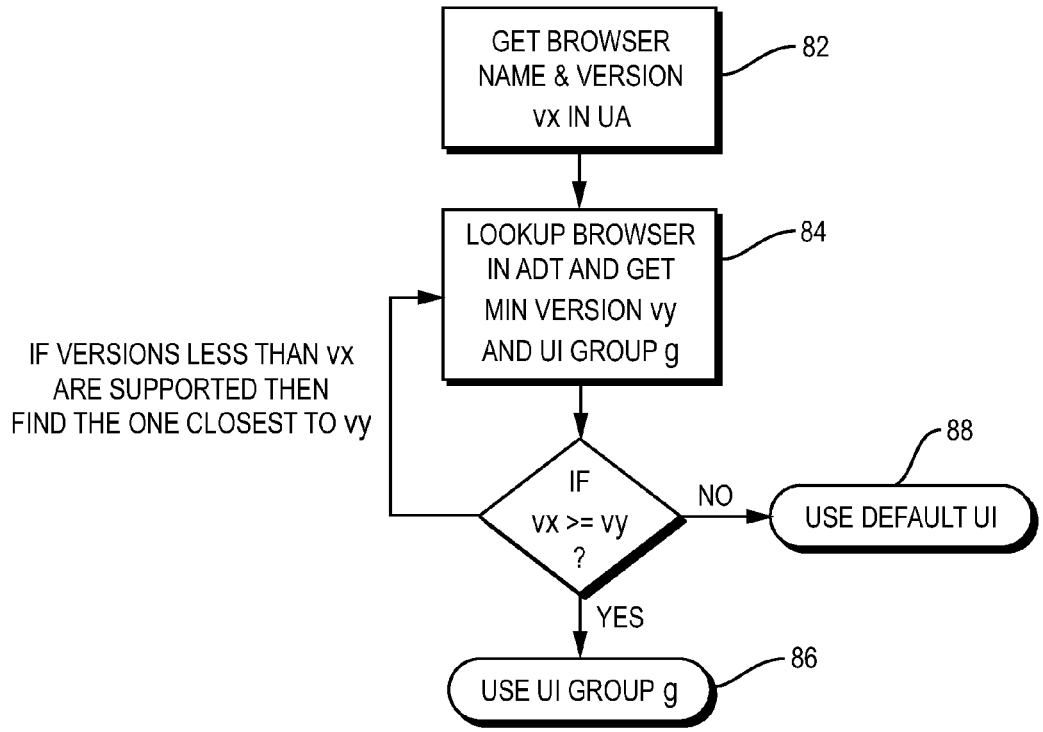
FIG. 27 shows user interface (UI) group determination.

FIG. 27 shows the UI group determination, which is done as follows: at 82-86 the matching browser is found (if any) in the ADT with the smallest version number below the one in the request UA string. Thus, for example, if Windows Mobile 6 is the closest one in the ADT below a request UA string containing Windows Mobile 7, then the UI layout group corresponding to the Windows Mobile 6 is returned. This is the most educated guess about the best rendering a device can get. If no such matching browser is found, then at 88 the default UI is provided.

V. SOA Caching

The concept of SOA caching is achieved by using a mechanism that essentially reuses the last result for the same SOA call. This is implemented using a hash table where the SOA URL with parameters is used to generate the hash key with a 32-bit CRC for example. Each record in the table preferably points to a special table whose rows contain the following:

Time of last request
Cache timeout
Key value
Pointer to the XML results file

There are generally five different time out related to the following SOA calls:

| | |
|---|---|
| Top-rated | t0 |
| Most popular | t1 |
| Most recent | t2 |
| Search | t3 |
| Static | t4 |

Each of these has a separate timeout value t0-t4. For example, t0 may be 5 minutes whereas t1 could be as high as 30 minutes. Also, t2 will depend on the rate of ingestion of new media—for example, t2 needs to be no larger than the period of ingestion of the media that needs to be the freshest e.g. Scores. Similarly, t3 need not be faster than the fastest ingestion. On the other hand, t4 can be made as large with no side effect. These parameters could be tweaked via a configuration file.

VI. Carrier Detection

This is achieved during the Device Detection phase as follows. The source IP address of the request is used to do a reverse DNS lookup. First, the source IP address is masked using the appropriate mask and then compared to the Carrier's CIDR prefix. This information is pre-populated by ingesting a gateway database. The longest matching prefix is used selected.

VII. ClickZoom Navigation

As an important core capability of the Azuki platform, ClickZoom navigation controls are extended from the SOA API to the UIE. ClickZoom proves a novel method of navigating within monolithic media objects, generating more snackable forms of media that ease browsing, discovery and consumption, applying contextual advertising around the media, viewing user generated comments tied to a particular portion of a video clip and sharing a particular context (or clip) of a particular video across mobile (SMS) or social networks (posting to Facebook news feed).

Users are presented with either a top level 3×3 or 2×2 thumbnail tile grid that represents the media whereby they may zoom into a particular portion based upon their interests or visual clues to where user generated comments exist. For lower level tile views where there is limited time separation between snackable clips, a 2×2 or single thumbnail image may be displayed with user navigation controls left and right from that point.

As noted in the Ingestion Section of this document, media objects may either not contain a ClickZoom representation (only able to play the entire clip) or ClickZoom representations defined as either Time (uniformly spaced) or Editorial (explicitly defined points) Media Marker points which are represented in the rendered tiles.

VIII. Logging and Reporting

The UIE logs all webpage rendering statistics as well as UIE related items such as device detection information and rendered UIE device class utilized (UI-1, UI-2, UI-3 and specific style sheet) with the corresponding user ID and timestamp. This logged information is processed by the Azuki platform reporting subsystem for report generation.

The logging and reporting metrics may be logged to a data repository that could be utilized for generating canned and custom reports centered around USER EXPERIENCE. Also this helps automated keywords generation from server side behind SOA layer. The following is an example of data that can be collected:

Login ID
    Device ID
    UI Group (UI-1, UI-2, UI-3)
    Location ID
    User Agent(s)—this is a collection
    Connectivity History (Most commonly used)
    Frequency of Connectivity (Most commonly used)
    Page response time
    Media ID accessed
    Media Name accessed
    Number of Times Media accessed
    Primary Connectivity used (for media access)
    Alternate Connectivity used (for media access)
    Date/Time Stamp
    Lost user flag
    Others (as identified) for future needs for capture In summary logging and reporting module enables the following objectives:

Continuously optimize mobile user experience.
    Optimize Keywords generation to enrich and serve media that a user is interested in improving Return on Investment for the Mash Media Platform.

IX. Device Detection Algorithm

Initialization of Azuki Database

1. Read the third party database
2. For each User Agent (UA) String in the database
   a. Calculate Hash {e.g. 32-bit CRC, MD5, etc.} on the entire {of selected substrings of it} of the UA String
   b. Go to the row Hash modulo M {where M is the HashTable size} in the HashTable
   c. Add record to the row with the Hash and the result of running TestSuite on the UA
     i. Get properties for the UA as indicated by the database
       1. Browser and version
       2. Xhtml properties
       3. CSS attributes
     ii. Run TestSuite-Detection Phase **
       1. From ADB get xhtml and CSS properties and attributes to determine the applicable UI layout {UI-1;UI-2;UI-3}
       2. From ADB get the streaming capability {0=download; 1=progressive download;2=http streaming;3=RTSP streaming}
     iii. Find row in Capability Table
       1. Lookup using the browser and version
       a. If multiple rows are found
        i. Find within those rows the one with the matching UI layout
         1. If one or more rows match the UI layout;
         a. find the one with matching streaming capability
          i. Prefer the row with the media upload property if available
         b. If none, create* new row with indicated streaming capability
        2. If none, create* a new row with the UI layout and streaming
       b. If none, create* new row with browser, UI layout and streaming
      2. Return row as Capability ID (Note: * Here a row is created in the correct position. The Capability Table is ordered by browser and version number in decreasing order.)

Real-Time Device Discovery

1. Extract UA string from request header
2. Hash to the row in the HashTable
   a. If it is a hit, get matching record
     i. Serve up the appropriate UI layout with the correct setting for streaming and media upload
   b. Else we must try to deduce the best fit UI
     i. First string search the incoming UA string for known browsers
       1. Go through all the rows of the Capability Table in order and for each different browser, search the UA string for that browser and for the LAV equal or less than the version number in the UA String
       a. If any found, return the row number of the Capability Table
       b. Else, redirect to the Test Suite work flow.

Test Suite Work Flow

3. Ask the user if he would like to run a test suite to help us improve his UI experience
4. If no, then serve UI-3 with download and no media upload
5. Else
   a. Run tests to get the xhtml properties; CSS attributes; streaming support; media upload support
   b. Now, run the Test Suite-Determination Phase (** described above)

XI. Program Flow Diagram

Figure 28A:
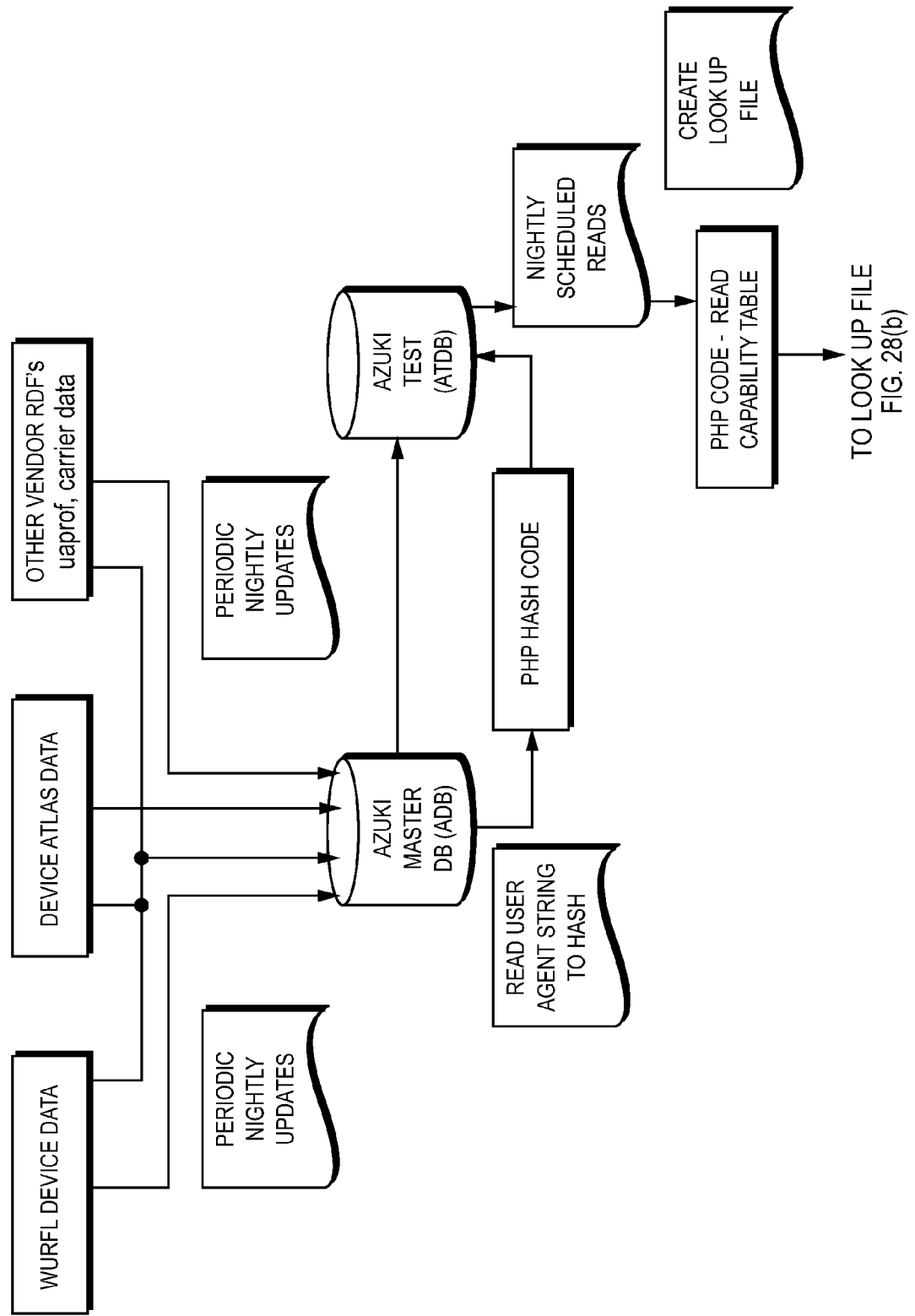
FIG. 28 is an overall program flow diagram.
Figures 28A, 28B:
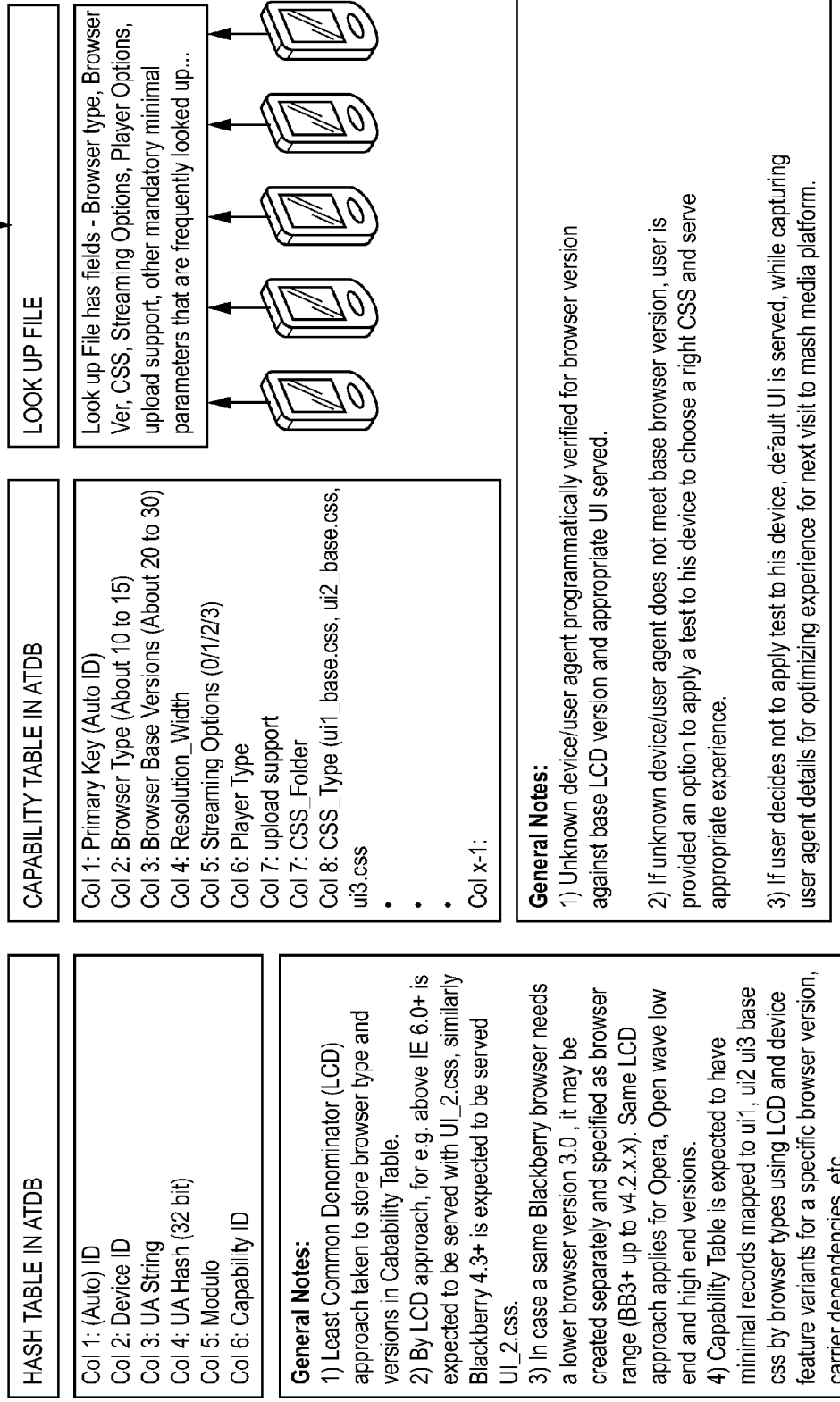

FIG. 28 is an overall program flow diagram.

Additional description of device detection algorithm

Figure 29:
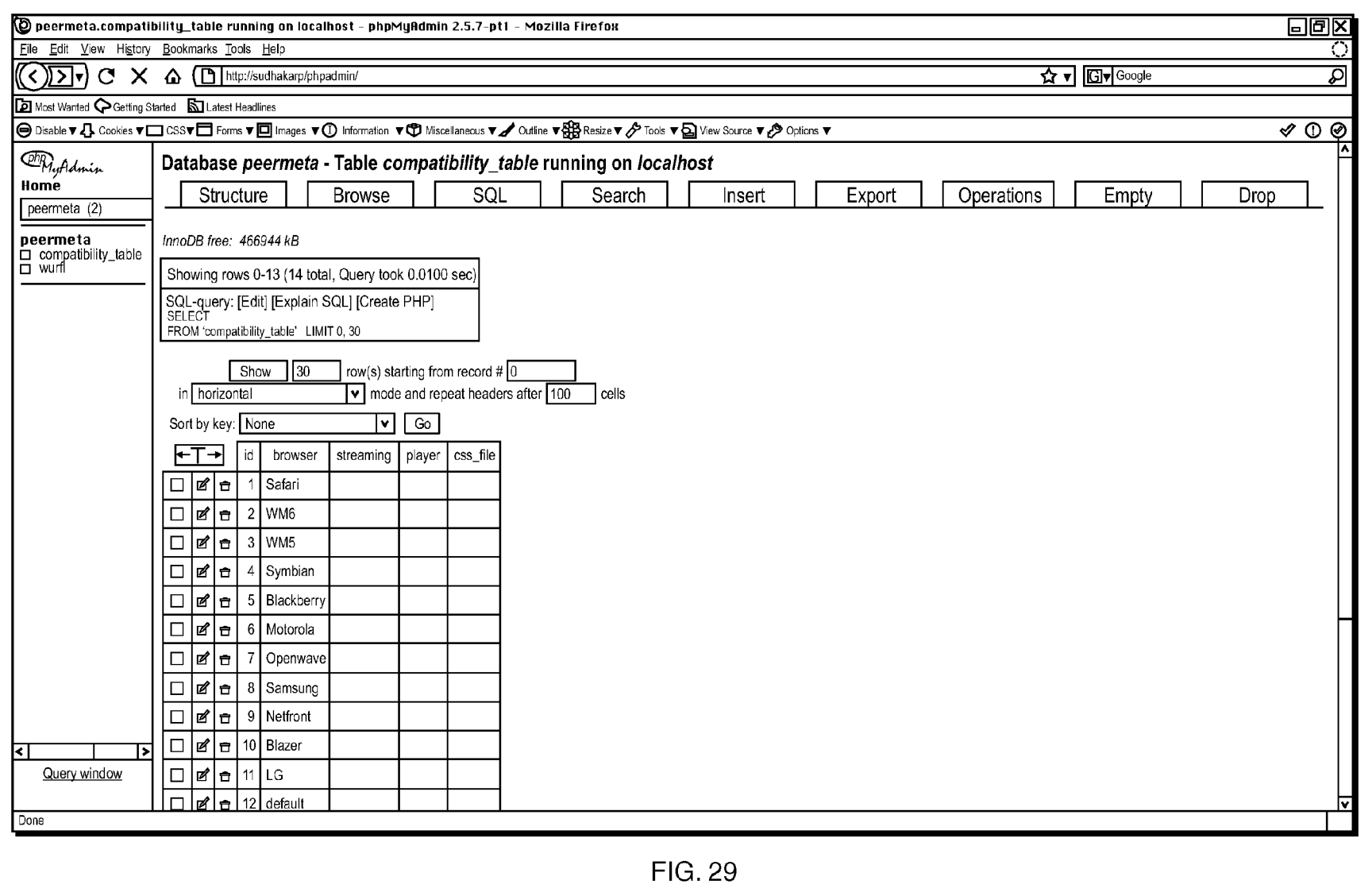

Step 1: Use wurfl, DeviceAtlas, other repositories to create Capability Table (Azuki Device Database) as shown in FIG. 29.

Step 2: Generate XML Look Up file from Capability table for run time use.
Generating Hash for Effective Look Up
Step 1: Read wurfl file (sample taken for each of the 3 CSS groups as below). About 8888 values currently retrieved and stored in repository.

```
<wurfl>
    <device id="htc" ua="Mozilla(.......)">
        <capability_group1>
        </capability_group1>
        <capability_group2>
        </capability_group2>
        <capability_group3>
        </capability_group3>
        .
        .
        <capability_groupn>
        </capability_groupn>
    </device>
    <device id="Blackberry9000" ua="Blackberry9000\.........">
        <capability_group1>
        </capability_group1>
        <capability_group2>
        </capability_group2>
        <capability_group3>
        </capability_group3>
        .
        .
        <capability_groupn>
        </capability_groupn>
    </device>
    <device id="Nokia6086" ua="Nokia__S40\..............">
        <capability_group1>
        </capability_group1>
        <capability_group2>
        </capability_group2>
        <capability_group3>
        </capability_group3>
        .
        .
        <capability_groupn>
        </capability_groupn>
    </device>
</wurfl>
```

Step 2: Store WURFL device ID and user agent string in Azuki database
Step 3: Hash of UA created.
Step 4: Modulo of hash created to enable effective comparison and search FIG. 30 shows a sample MYSQL screen shot for above.
Step 5: Create a multi dimensional data structure (see example table below) that stores about 8888 device entries:
Hash Key
Hash Modulo
Compatible Row ID. This is used to map
  CSS
  Browser
  Browser options
  Streaming options (DL/HTTP/PL/RTSP)
  Carrier
  Player
  Others

| WURFL Device ID | User Agent | Hash Key | HASH MODULO | Compatible ID |
|---|---|---|---|---|
| HTC | Mozilla (IEMobile) ... | | | |
| Blackberry8300 | Blackberry 4.3 ... | | | |
| Nokia6086 | Nokia\ ... S40 ... | | | |

Exception Scenarios
If a device is unknown, user is prompted to apply test, to detect device capability and serve the right UI (CSS) with right feature set.

Figure 31A:
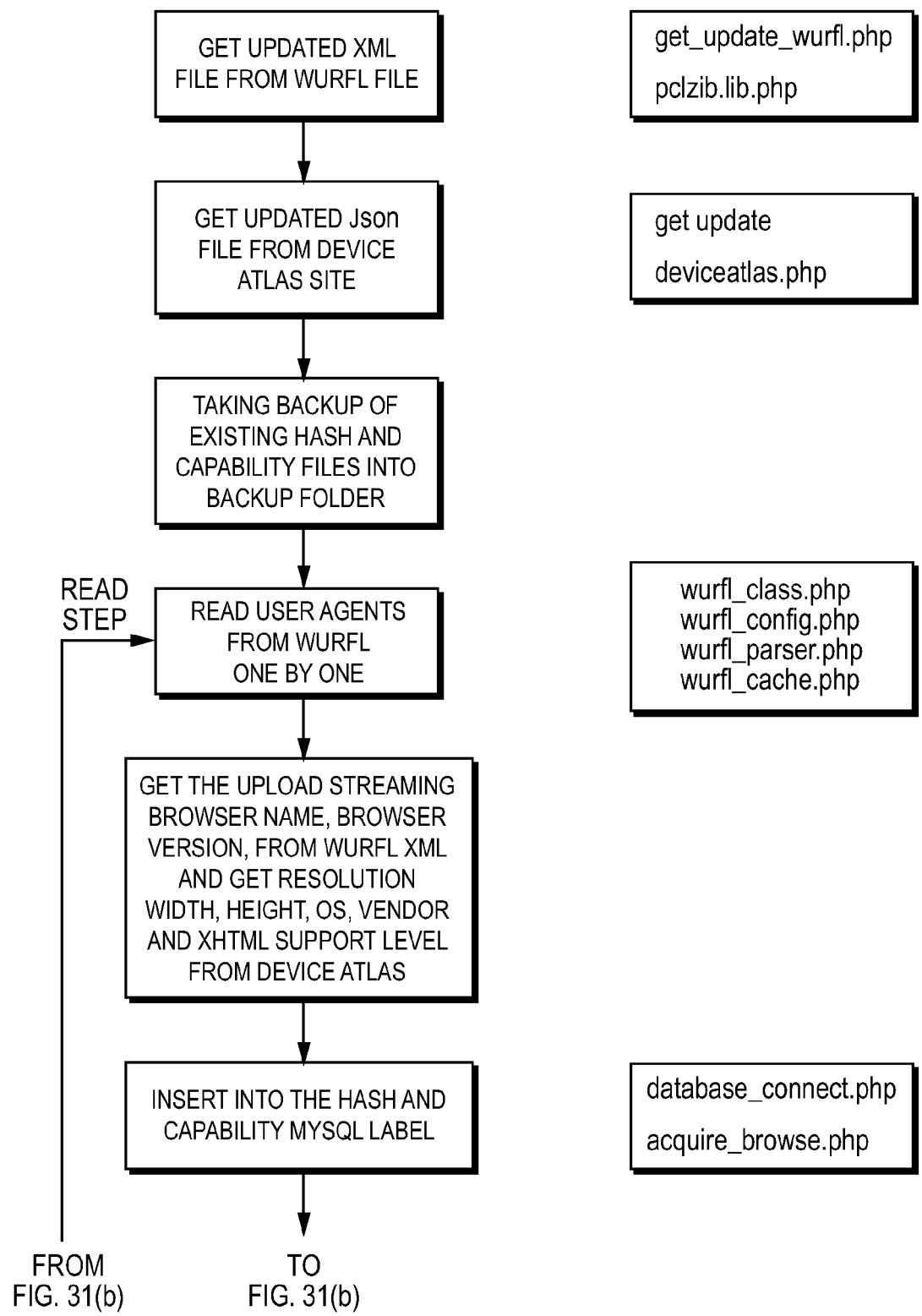
FIGS. 31(a)-32(b) are flow diagrams of the device detection process.
Figure 31B:
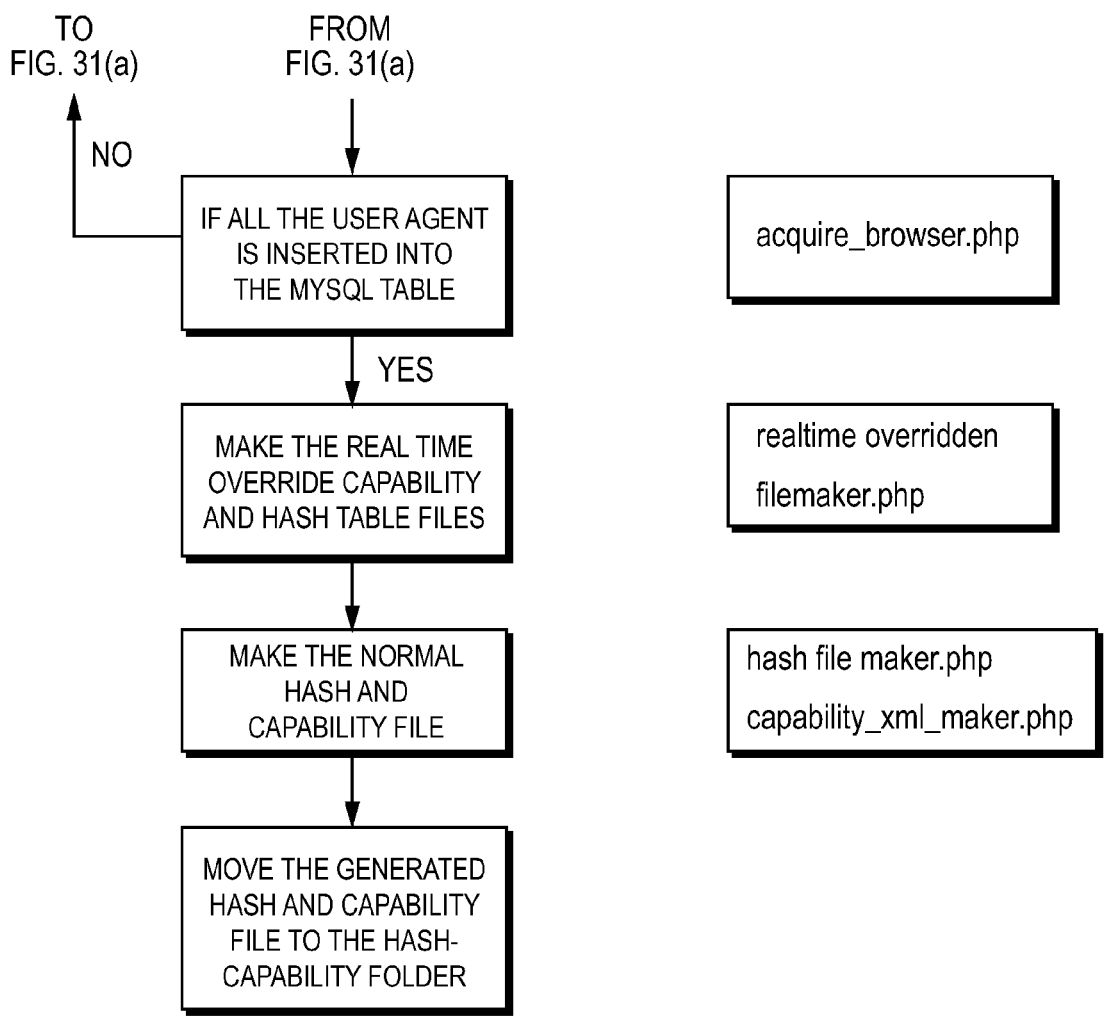
Figure 32A:
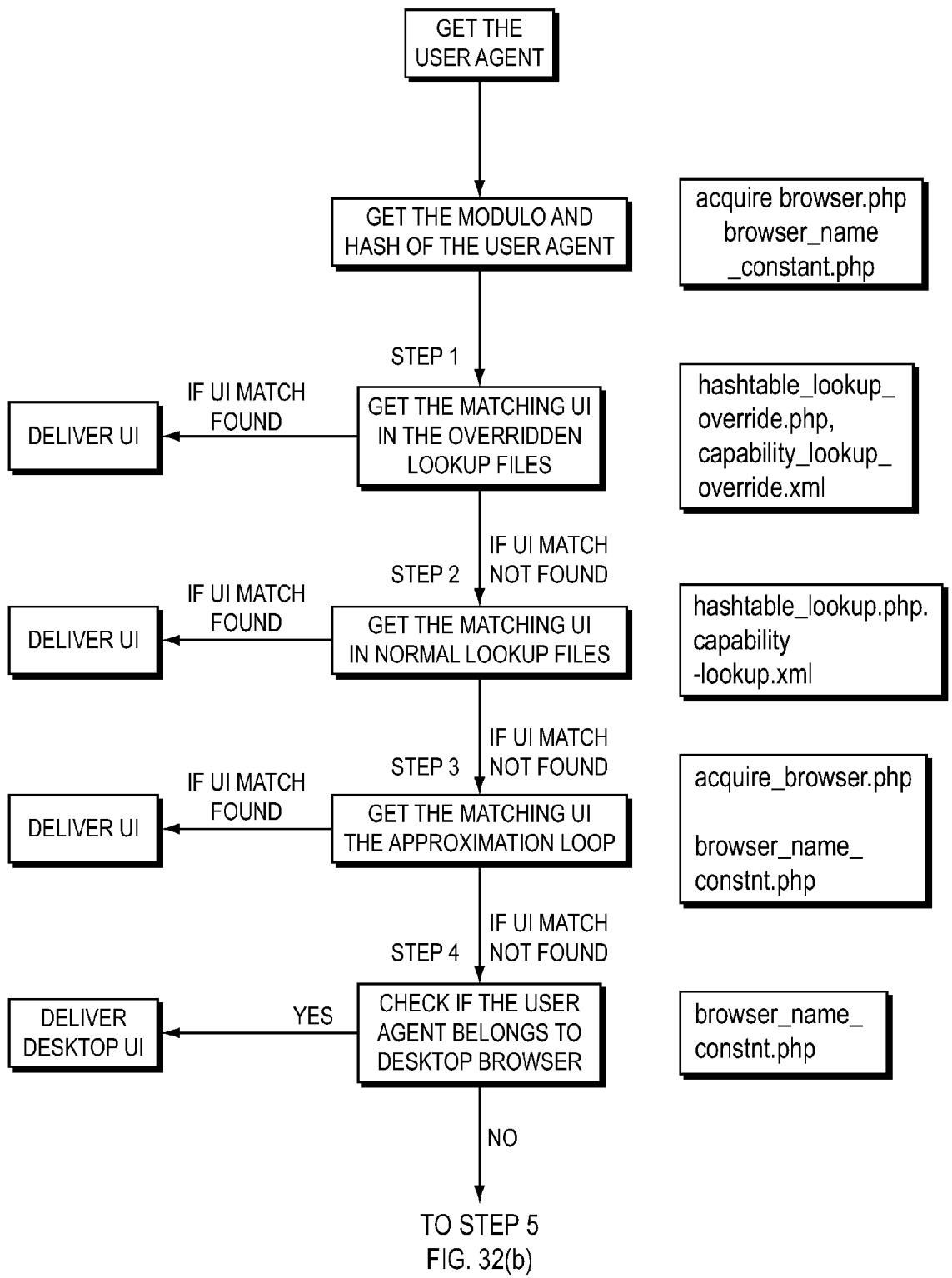
Figure 32B:
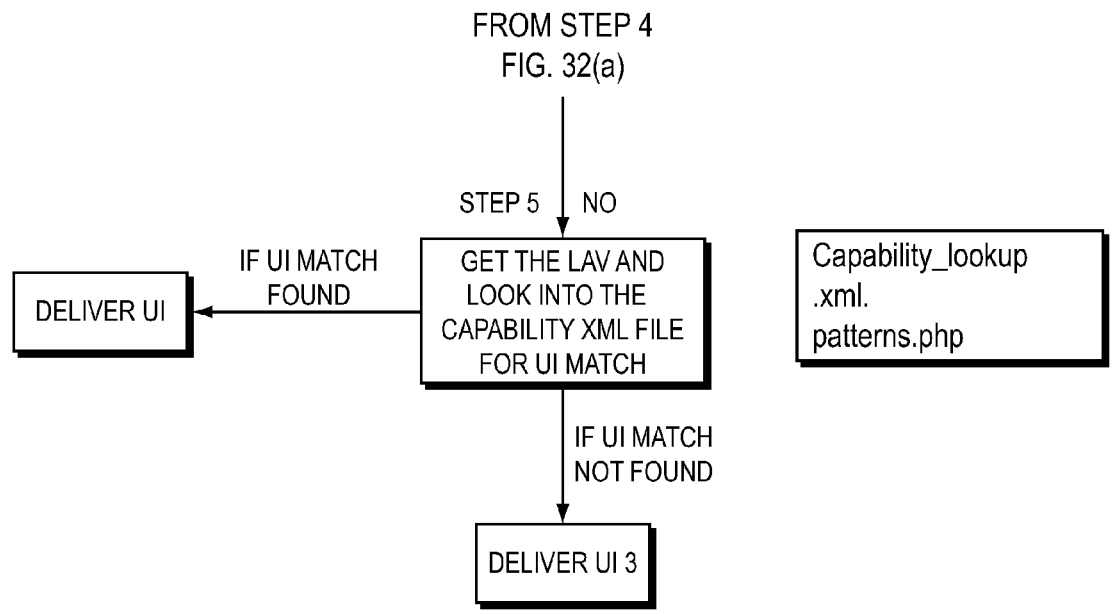

FIGS. 31(a)-31(b) and 32(a)-32(b) illustrate flow charts of the device detection process. FIGS. 31(a)-31(b) show a one-time process of initially populating the MySQL table, and FIGS. 32(a)-32(b) show how a user interface (UI) is selected for delivery during real-time operation.

Personalization and Contextualization

Introduction

Personalization for mobile media is necessary to be able to present relevant content to the end user. This implies that content is selected to match the user's interests—both explicitly stated in a preferences panel as well as predicted based on individual as well as group usage patterns. Another aspect of personalization is to select ads based on user demographic as well as context. More detailed description of these services as well as the implementation of these mechanisms is explained below.

Figure 33:
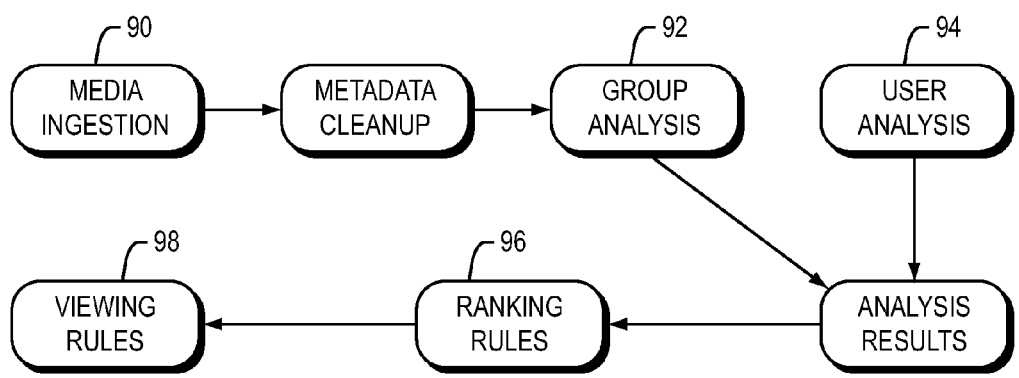
FIG. 33 shows functional components used to achieve personalization.

FIG. 33 shows functional components used to achieve personalization.

Starting from left to right, this process starts with media ingestion 90 at which time metadata associated with the media are incorporated into the Azuki system. Later, group (92) and individual (94) usage analysis together with content provider business rules (96) provide a personalized view tailored to the end user (via viewing rules 98).

Thus, the main functions are:
Processing metadata
  Data: Ingesting of keywords and cleanup of the keywords to process them into metadata tags
  Structure: Determining the inter-relationships between metadata tags
Data cleanup—ensure internal data consistency
Configuration
  Customer driven preferences
Next, we examine how these responsibilities are allocated to various subsystems in the Azuki platform.

Figure 34:
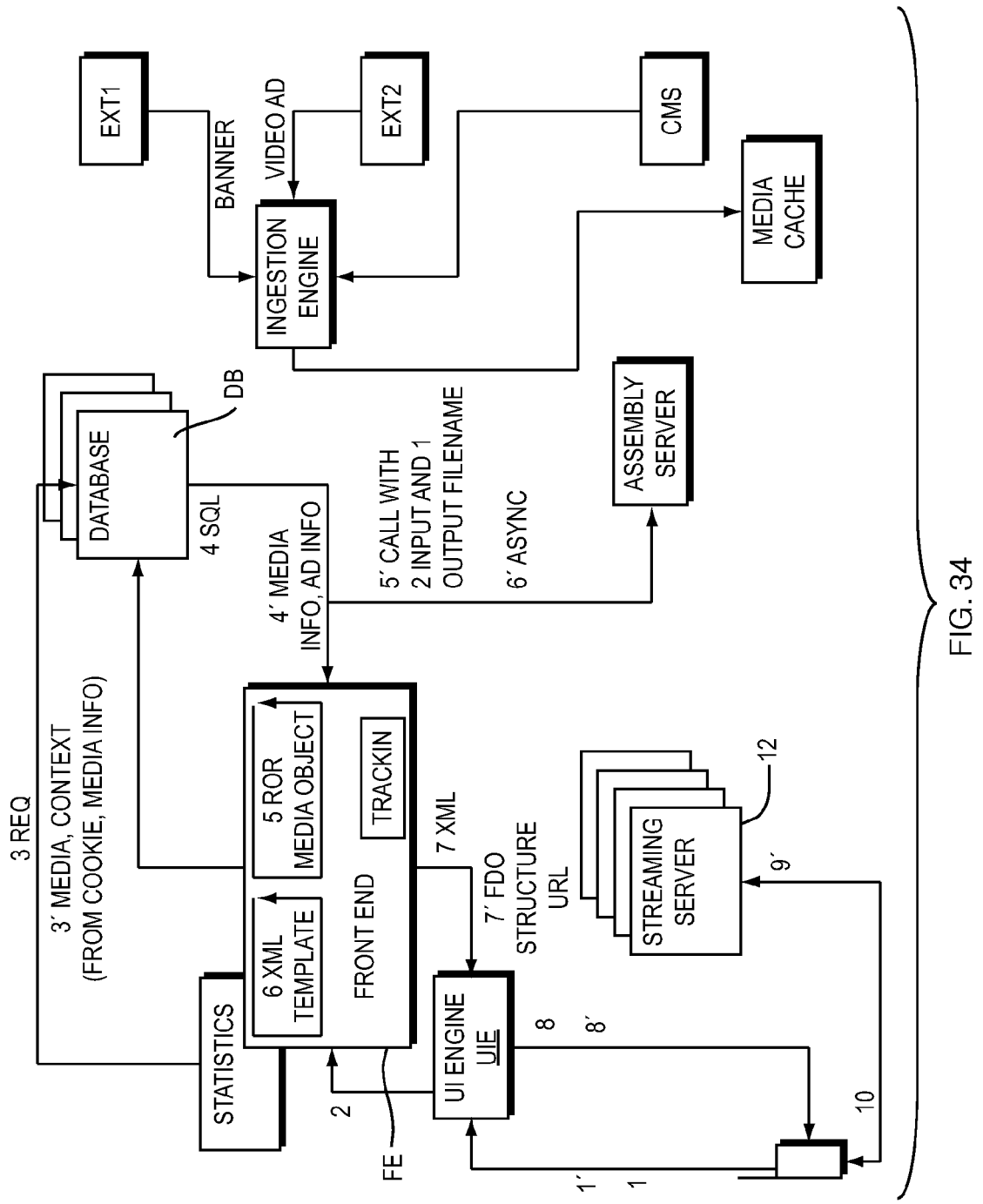
FIG. 34 is a block diagram showing the main functional blocks of the media mashup system.

FIG. 34 shows the main blocks of the Azuki Mashmedia system. It consists of the User Interface Engine or UIE that is responsible for handling all aspects of the User Interaction such as layout, service flow, and CSS generation. The UIE talks to the Front End (FE) via the SOA interface to access the MashMedia services. This is shown in steps 1 and 2 in the diagram below. At this point, the FE queries the database using the explicitly stated user interests and constructs a personalized media list for the user. In addition, a recommendation algorithm creates a media list based on the content provider's suggestions together with any aggregated recommendations such as the top ten, most commented, most shared, etc. These actions are shown in step 3 through step 7 and presented to the user by the UIE in step 8.

The remaining sequence from steps 1' through 10' is what happens when a media is selected for play. The request goes to the UIE and FE where in step 3' the play context consisting of user and media info is passed in to get a contextual ad recommendation in step 4'. Finally, the assembly server is called in step 5' to assemble the Final Data Object (FDO) for delivery to the UIE in step 7'. At this time, it is possible to use statistical correlation on user behavior changes to predict emergent patterns.

Personalization

Personalized media is defined as a set of media that corresponds to the user's context. Personalization is the process of finding and presenting personalized media to a user. Context is defined as "that which surrounds, and gives meaning to, something else". Thus, when a user is located in Boston, the keyword "Red Sox" means something. This is not the case for a user in say India. Thus, keywords in the content metadata have to be interpreted in the user context which is looked up using the user's identity.

The process of personalization involves three distinct steps:

User Identity→User Personalization Array→Personalization DB where
User Identity is a composite ID that guarantees uniqueness across space, time and content
User Personalization Array is a fixed array used as an SQL query predicate in the SQL where clause.
Personalization DB is a database with n-level of keywords that helps organize a content domain into a hierarchical tree organized based on normalized n-level keywords Each of these data structures are described below. However, it is important to also understand that personalization is a property of the aggregate system usage and not of a specific instance of use. However, it is nontrivial to define a metric for direct measurement of personalization. Instead, we use metrics that are, or at least very likely, a consequence of personalization.

User Identity

A User Identity in our system comes from multiple sources. Subscriber ID from a content provider is only part of our internal global ID. Because our direct customers are not always content providers (portals and carriers have their own scheme, on-deck content like ESPN does not control subscribers, carriers do).

Figure 35:
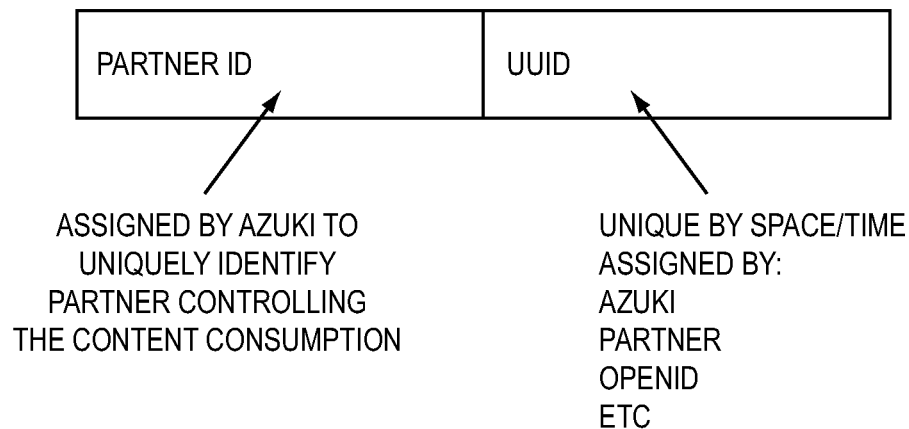
FIG. 35 shows the structure of a global identifier (ID)

As shown in FIG. 35, Azuki Global ID consists of two parts.

The first part is partner ID assigned by Azuki for internal identification only. The 2nd part is system generated UUID. UUIDs guarantee uniqueness across space and time. The coupling of partner ID and UUID guarantees ID uniqueness across space, time and content where content is defined by the partner who controls it. Using this approach, we provide a way to differentiate on-deck content under Verizon vs. content hosted by ESPN directly. Content in this context also dictates the content scope that a partner's subscribers have access to.

Cookies are simply Azuki generated objects that contain, among other things, UUID of the user that Azuki uses for internal indexing and tracking.

The partner field of Azuki's global ID could be one of the following:
Open ID
Azuki assigned partner ID (Verizon, Sprint, ESPN, Yahoo . . . )
User Registration (Azuki assigned)
Facebook and etc. (i.e., non Open ID compliant ID)
User Personalization Array (UPD)
A fixed number of real time dynamic contextual hints could be inserted by Azuki automatically. They are:
Date and time of content creation (this allows weeding out of older content).
Content expiration data (this allows proper DRM management of certain copyrighted content).
Location specific data (GPS or device specific location services)

Other than the system generated fields, User Personalization Array is the SQL key into the personalization database. It presents a normalized key, partially filled or generated based on available personalization data acquired in real time or via user generated key words to indicate preferences. The key point here is that the UPD must present a normalized key that the system can use to query the Personalization Database.

An example of a normalized UPD, partially filled, is:
Baseball-Red Sox-Ortiz:Acton, MA:Wednesday, Jul. 1, 2008
which is used to obtain a set of contextual records from the PDB.

Personalization DB (PDB)

The PDB is initially created as part of the content ingestion process. How the PDB is populated will be different depending on the content source.

For user generated content, we define, as part of the upload process, a keyword form that can be system generated but user modifiable. This becomes an alternative way of content ingestion.

For Internet content via media RSS, we need to figure out a way to self-generate certain key words as part of the ingestion process because it is unlikely that these key words exist as part of the RSS input.

Regardless of the type of ingestion, behavioral and usage data are dynamically updated in the PDB so as to create usage related bias. First, let us look at how a PDB might be organized in a manner that is natural for its content space. Noting that the PDB is used to query for personalized media lists, we look at some typical usage patterns.

Check the scores; check the plays; check the rival teams;
Check the market; check the news headlines; check weather;
Check the replay; check the score; check the score of another team In all these usage patterns, we find certain keywords appearing together such as—rival teams; regional teams (Sox, Celts, Pats); regional data (market, news, weather). These behavioral patterns can be called "local", "regional", etc.

There can be a hierarchical relationship that can help organize these keywords into these types of patterns, for example in the following sense:

Boston:
  RedSox:
    Ortiz:
  Patriots:
    Brady:
  Celtics:
    Pierce:

One goal of normalization is to help with the learning of context, i.e., disambiguating the meaning of a keyword. For example, Sports/Soccer/Mika a soccer player is different from an artist by the same keyword such as Music/Artist/Mika.

The other goal is to enable keywords need to be normalized to fall into buckets that represent a concept. The hierarchy together with a bucketization dictionary achieves this goal. The simplest normalization is using a synonym dictionary. The buckets may be represented by the root-to-leaf path in the normalized tree.

The other goal of normalization is achieved by adding contextual hints to the keywords in a hierarchical manner. Thus, when we learn about the context we augment the keywords with the context. We have to discover the context using the normalization hierarchy and find out what portion of that hierarchy we are in. This will let us place keywords in context.

Media companies and content providers go through a rigid, systematic process to ingest content for mobile consumption. That is our initial focus. For that type of customers, we institute a "Key word Normalization" process that helps Azuki index and organize content based on a multi-level keywords based tree. An example of a hierarchy starting from the highest to the lowest level is: Baseball-Boston-Red Sox-Manny.

A data model for this hierarchy is shown below. Three tables are employed.

| Metadata ID | Parent ID | Level |
|---|---|---|
| 3 | 2 | 3 |
| 2 | 1 | 2 |
| 1 | Null | 1 |

| ID | Value | Cat. ID |
|---|---|---|
| 3 | Redsox | 1 |
| 2 | | 1 |
| 1 | | 1 |

| ID | Name |
|---|---|
| 1 | Keywords |

Note that the hierarchy is represented as a tree—tabular arrangement where the first table denotes the parent-child relationship among metadata tags. Also, this is strictly not a tree rather a directed graph. Thus, we note that metadata tag with id 3 has tag 2 as parent. The id is a foreign key from the second table that associates it with a specific type-value pair of keyword and "Redsox".

The normalization process has three steps:
1. Create a set of hierarchical keyword classes
2. Reorder any collection of keywords in the descending order.
3. Fill in any missing elements with a missing keyword marker.

Keyword class hierarchies are created at ingestion using a tool to map often structure-less tags that are basically UIDs into a hierarchy. The exact mapping is determined based on customer input and might involve a survey of their existing web sites, and may involve two steps:
 Map metadata consumer facing metadata taxonomy to our system
 Map consumer specific metadata taxonomy into our system The first step concerns surface metadata that might be used in presentation to the consumer. The latter concerns the demographic metadata that is relevant to the system.

Keyword Ingestion

Figure 36:
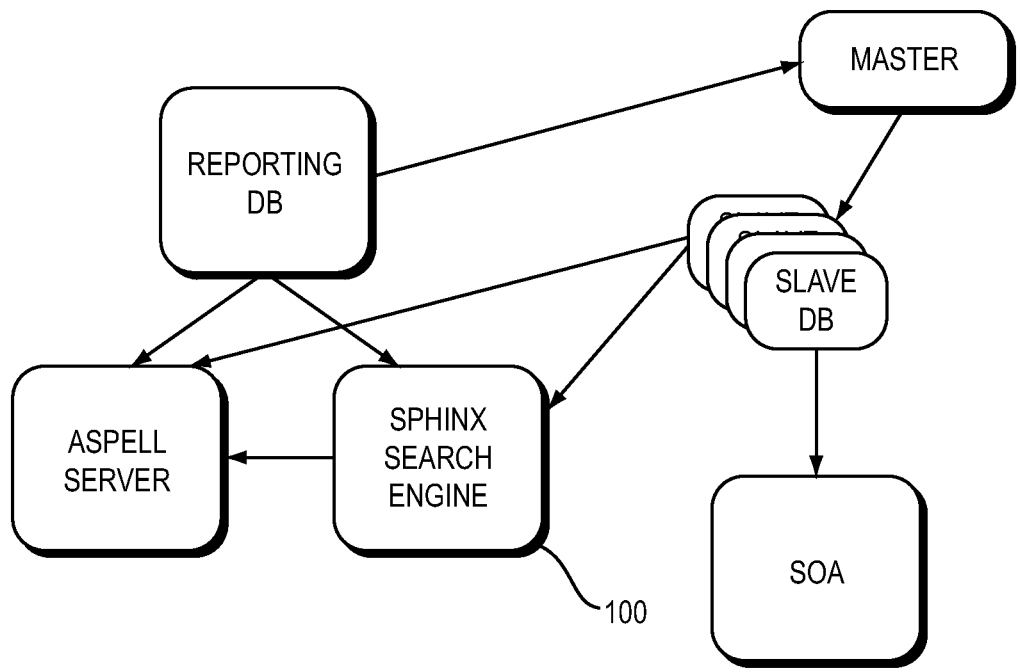
FIG. 36 is a block diagram of a keyword ingestion subsystem.

Good results need good data. In the personalization system this means we need to clean up keywords that are ingested into the system both at media ingestion time and as part of searches. The main sub-tasks here are:
 Determining matches during ingestion
 Fixing Misspellings
 Determining Related words The Keyword Ingestion Subsystem is described with reference to FIG. 36. A Sphinx search engine 100 implements "imperfect" search using misspelled keywords, related keywords, and weighted searches. It can be used for real-time search queries as well as for online media metadata ingestion. In the case of metadata validation, a set of keywords are sent to Sphinx and if a keyword is returned with a % match greater than a configurable threshold, then we ingest it. If a keyword match is below the threshold, we create a new keyword and add it to the database and re-index.

Personalization Algorithms

Multiple algorithms are employed for achieving a personalized experience. In general, three categories of selections are used: explicit content provider campaigns; individualized user preferences; as well as statistical models for aggregate and pattern behavior learning models. The content provider can control via the ops console the percentage of mix among these categories.

Examples of explicit rules for content placement include:
 Prioritize newer videos over older videos
 Put direct metadata media matches at the top of the list.
 Push seasonal material to the top.

User preferences are matched using the UPD query against the database. The matching process against the UPD query results in a sub-tree of paths that are most relevant to the user's context. The UPD and PDB are normalized using the same schema and hence a procedure like the Longest Prefix-Match (LPM) could be used to discover the matching sub-tree. [Note: In a database, this is equivalent to looking up adjacent rows in a set of sorted columns. However, this depends on having a well-populated UPD which requires a dynamic learning mechanism to accumulate keywords based on user behavior.]

Figure 37:
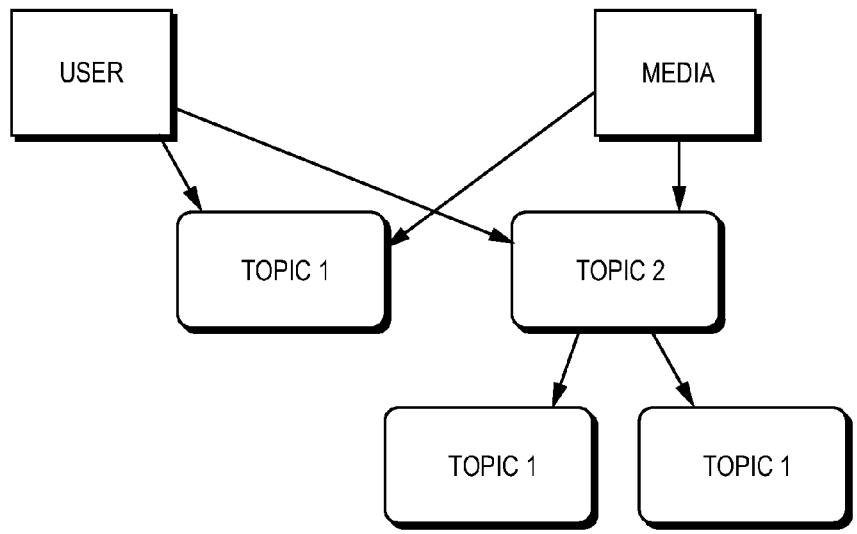
FIG. 37 shows a matching process used in personalization.

FIG. 37 shows the matching process. For example, User A has expressed interest in topic 1, which is a metadata entry. Also, User A has expressed interest in topic 2, which is a metadata entry, with a set of child metadata entries, such as 'Red Sox', with the children being 'Manny', etc.

Lastly, individual and group behavior are tracked using a combination of statistics and learning models based on weights with a feedback mechanism and controls for reinforcing and forgetting. The group behavior is summarized using familiar statistical measures including:
 Most recent
 Most popular
 Most viewed
 Most shared
 Most Likely to watch
 Most Likely to rate highly
 Most Likely to share with friends
 Other correlation stats include:
 Exact match based on preferences
 Most likely to watch next The ops console should allow controls for composing the personalized playlist such as:
 Percentage: 20/40/40 of recent/personalized/most popular
 Different rules based on demographics
 Source (e.g. internal vs. syndicated)
 Seasons or Time of day/week/month Behavior Learning One aspect to personalization is to adapt to the user's tastes and present a fresh view reflecting both the user's own changing tastes as well as recommendations of content from a media circle that is inferred from the group behavior. Let us take a moment to review the idea of a media circle.

A media circle is defined to be a collection of users that happen to share similar tastes in media. A user might belong to multiple media circles at the same time. A media circle can be implicit and its membership fluid and correlate to user attributes. This definition allows for the notion of a media circle to correspond to a set (or sequence) of media items that are related either explicitly by a person or indirectly by social influence where a linkage is established based on the cross correlation of group behavior.

Figure 38:
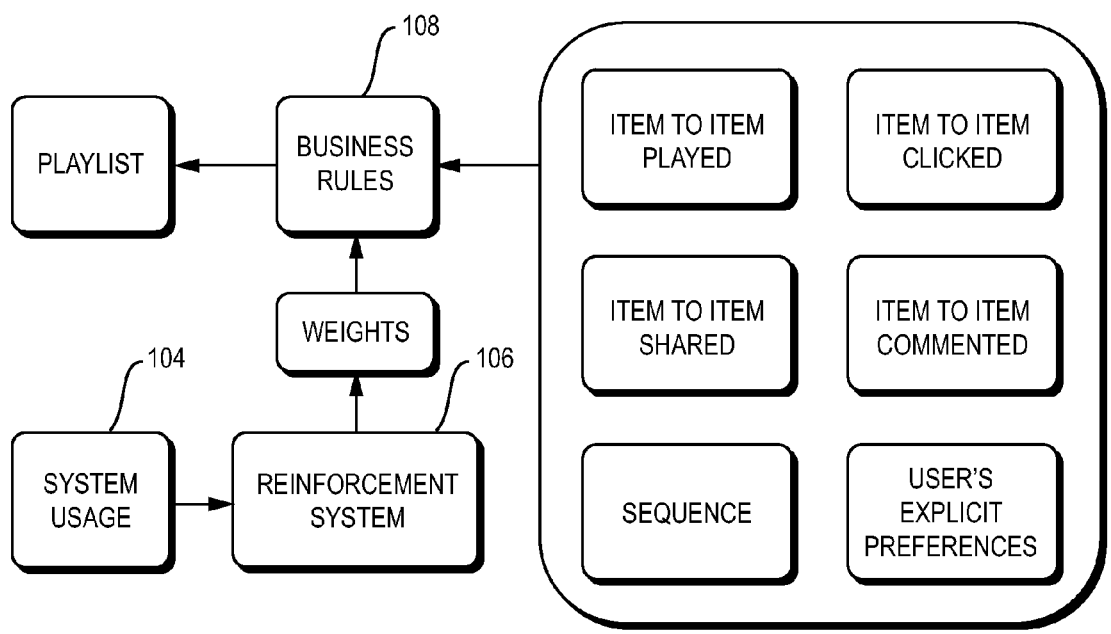
FIG. 38 shows a general model of a learning subsystem.

In this section, we will describe learning algorithms that track individual user behavior that are then used in conjunction with group level correlation to arrive at personalized content recommendations. FIG. 38 shows a general model of the learning subsystem described in more detail below. Usage stats 104 are fed into a feedback-based reinforcement function 108 whose outputs are weighted against business rules 108 for various types of usage patterns such as clicks, views, plays, sharing, comments and explicit user-stated preferences.

Context Learning Algorithm

We try to learn the context by doing the behavior analysis. This will help us figure out what we need to filter against. We assign and adjust weights to this learning. Thus, the weight of a leaf is the sum of the root to leaf weights. Note, that it may be necessary to assign weights to the different parts of the name. When, we assign a weight to a non-leaf node (in our normalization hierarchy), it has the effect of influencing the sub-tree below for selection. This normalization hierarchy is constructed to create localization and other such behavioral patterns. A weight for a non-leaf node is assigned by a diffusion technique where we spread the weights along the path to the root using a decaying factor. This type of learning helps protect against getting too narrowly focused and missing the forest for the trees. Also, one can expect to get higher reliability at higher levels of the hierarchy when reinforced by weights from the leaves. This is especially useful in the situation where one has a hierarchy that looks more like a forest than a single tree—such as in the case of a broad portal. Then, it becomes useful to be able to know which tree is currently being visited to more by the user. The correlative and diversity portions of learning algorithm (below) can be tailored around the current portion of the hierarchy rather than uniformly scattered.

Individual Behavior Adaptation Algorithm

Figure 39:
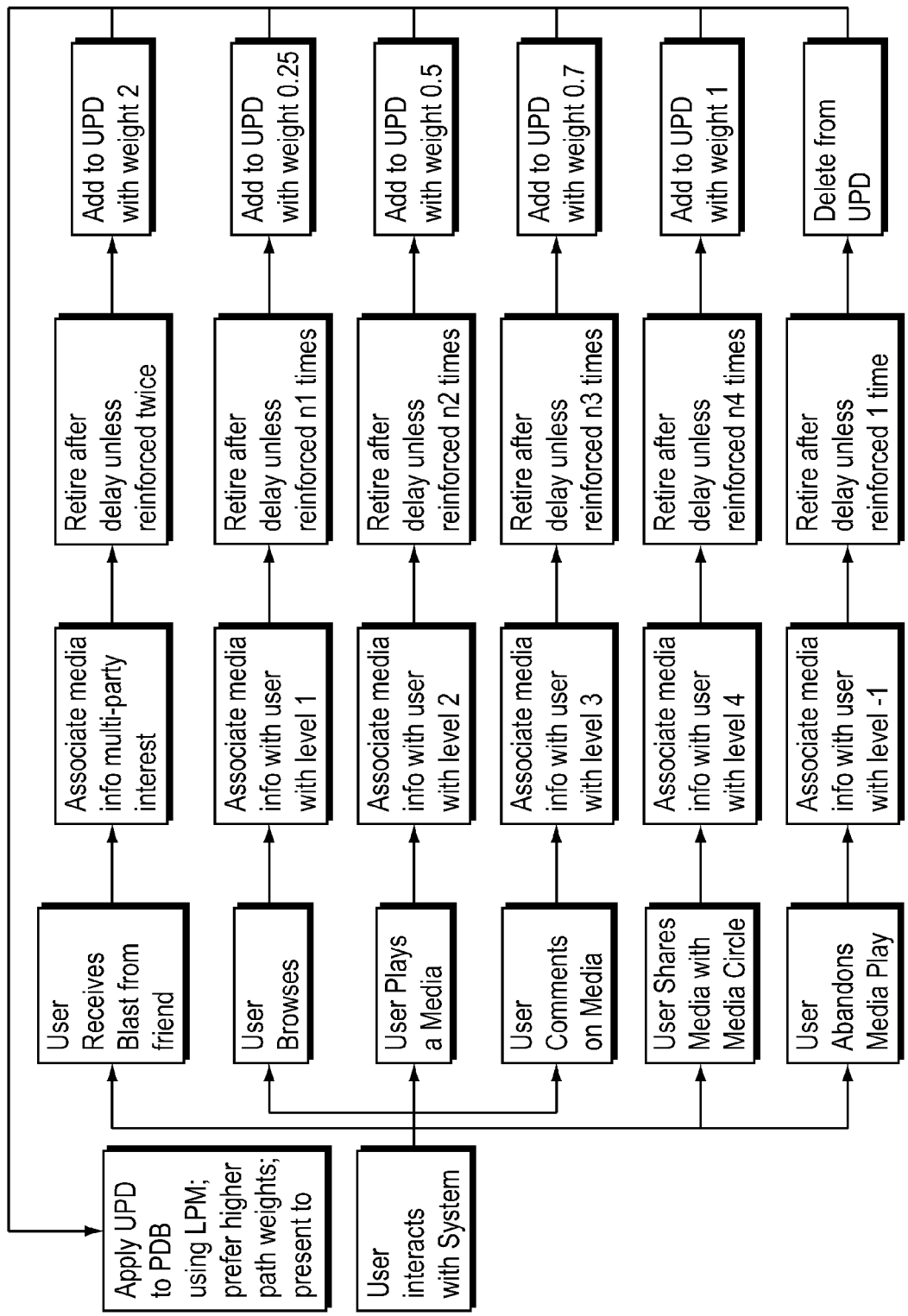
FIG. 39 is a description of a process of learning user behavior.

The algorithm shown in FIG. 39 is used to learn user behavior based on user actions that are used as inputs. It is a simple weighted summing algorithm and appears to be promising in simulations. We are able to vary the UPD while respecting the user's preferences. However, tuning may be desired to avoid losing accuracy of personalization.

Note that it may be necessary to have a separate table consisting of weights, paths, and user in order to capture the dynamic weights. This above learning algorithm uses a simple-weighted learning method with a forgetting feature. It is meant to be used as part of nightly log processing. Simulation shows that this algorithm does a good job of maintaining user preferences while also introducing a diversity of other content. However, more fine-tuning is needed to avoid losing focus. One area of promise is to combine this algorithm with the cross-correlation or the slope-one described below.

Cross-Correlation Algorithm

Another type of learning algorithm is where one correlates using a cross-correlation matrix the probabilities of watching a group of media together. This matrix is built up aggregating statistics from multiple users. In the figure below, the rows and columns are the media items. The numbers in the table represent the probabilities of going from video to video. Thus, for example, the probability of going from Video A to Video B is 0.2 whereas the probability of going from Video B to Video A is 0.7.

|         | Video A | Video B | Video C |
|---------|---------|---------|---------|
| Video A |         | .2      | .5      |
| Video B | .7      |         | .5      |
| Video C | .1      | .8      |         |

The steps of the algorithm with a worst case of $O(M*2N^2)$ for M consumers and N media items as follows:

For each item in product catalog, I1
  For each consumer C who purchased I1
    For each item I2 purchased by consumer C
      Record that a consumer purchased I1 and I2
  For each item I2
    Compute the similarity between I1 and I2

One drawback with this approach is that it may not be useful for short-lived content such as news clips because it can take longer to compute than the lifetime of the content. In this case, we might want to explore the same algorithm but applied among groups where a group is defined as the items that fall under a single node in the hierarchy. Here one can expect that there is enough relevance for the stats for a longer time frame. However, it can suffer from lack of precision especially if media items are non-uniformly distributed in the tree.

A simpler algorithm called Slope One is described next.

Item-to-Item Algorithm

This approach tries to predict a media item/group that might have relevance based on another one. Then, the system could recommend this media item after the user has seen the other one. We use linear regression in the form of $$f(x)=x+b \text{ (with slope=1 and hence the name)}$$

to find the "next item" relationship.

First, we compute a relative ranking among items of equal popularity. The algorithm is based on a simple "popularity differential" which we compute by subtracting the average rating of the two items. Considering only users who rated both A and B, say that there are 10 such users, we sum the ratings that A and B got, say 55 and 75. Items are recommended based on the smallest differential with a high degree of confidence that it would match the tastes of the user. This algorithm would be less useful if the number of media items were small and would take training time and might be less useful if the content changes rapidly. The resulting matrix is symmetric.

The steps involved are:
Look up item 'dev' which have been viewed/shared/commented/rated
Weight them if they are rated, else assume min or max rating.
Sort based on similarity

|        | Item A | Item B |
|--------|--------|--------|
| Item A |        | 0.8    |
| Item B | 0.8    |        |

Personalization Metrics

The following metrics are expected to measure personalization—barring other extraneous factors such as congestion, etc.

% repeat visitors—detects a failure of personalization in the sense that a low value would very likely not imply high degree of personalization;

Videos watched—also detects failure of personalization because a low value would imply a low degree of personalization;

Page views per visit—measures personalization in the same manner as the previous metric;

premium videos—measures personalization in the positive direction because a low degree of personalization could not result in a high value of this metric.

ads served—again measure personalization in the positive direction as before.

Contextual Ads

Contextual Ads are shown that are compatible with the user's viewing context which includes dynamic attributes such as the time and location of the user's viewing as well as static ones such as the user's profile including gender, age, address, occupation, etc. Other relevant attributes are about the viewing device and the media being watched. These are also part of the user's viewing context.

To understand this service, let us consider a couple of use cases: (1) a college age sports enthusiast watching the latest Red Sox game on his newly acquired iPhone; (2) a middle-aged professional checking the market conditions on his blackberry.

In case 1, lets say the user has selected to watch a home-run highlight on his phone. He might be at his dorm room taking a study break. The ad shown will be something that is compatible with his demographic such as a new TV or web show or something that is compatible with the specific media such as Red Sox tickets for an upcoming game.

Similarly, in case 2, lets say the user is watching a newscast clip on the latest market developments. He might be at a restaurant during lunch hour. The ad shown will be something that is compatible with the demographic such as a new car or iPhone or something contextual with the media such as a financial service.

What is Contextual?

Context is defined as "that which surrounds, and gives meaning to, something else".

In the case of ads, ads are presented to the user that are related to the user's viewing context, i.e., related to the user's personal situation or to the media being watched.

First, let us look at what we mean by context. To begin with there are two types of context: user and media. User context itself divides into two types: one that changes infrequently such as gender, age, address, occupation, and viewing device; and another that changes frequently such as time and location.

The media context refers to the media categorization that in general can be organized in a hierarchical manner such as "Sports.ESPN.Baseball.RedSox.Manny". This information is fairly static at the upper levels of the hierarchy because one presumably would stay with a particular top-level domain for a bit before switching to a different context noting that at the highest level we expect only about 15 different top-level domains. However, we can expect it to change more at lower levels of the hierarchy such as when one changes from Manny to Ortiz.

Requirements for Ad Network Interface

The following represents requirements from a particular ad network company. These are generic enough that it is quite possible that others are pretty similar in their requirements.

1. The request to the ad server must be using weighted categories presented as an ordered list. They support both REST and SOAP API via a key word vector consisting of key words (in the order of contextual significance). Key words are ASCII strings but since they represent category/subcategory names, the ad industry has a set of commonly used key words that are widely used. Key words could change, but they change infrequently.
2. As part of their REST interface, we are supposed to flag if the content is related to 1). Pornography 2). Gambling 3). Alcohol. If it is related to any of these, we must flag it (as required by advertisers and by law not to sell certain products for certain demographics). Via this approach, we bias the ad selection mechanism.
3. There are pretty well defined demographic definitions in the ad industry. There are a total of 9 categories and only the first three are most important for ad serving (sex, age and occupation).
4. The ad networks do not keep or disclose user level stats (so to stay clean from any privacy concerns). But they do data mine at the aggregated level down to per content level. These stats provide a weighted content access history that we can tap in both for our Ops console and as input to our content weighting algorithm.
5. The reports target only advertisers, so it becomes clear that we must do user-group-content correlation reporting ourselves. At least, we know where to focus on in terms of what to log and what to report.
6. The explicit way of putting up a subscription page and asking very explicit questions tend to turn off users. Instead, contextual data collection should be implicit, more indirect and etc. For instance, on the iPhone, a user can set up the "local weather" he wants to track, can set up the local clocks that he cares and etc. From the local weather a user sets up, it gives some hint to the "home base" of the user. From the clock setting, it gives the time zone hint and etc. So, the process of user identity collection is by inference and by learning, much less by asking explicit questions. Given that there are only 3-4 key words that advertisers look for (age, gender and occupation), as part of our UI, we actually try to seed content that provides some clues.

It is clear that we are in a better position to adapt our contextual intelligence in real time while ad networks can hold a much large data set and content space and can correlate better for "offline" contextual intelligence. The two are complementary and are consistent with our view of interfacing to external recommendation engines are needed.

Ad Stitching

Clearly, context changes and the system needs to respond accordingly with what is being presented to the user. We achieve this functionality with a collection of tools ranging from real-time stitching to context caching (as defined below) depending on the scale of the applied load. This is explained in detail below.

Real-Time Stitching

This function refers to the process of combining an ad and piece of media while serving it out in real-time to the end user. During the process, the stitched media is also cached for re-use. This function is resource intensive and requires the use of multiple specialized servers that have integrated disk arrays in order to serve about 5000 requests per sec per server.

Context Caching

Figure 40:
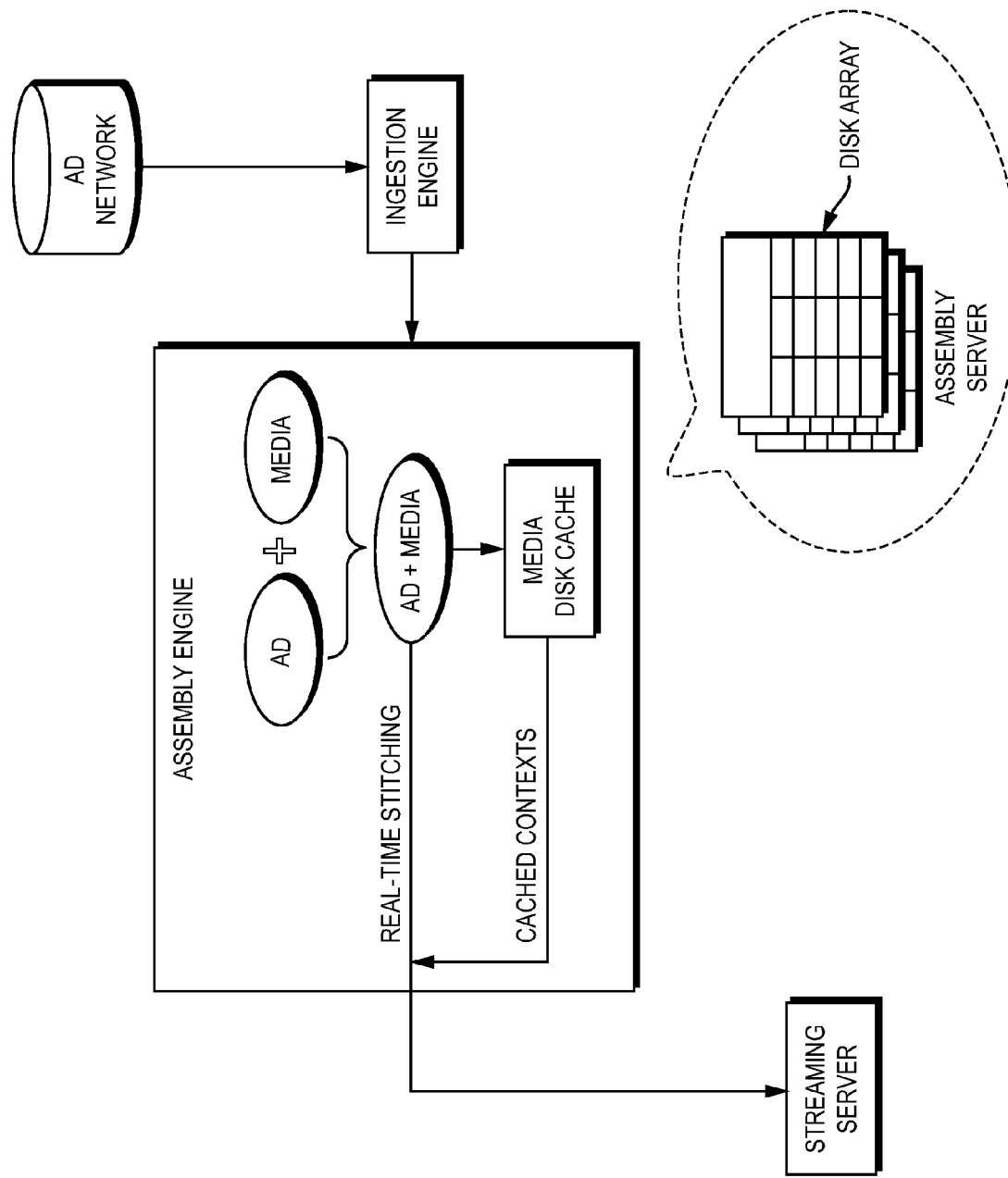
FIGS. 40-41 illustrate a process of real-time stitching of media including the insertion of ads.

This function refers to the process of serving contextual ads from cached copies. The only difference between this and real-time stitching is that we are serving the ad from a cached copy. The challenge of course is to ensure that we have enough space to cache the ads. Here we employ the following assumption: dynamic ads are served initially via real-time stitching and later from cached copies. FIG. 40 shows the message flow that achieves this.

Message Flow

Figure 41:
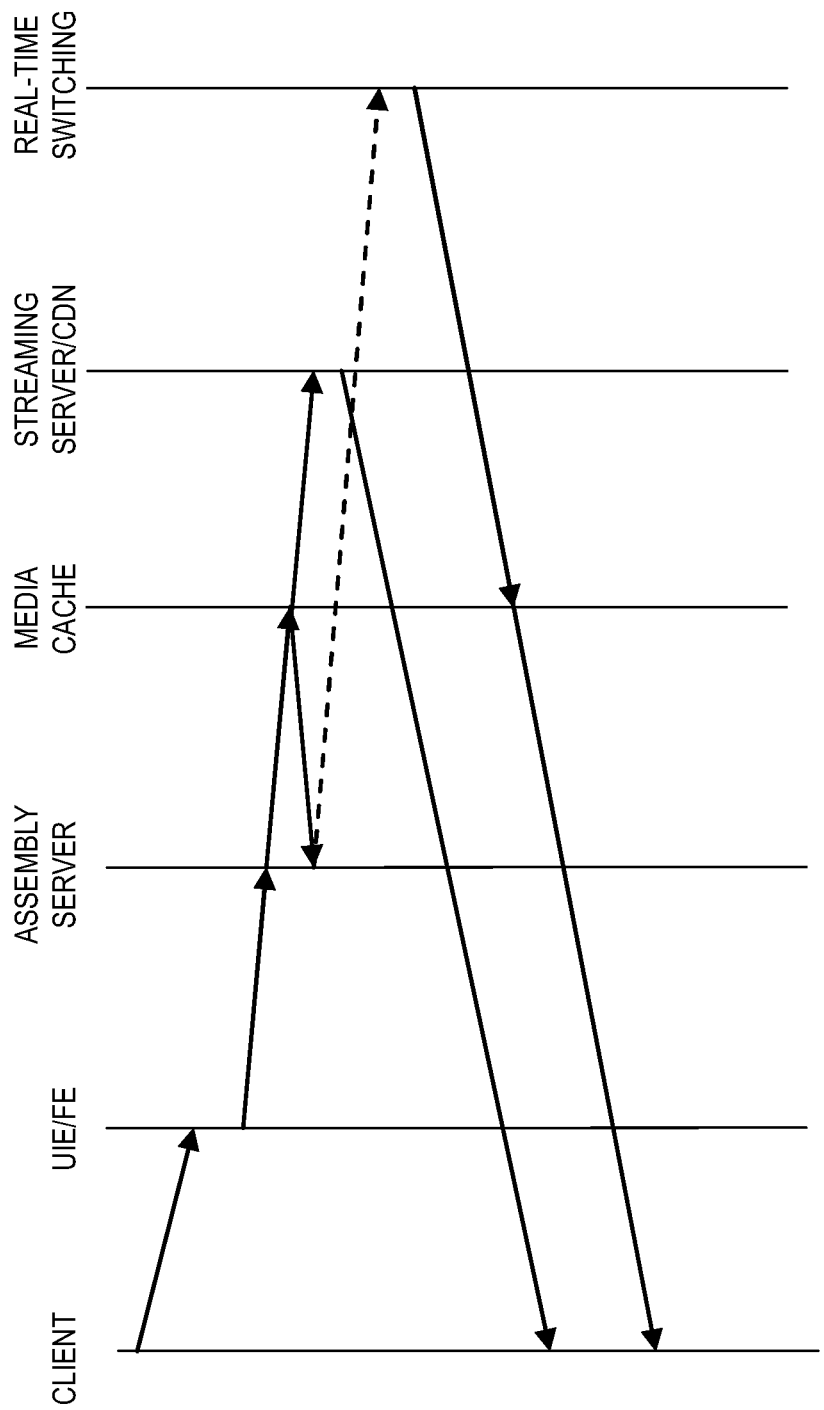

The flow starts with the client issuing a request to watch a piece of media. This results in a request to the assembly engine to get the media and prepare it with a contextual Ad. If a cached copy exists, then this is sent to the streaming server via a socket from which the streaming server copies to the destination. Otherwise, a real-time assembly is performed and the Ad and Media files are read and combined in memory and streamed out by the socket interface to the streaming server while the combined file is also written out to the cache. This is shown in FIG. 41.

Combining Rules

The combining rules for this mashup are:

The Ad and Content have to have the exact same resolution and bit rate.

The Ad is assumed to be attached to the Content in a pre-roll configuration.

The Ad and Content are assumed to have been previously ingested into the system.

Data Model

The source media in the system is identified by the media ID which is a unique identifier that specifies the requested content and a different unique identifier for the Ad media. Note that each representation of the content may have its own unique identifier called an FDO identifier. In other words, there would be one FDO ID for each of the different transcoded formats. The same may be the case for the ad. In addition, the media ID is also coded into the file name for tracking and billing.

The combined media is has a unique identifier and is stored into a cache where the key is the combination of the Ad and Content media IDs.

Scalability

The scalability of the Contextual Ads MashMedia service depends on the idea that there are not too many number of contexts that are reusable for the aggregate and hence it is possible to reuse previously used FDOs (Finalized Data Objects) which in this case are media mashed with contextual ads.

Context Caching is determined by noting the following points.

The total number of different contexts generated by the viewership of a clip is calculated as:

$$N\_viewer = Formats \times Time\ of\ Day \times Region \times Age \times Gender$$

The total number of Ads available for combining is calculated as:

$$N\_ads = N\_viewer * Keywords\_per\_clip$$

where Keywords_per_clip is the number of keywords available for selecting Ads over a certain clip, e.g., Golf, PGA, Tiger.

The maximum number of contexts to be cached per clip is calculated as:

$$N\_contexts\_max = N\_viewer * N\_ads$$

Clearly, N_contexts can be large on the face of it. However, we have some constraints that allow a practical solution. For example, frequently clips are an alias for gender and age. In other words, advertisers often use a clip's keywords to identify and target a demographic. Note that the keywords associated with a clip are assumed to be hierarchical as previously described. Under spike loads, the longest matching path of the hierarchy may be used in order to reduce the number of cached contexts.

Time of day is a contextualization hint that may be used to refine the selection of ad. Similarly, location can be used to regionalize ad selection. Initially, however, we are not going to worry about regional variations because we may not have access to location.

Thus, we derive the following formula for N_contexts_total, the total number of contexts that needs to be cached for short tail content is:

$$N\_contexts\_total = Formats \times TOD \times Clips \times N\_ads = 3 \times 4 \times 20 \times 5 = 1200$$

$$N\_contexts\_spike = 300\ per\ TOD$$

where

Formats=3 for (WMV, QT, and 3gpp)—assuming only high-resolution and progressive download TOD=4 for different times of day for time-specific targeting Clips=20 to account for the short tail content N_ads=5 per hierarchical keyword sub-tree such as "ESPN-Baseball-RedSox" and TOD, based on the 50 ads that might be used during a day divided by 10 hierarchical Keywords in a sub-tree The storage requirement is about 300×2 MB=600 MB per spike. Clearly, this is not a large amount. Also, the upload time to pre-position a CDN cache is about 10 minutes.

Next, we describe how long-tail requests during a spike are handled. The load balancer bypasses the CDN by using a layer 5 content rule and pass through the long-tail request onto the Azuki system which would perform real-time stitching on the content. However, we would need as many as 40 servers to handle these long-tail requests.

Another approach under study is to use a memory-based storage appliance such as the G100 from Gear6 which can handle as many as 10,000 requests per second. (Only about 8,000 requests per second is needed to handle the long-tail requests during a spike.) However, this is a fairly expensive piece of equipment and may be used only if it is justified by the business economics.

A more economical way to deal with long-tail during a spike is to use pre-stitching of long-tail content based on some high-level keyword with periodic refresh to round robin through the ads and cycle through them once a day. The mathematics of this approach works as follows:

$$N\_contexts\_longtail = Formats \times Clips \times N\_ads = 3 \times 10000 = 30K\ per\ cycle.$$

where

Formats=3 for (WMV, QT, and 3gpp)—assuming only high-resolution and progressive download Clips=10K to account for the long tail content The storage requirement is about 30K×2 MB=60 GB per cycle. This would take 5 assembly servers for stitching and caching.

Finally, there is the case of an unexpected spike or what is usually termed as a "Flash Crowd". This may be handled using a combination of techniques including a "waiting room" as well as "server busy—try later". The flash crowd is indicated when the number of active sessions exceeds a threshold and the request is not for a pre-positioned content which the layer 5 rule would catch on the load balancer.

What is claimed is:

1. A method by which a server system enables sharing of media among client end devices, comprising:

segmenting relatively long media objects into shorter, independently referenced media chunks;

transcoding each of the media chunks into one or more distinct transcoding formats compatible with respective client end devices for rendering thereon;

enabling user manipulation of references to the media chunks including transmission of references from one client end device to another to enable user sharing of a viewing experience; and upon activation of a reference to one of the media chunks at a client end device, supplying the media chunk to the client end device in a respective transcoding format compatible with the client end device for viewing thereon, wherein the server system automatically detects a client end device based on a combination of one or more properties of an operating environment of the client end device, the properties including identifications of a browser and an operating system executed by the client end device, by:

maintaining a device database populated with information describing media-related capabilities and attributes of a plurality of client end devices;

upon receiving a request message from the client end device, applying a user agent (UA) identifier from the request message to the device database to identify a best-matching user interface (UI) to be rendered on the client end device; and supplying the best-matching UI to the client end device in response to the request.

2. A method according to claim 1 wherein maintaining the device database comprises:

obtaining device information from one or more published device databases including first information about the plurality of client end devices; and adding the first information from the one or more published device databases to second information regarding use of the plurality of client end devices in a distributed media sharing application.

3. A method according to claim 1 further comprising determining the best-matching UI to serve to the client end device based on xHTML properties and cascading style sheets (CSS) attributes of a browser executing on the client end device.

4. A method according to claim 1 wherein the best-matching UI supplied to the client end device dynamically enables operating features of the client end device based on the capabilities of the client end device.

5. A method according to claim 1 further comprising executing a series of tests for determining the operating environment of the client end device and populating the device database accordingly.

6. A method according to claim 1 wherein the device database is configured to categorize the client end devices into a plurality of UI categories including touch-based, table-driven and single-column categories.

7. A method according to claim 1 wherein the device database is configured to categorize the client end devices into a plurality of media viewing categories based on distinct transcoding formats used for media playback on the client end devices.

8. A method according to claim 1, further comprising:

maintaining digital rights management (DRM) information for the media objects; and limiting the sharing of the media objects among the users based on the DRM information and bounds of fair use.

9. A method according to claim 1, wherein the server system provides personalization of media sharing among a plurality of client end devices, by:

dynamically forming and maintaining media circle information defining media circles, each media circle being a respective group of users of the client end devices all sharing one or more interests in a particular set of media as expressed in media sharing activities of the users of the group; and upon selection of a particular media to be shared, dynamically selecting a corresponding media circle and transmitting copies of particular media to the users of the selected media circle.

10. A method according to claim 1, wherein the server system creates a mashup of media and related data objects for delivery to a client end device as part of a user interface (UI) tailored for use by a category of client end devices, by:

maintaining a plurality of source media clips previously transcoded into distinct video formats, bit rates and resolutions;

providing a customized playlist to the client end device, the customized playlist including references to at least some of the source media clips; and upon receiving a request including a reference to a requested source media clip to be played on the client end device:

(1) stitching the requested source media clip together with at least one other source media clip in a single video format, bit rate and resolution appropriate for rendering on the client end device; and (2) delivering the stitched-together source media clips to the client end device for playback thereon.

11. A method according to claim 1, wherein the references to the media chunks are media markers denoting time intervals of a media object, a time interval being a portion of a run-time of the media object.

12. A method according to claim 11, wherein the media markers include respective uniform resource indicators each including a start time and an end time of a respective time interval of a media object.

13. A method according to claim 11, wherein the media markers referencing a media object are stored in a file having a path name corresponding to a hierarchical tree structure corresponding to named-attribute values in a predetermined attribute order, allowing for quick lookup of the media without a need for a database lookup.

14. A method according to claim 13, wherein a path lookup points to a metadata file containing the media markers of the file ordered by starting time.

15. A server system for enabling sharing of media among client end devices, comprising:

communication circuitry operative to be communicatively coupled to the client end devices; and processing circuitry operative to:

(1) segment relatively long media objects into shorter, independently referenced media chunks;

(2) transcode each of the media chunks into one or more distinct transcoding formats compatible with respective client end devices for rendering thereon;

(3) enable user manipulation of references to the media chunks including transmission of references from one client end device to another to enable user sharing of a viewing experience; and (4) upon activation of a reference to one of the media chunks at a client end device, supply the media chunk to the client end device in a respective transcoding format compatible with the client end device for viewing thereon, the server system being further operative for automatically detecting a client end device based on a combination of one or more properties of an operating environment of the client end device, the properties including identifications of a browser and an operating system executed by the client end device, the server system further including a device database populated with information describing media-related capabilities and attributes of a plurality of client end devices; and the processing circuitry being further operative to:
(1) upon receiving a request message from the client end device, apply a user agent (UA) identifier from the request message to the device database to identify a best-matching user interface (UI) to be rendered on the client end device; and
(2) supply the best-matching UI to the client end device in response to the request.

16. A server system according to claim 15, further operative for providing personalization of media sharing among a plurality of client end devices, the processing circuitry being further operative to:
(1) dynamically form and maintain media circle information defining media circles, each media circle being a respective group of users of the client end devices all sharing one or more interests in a particular set of media as expressed in media sharing activities of the users of the group; and
(2) upon selection of a particular media to be shared, dynamically select a corresponding media circle and transmitting copies of particular media to the users of the selected media circle.

17. A server system according to claim 15, wherein the processing circuitry includes a memory for storing a plurality of functional software modules including a client proxy module, a stream server module, a stream control module, and a meta-database manager module; and the processing circuitry is further operative to execute the functional software modules to further perform:

engaging in peer-to-peer operations with peer server systems including discovery, synchronization and backup;

scrubbing external web sites for media metadata related to media known to the server system and provided to client end devices by the server system; and delivering the known media to the client end devices.

18. A server system according to claim 15, further operative to create a mashup of media and related data objects for delivery to a client end device as part of a user interface (UI) tailored for use by a category of client end devices, wherein the processing circuitry is further operative to:
(1) maintain a plurality of source media clips previously transcoded into distinct video formats, bit rates and resolutions;
(2) provide a customized playlist to the client end device, the customized playlist including references to at least some of the source media clips; and
(3) upon receiving a request including a reference to a requested source media clip to be played on the client end device:
(i) stitching the requested source media clip together with at least one other source media clip in a single video format, bit rate and resolution appropriate for rendering on the client end device; and
(ii) delivering the stitched-together source media clips to the client end device for playback thereon.

* * * * *